US012129001B1

(12) United States Patent
Seeley et al.

(10) Patent No.: US 12,129,001 B1
(45) Date of Patent: Oct. 29, 2024

(54) SYSTEMS AND METHODS FOR JOINING PROPULSION MODULES

(71) Applicant: The United States of America as represented by the Secretary of the Navy, Keyport, WA (US)

(72) Inventors: Eric Seeley, Seebeck, WA (US); Jacob Snow, Bremerton, WA (US)

(73) Assignee: The United States of America as represented by the Secretary of the Navy, Keyport, WA (US)

( * ) Notice: Subject to any disclaimer, the term of this patent is extended or adjusted under 35 U.S.C. 154(b) by 0 days.

(21) Appl. No.: 18/220,811

(22) Filed: Jul. 11, 2023

Related U.S. Application Data

(60) Division of application No. 16/974,043, filed on Sep. 12, 2020, now Pat. No. 11,745,840, which is a continuation-in-part of application No. 29/742,133, filed on Jan. 30, 2020, now Pat. No. Des. 928,691, and a continuation-in-part of application No. 29/742,130, filed on Jan. 30, 2020, now Pat. No. Des. 933,577, and a continuation-in-part of application No. 29/742,132, filed on Jan. 30, 2020, now Pat. No.
(Continued)

(51) Int. Cl.

| | |
|---|---|
| ***H01R 13/641*** | (2006.01) |
| ***B63G 8/00*** | (2006.01) |
| ***B63G 8/04*** | (2006.01) |
| ***H01R 12/70*** | (2011.01) |
| *H01R 12/91* | (2011.01) |
| *H01R 13/62* | (2006.01) |
| *H01R 13/64* | (2006.01) |
| *H01R 13/717* | (2006.01) |

(52) U.S. Cl.
CPC ............... *B63G 8/04* (2013.01); *B63G 8/001* (2013.01); *H01R 12/7005* (2013.01); *H01R 13/641* (2013.01); *B63G 2008/002* (2013.01); *H01R 12/91* (2013.01); *H01R 13/6205* (2013.01); *H01R 13/64* (2013.01); *H01R 13/7175* (2013.01)

(58) Field of Classification Search
CPC .... B63G 8/04; B63G 8/001; B63G 2008/002; H01R 12/7005; H01R 12/91; H01R 13/641; H01R 13/64; H01R 13/7175
See application file for complete search history.

(56) References Cited

U.S. PATENT DOCUMENTS 4,084,875 A * 4/1978 Yamamoto ........... H01R 13/629 340/687
6,282,594 B1 * 8/2001 McTague .............. G06F 11/273 361/679.41

(Continued)

*Primary Examiner* — Thanh Tam T Le
(74) *Attorney, Agent, or Firm* — Stephen J. Leahu; Naval Undersea Warfare Center, Keyport

(57) ABSTRACT

A system for joining propulsion modules comprising modular elements and attachable components, including a male end adapted to join a single-piece female end by rotating the male end into the single-piece female end such that data bus terminals align and power bus terminals align. The system can be assembled from these modular elements and components to meet desired mission and performance characteristics without the need to purchase specially designed systems for each mission. The joints connecting the modules are designed such that power and data connections between modules are reliably made.

42 Claims, 34 Drawing Sheets

Related U.S. Application Data

Des. 926,662, and a continuation-in-part of application No. 29/742,138, filed on Jan. 30, 2020, now Pat. No. Des. 937,179, and a continuation-in-part of application No. 29/742,129, filed on Jan. 30, 2020, now Pat. No. Des. 928,690, and a continuation-in-part of application No. 29/742,131, filed on Jan. 30, 2020, now Pat. No. Des. 928,068, and a continuation-in-part of application No. 29/742,135, filed on Jan. 30, 2020, now Pat. No. Des. 928,069, and a continuation-in-part of application No. 29/742,134, filed on Jan. 30, 2020, now Pat. No. Des. 927,398, and a continuation-in-part of application No. 29/742,137, filed on Jan. 30, 2020, now Pat. No. Des. 928,070, and a continuation-in-part of application No. 29/742,034, filed on Oct. 3, 2019, now Pat. No. Des. 928,689.

(60) Provisional application No. 62/974,118, filed on Nov. 13, 2019, provisional application No. 62/973,045, filed on Sep. 12, 2019.

(56) References Cited

U.S. PATENT DOCUMENTS 7,442,486 B2 * 10/2008 Baumann ................ G03F 7/031
548/215
8,702,594 B2 * 4/2014 Edidin ............... A61B 1/00128
439/38

* cited by examiner

SYSTEMS AND METHODS FOR JOINING PROPULSION MODULES

CROSS REFERENCE TO OTHER PATENT APPLICATIONS

The present application is a divisional of, and claims priority to, U.S. patent application Ser. No. 16/974,043 (the Parent Application) filed Sep. 12, 2020 which claims the benefit of provisional patent application Ser. No. 62/973,045, titled: "Field Configurable Underwater Autonomous Vehicle," filed Sep. 12, 2019. The complete disclosures of each are incorporated herein by reference in its entirety.

The Parent Application also claims the benefit of provisional patent application Ser. No. 62/974,118, titled: "Magnetic Coupling for UUV Systems," filed Nov. 13, 2019 which is also incorporated herein by reference in its entirety.

The Parent Application is also a continuation in part and claims the benefit of design application Ser. No. 29/742,034, titled: Marine Vehicle, filed Oct. 3, 2019; the complete disclosure of which is incorporated herein by reference.

The Parent Application is also a continuation in part and claims the benefit of design application serial numbers: Ser. No. 29/742,134 titled "Marine Vehicle with Shroud;" Ser. No. 29/742,130 titled "Marine Vehicle with Shroud and Lens:" Ser. No. 29/742,137 titled "Marine Vehicle with Shroud and Top Lens;" Ser. No. 29/742,129 titled "Marine Vehicle with Shroud and Top Continuous Lens;" Ser. No. 29/742,138 titled "Marine Vehicle with Shroud and Continuous Lens;" Ser. No. 29/742,132 titled "Marine Vehicle with Lens;" Ser. No. 29/742,135 titled "Marine Vehicle with Top Lens;" Ser. No. 29/742,133 titled "Marine Vehicle with Continuous Top Lens;" and Ser. No. 29/742,131, titled "Marine Vehicle with Continuous Front Lens;" each filed on Jan. 30, 2020; the complete disclosures of each which are incorporated herein by reference.

The Parent Application is related to the following patent application serial numbers, each filed the same day herewith: U.S. application Ser. No. 16/974,039 titled "Field Configurable Autonomous Vehicle"; U.S. application Ser. No. 16/974,049 titled "Field Configurable Spherical Underwater Vehicle"; U.S. application Ser. No. 16/974,044 titled "Propulsion System for Field Configurable Vehicle"; U.S. application Ser. No. 16/974,045 titled "Method and Apparatus for Coupling and Positioning Elements on a Configurable Vehicle"; U.S. application Ser. No. 16/974,042 titled "Method and Apparatus for Transporting Ballast or Cargo in an Autonomous Vehicle"; U.S. application Ser. No. 16/974,040 titled "System And Apparatus For Attaching And Transporting An Autonomous Vehicle"; U.S. application Ser. No. 16/974,047 titled "Method for Parasitic Transport of an Autonomous Vehicle"; U.S. application Ser. No. 16/974,046 titled "Method and Apparatus for Positioning the Center of Mass on a Configurable Device"; U.S. application Ser. No. 16/974,054 titled "Optical Communications for Autonomous Vehicles"; U.S. application Ser. No. 16/974,048 titled "Buoyancy Control Module for Field Configurable Autonomous Vehicle"; and U.S. application Ser. No. 16/974,041 titled "Scuttle Module for Field Configurable Vehicle"; the complete disclosures of each which are incorporated herein by reference.

BACKGROUND

Unmanned Undersea Vehicles (UUVs) and other unmanned and autonomous vehicles are highly specialized, specially configured vehicles. Their configuration, payload and propulsion, as well as other attributes, are designed specifically for a single or very narrow range of missions. This fact results in the expenditure of significant nonrecurring engineering and development costs to make and manufacture each special purpose vehicle. These factors contribute to the cost of existing unmanned vehicles and UUVs making them especially expensive to produce and acquire.

Such specially designed vehicles also have very narrowly defined types of use and utility. This narrow range of uses, correspondingly limits the addressable market or numbers of potential purchasers, foreclosing opportunities to produce at numbers large enough to take advantage of economies of scale. The narrow range of uses for each vehicle is thus an additional factor in driving up the cost of production.

The weight, mass, drag, center of gravity, center of buoyancy, size and location of the control surfaces, as well as propulsion and electrical requirements for existing vehicles are fixed at time of vehicle design and manufacture. The vehicle cannot be modified in the field after manufacture. Expanding, altering, or changing the vehicle design to meet a wider or new range of customer needs requires redesigning, reconfiguring and re-manufacturing a completely new vehicle. Thus, UUV and unmanned vehicle designs and their missions remain fairly fixed once produced, devoid of new innovations and new capabilities.

The mission specific nature of the designs also drives operator costs and limits operator mission flexibility. To perform a different mission other than the one originally intended requires the purchase of another vehicle designed for that purpose. Operators often purchase a quiver of expensive UUVs to ensure that there is at least one UUV on hand capable of meeting the current mission requirements. For operations without such accommodating budgets, vehicle design often limits scope or curtails the ability to adapt the mission to changing conditions.

Specialized UUVs and autonomous vehicles often also include proprietary data busses, communications systems, and interfaces. These proprietary systems mean that components cannot be shared between vehicles and that a part from one vehicle cannot be used to repair another. These proprietary systems also mean that operators must expend time and resources to master the different communications protocols and systems architectures of each vehicle in their inventory; and to adopt specialized operating procedures and protocols.

The fixed nature of the vehicle design, especially but not limited to, factory sealed and enclosed UUV designs, means breakdowns in the field can often end an entire mission. Once a vehicle component or subsystem fails, the likelihood that it can be repaired or replaced in the field is very small. Malfunctions in the field can therefore end a mission or evolution. This situation can be very costly for the operator and introduce new hazards into a mission. By way of example, if a UUV were employed to survey an offshore oil and gas rig and that UUV failed: personnel and equipment must be retrieved, a replacement UUV procured, and the personnel and equipment redeployed. Not only does such a duplicate evolution incur additional time and labor, but in a hazardous environment, the duplicative effort exposes additional unnecessary risks to personnel and equipment.

SUMMARY OF THE DISCLOSURE

The present disclosure includes recognition of the problems and limitations of prior art UUVs and autonomous vehicles.

According to one aspect of the disclosure, the disclosure includes a UUV or autonomous vehicle of modular design. The modules can be assembled in the factory or in the field without special training or tools. Users can assemble the UUV or vehicle they want, when they need it. The modular design enables the vehicle to be assembled by the user to meet the user's mission parameters and performance goals without the need to purchase individual, separate, mission-specific, vehicles for each operation. The modular design additionally enables operators to replace a failed component in the field.

According to another aspect of the disclosure the configurable, modular UUV or vehicle includes modules and elements of various capabilities and functions. These modules can include but are not limited to: command and control, propulsion, control surfaces, maneuvering thrusters, propellers, sensors, power or batter supply units, mass configuration, buoyancy control, legs and footings, ballast, attachment and grappling mechanisms, payload, communications, antennas, scuttle capability, navigation, and other mechanisms. Modules and elements can be combined together as desired to configure the vehicle as wished.

According to another aspect of the disclosure, the module's mass, drag, center of gravity or other pertinent characteristics and parameters are programmed into each module. When the module is assembled into the vehicle, this information is communicated to the vehicle's command and control system, which then computes or stores the completed vehicle's stability and control parameters and other configuration data. The vehicle can also empirically determine its stability and control coefficients and control laws.

According to yet another aspect of the disclosure, each module is individually sealed to maintain environmental integrity free of contaminants or suitability for use under water. Each module can therefore be separated and replaced without compromising the water-tight nature of the modules and of the vehicle as whole.

According to a further aspect of the disclosure, the vehicle's electrical distribution system and data and control busses are integrated within the hull of each module. Connectors at the end of each module enable the busses to be connected to adjacent modules when the modules are assembled together. Modules can optionally perform internal self-checks, once coupled to power via these connections and then provide a visual indication to the operator that a proper connection has been made and that the module systems are functional. In one possible embodiment of the disclosure, each module incudes an LED for this purpose.

According to a still further aspect of the disclosure, certain modular components of the vehicle can be attached to and secured, or detached and released from the vehicle via magnets. In an additional embodiment, magnets can be included as a drive component in the propulsion system.

Using magnets to attach modular components to the vehicle in this manner eliminates the hull penetrations necessary in prior art devices; and which can permit ingress of water or other contamination into the vehicle. These prior art hull penetrations are themselves, often a source of failure and routinely incur much maintenance time and expense. In severe cases, failure of the hull penetration can result in loss of the entire vehicle. The magnetic attachment of the present disclosure thus additionally contributes to the lower cost, low maintenance, greater reliability, and increased productivity of a vehicle according to embodiments of the present disclosure.

In still another embodiment of the disclosure, magnets can be used to secure the vehicle to another device such as, for example, an oil rig, a mother ship, or buoy. Energizing or engaging this type of attachment magnet can be utilized to anchor or station the vehicle at a fixed location or device. Such a capability can be employed to navigate to a known structure or vessel to retrieve the vehicle; or to station keep and collect data before being released to return to after mission completion. Such a capability is also useful to attach the vehicle to a ferry vehicle for transport to the deployment area. This feature reduces the battery and power requirements of the vehicle and also permits transport to areas that would otherwise be inaccessible or beyond the endurance range of the vehicle.

According to yet another aspect of the disclosure, the hull and modular components of the vehicle may be manufactured using additive manufacturing or 3D printing techniques, or via injection molding. This feature of the disclosure reduces costs over traditionally machined components and additionally allows complex vehicle, module, and element shapes to be easily fabricated.

Further advantages and features of the present disclosure will be described in detail below.

DESCRIPTION OF THE DISCLOSURE

Solely for the convenience of the reader, the Description has been subdivided into headings and subheadings. These headings and subheadings do not limit the metes and bounds of the invention as claimed. The Description headings are organized as follows:

1.0 Vehicle Overview and Configurable Components
1.1 Module Fabrication and Field Joints for Connecting Modules and Elements
1.2 Module Data Bus and Electrical Distribution System
1.3 Magnets for Modular External Elements, Transit, and Drive Systems
1.3.1 Overview of Magnets and Diametric Magnet Principles
1.3.2 Mounting Fixed External Configurable Elements to Modules
1.3.3 Mounting Detachable Elements to Modules
1.3.4 Payload and Ballast Modules
1.3.5 Parasitic Ferry Transfer and Parasitic Station Keeping
1.3.6 Mounting Moveable External Configurable Elements To Modules
1.3.7 Propulsion Module and Propulsion Systems
1.4 Vehicle Scuttle Module
2.0 Vehicle Systems
2.1 Hardware Systems Architecture
2.2 Software and Logic Systems Architecture
2.3 Vehicle Stability and Control
2.3.1 Dynamically Determined Stability and Control Logic
2.3.2 Center of Mass Redistribution Module
2.3.3 Buoyancy Control Module
2.4 Telemetry and External Communications Systems
2.4.1 Optical Communications Module
2.4.2 Vehicle Swarm Communications
3.0 Example of Use

1.0 Vehicle Overview and Configurable Components

Figure 1A:
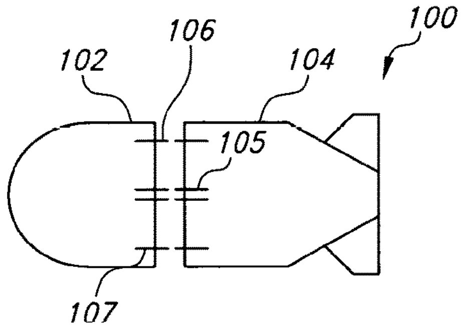
FIGS. 1A-1D illustrate several embodiments of a field configurable autonomous vehicle according to the disclosure.

FIGS. 1A-1D show several embodiments of a field configurable vehicle 100 according to the present disclosure. In the embodiment of FIG. 1, vehicles 100 are shown as a UUV, but vehicle 100 may comprise other uses and vehicle types, such as, for example, drones, helicopter drones, unmanned autonomous aircraft (UAS), toys, or other autonomous vehicles and devices. In the embodiment of FIG. 1A, vehicle 100 comprises a first modular section 102, paired with a second modular section 104. Front section 102 mates with rear section 104 using any of a variety of field joints. According to a preferred embodiment of the disclosure, section 102 mates mechanically and electrically using the mating system described further below.

Bus 105 electronically couples modules 102 with module 104. Bus 105 can be used for a variety of functions. In a simple embodiment, bus 105 routes electrical power throughout the vehicle. In more elaborate embodiments, bus 105 may further comprise multiple buses including data buses 106 and 107 in addition to power distribution bus 105. Data buses can be used to route command and control signals throughout the vehicle to operate the propulsion system, sensors, store and operate on data, or operate other subcomponents as desired. Power and data buses and their physical and logical architectures are well known to those of skill in the art. Additional details of one possible bus configuration is described in subsequent sections below.

Figure 1B:
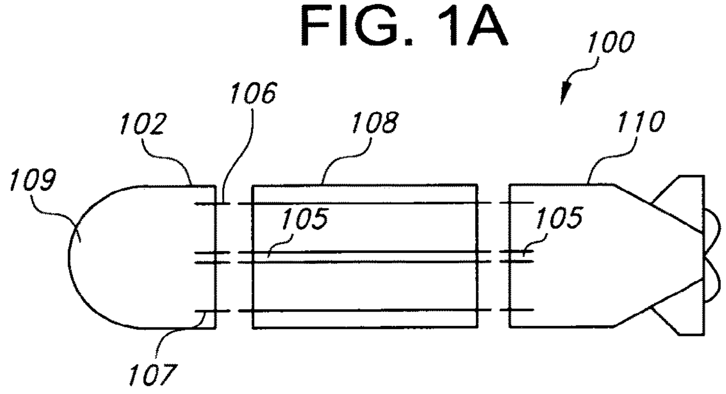
Figure 1C:
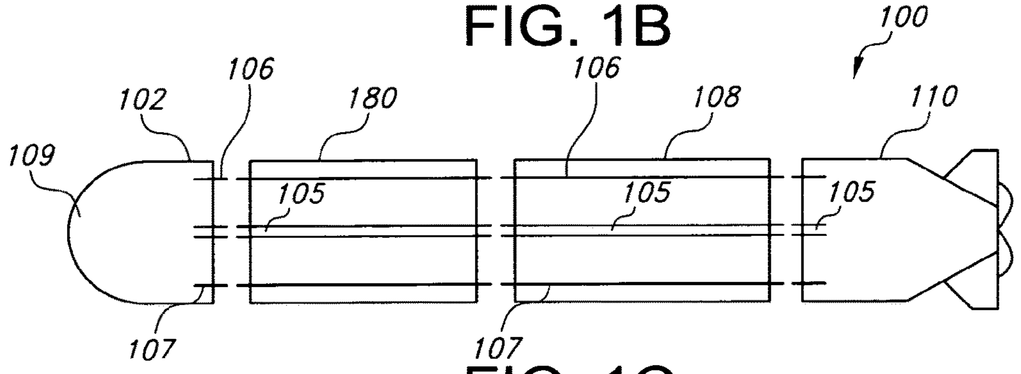
Figure 1D:
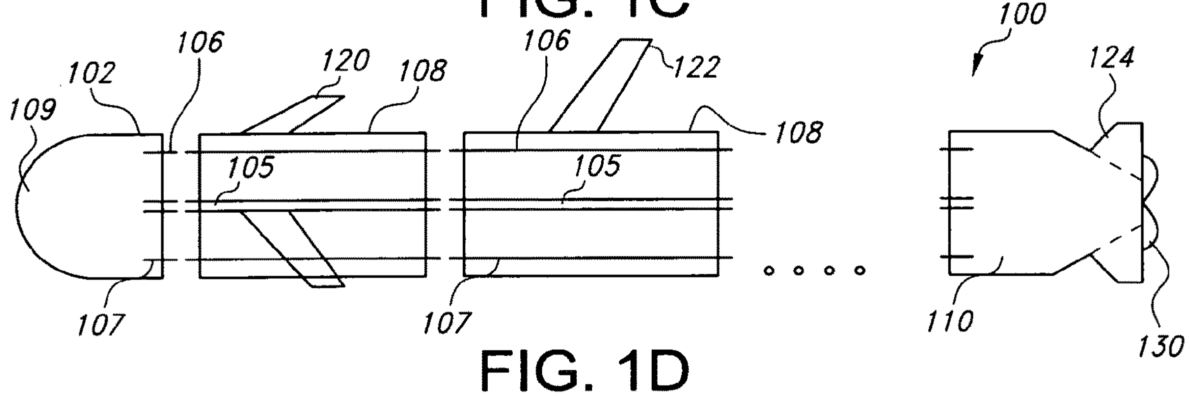

FIGS. 1B-1D illustrate the additionally modularity and configurability of the present disclosure. In FIG. 1B, vehicle 100 comprises three modular sections 108, 109, 110. In the embodiment of FIG. 1B, modular section 108 may comprise any one of a number of types of modules have multiple purposes or attributes. For example, module 108 may comprise a payload module useful for transporting and delivering a cargo from one location to another. Module 108 may also include other additional hardware and attributes having multiple features and capabilities. For example, module 108 can include a temperature or imaging sensor system in addition to a cargo delivery capability. Module 108 pairs mechanically and electrically with modules 109 and 110 in the same manner as described in connection with FIG. 1A.

FIG. 1C further illustrates the modularity and field configurable nature of the disclosure. In the embodiment of FIG. 1C, vehicle 100 can comprise a plurality of modules 108, each with unique and separate capabilities, or alternatively with duplicate functions and purposes.

FIG. 1D shows that in addition to discrete modules 108, various control surfaces 120, 122, and 124, propulsion mechanisms 130 and other external attachments may be attached to configure vehicle 100. In FIG. 1D, control surface 122 comprises a sail plane and control surface 120 comprises a stabilizer. Control surfaces 122 and 120, as is known to those of skill in the art, orient the vehicle in pitch, roll and yaw. Different types of control surfaces beyond those shown in FIG. 1D, including but not limited to, rudders, elevators, bow planes, and canards may also be attached or detached to reconfigure vehicle 100 as desired.

FIGS. 2A-2D illustrate alternative embodiments of field configurable autonomous vehicles 200 and 250 according to the disclosure. In the embodiments of FIGS. 2A-2D, the field configurable vehicle is a UUV comprising a sphere 201. The UUV of FIGS. 2A-2D may be configured using the apparatus and methods of the present disclosure by adding or removing modular devices such as different propellers 210, or different thrusters 220, different control surfaces 230, or different sensors and communications packages 240.

Figure 2A:
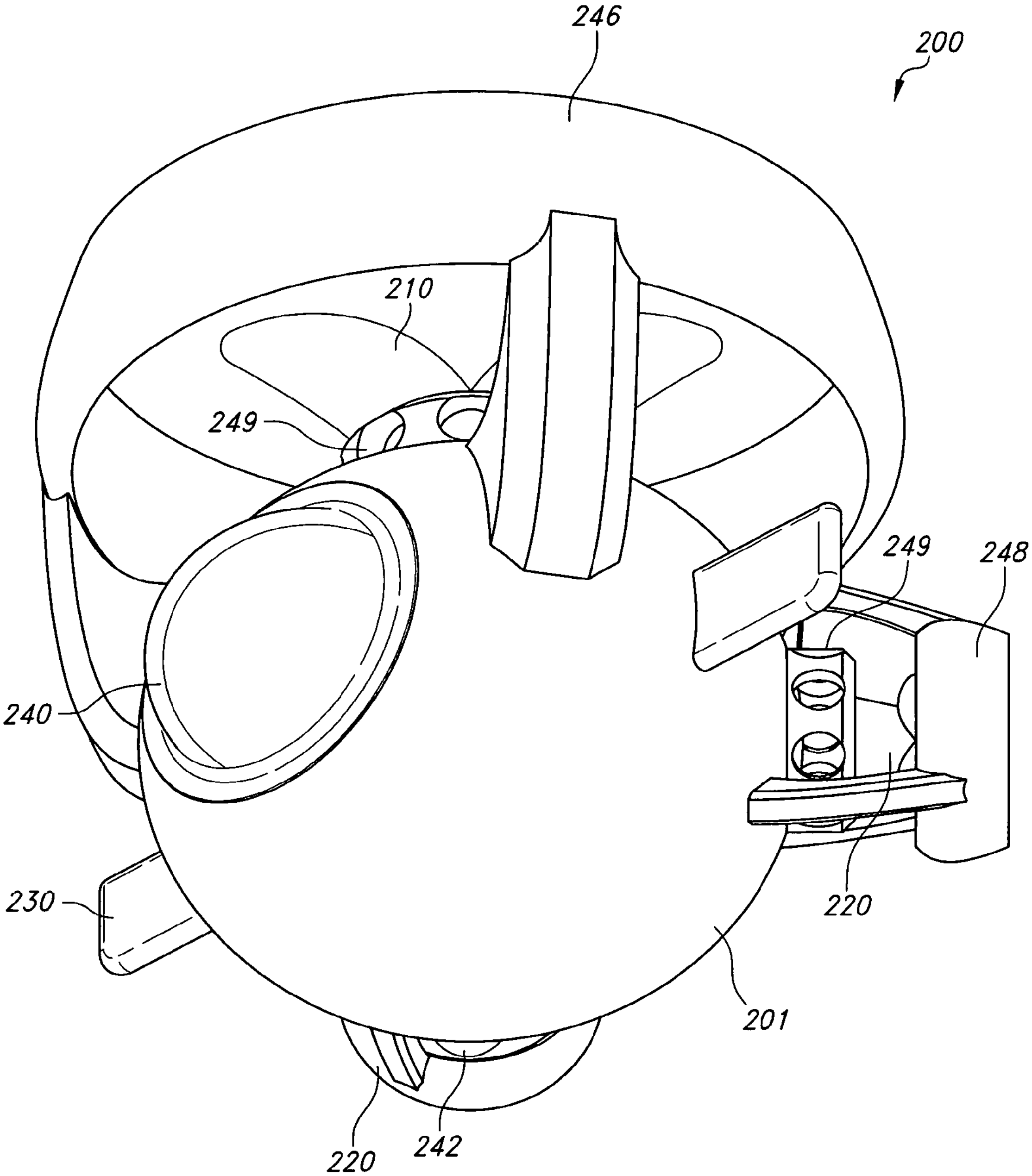
FIGS. 2A-2D illustrate alternative embodiments of a field configurable autonomous vehicle according to the disclosure.
Figure 2B:
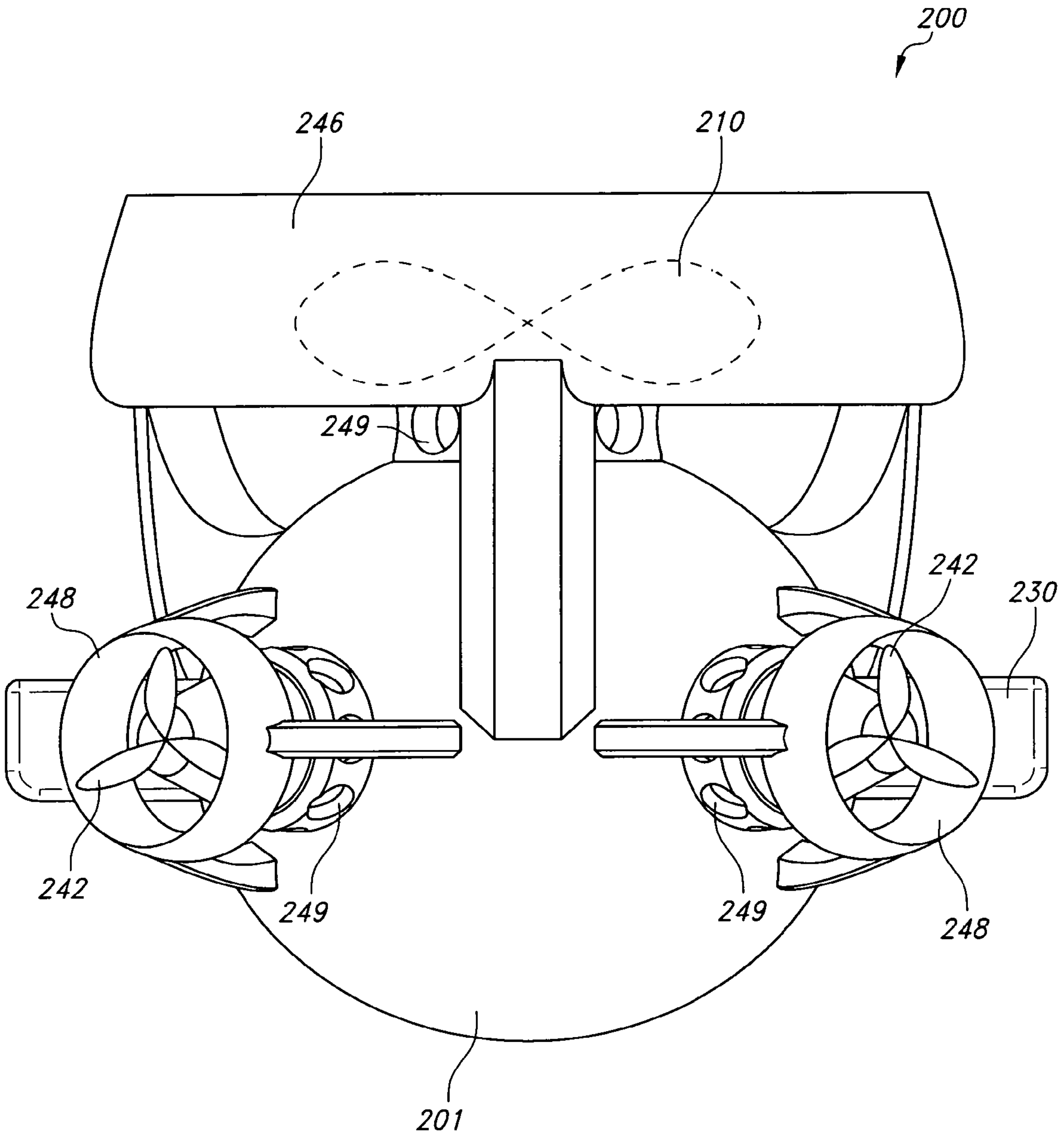
Figure 2C:
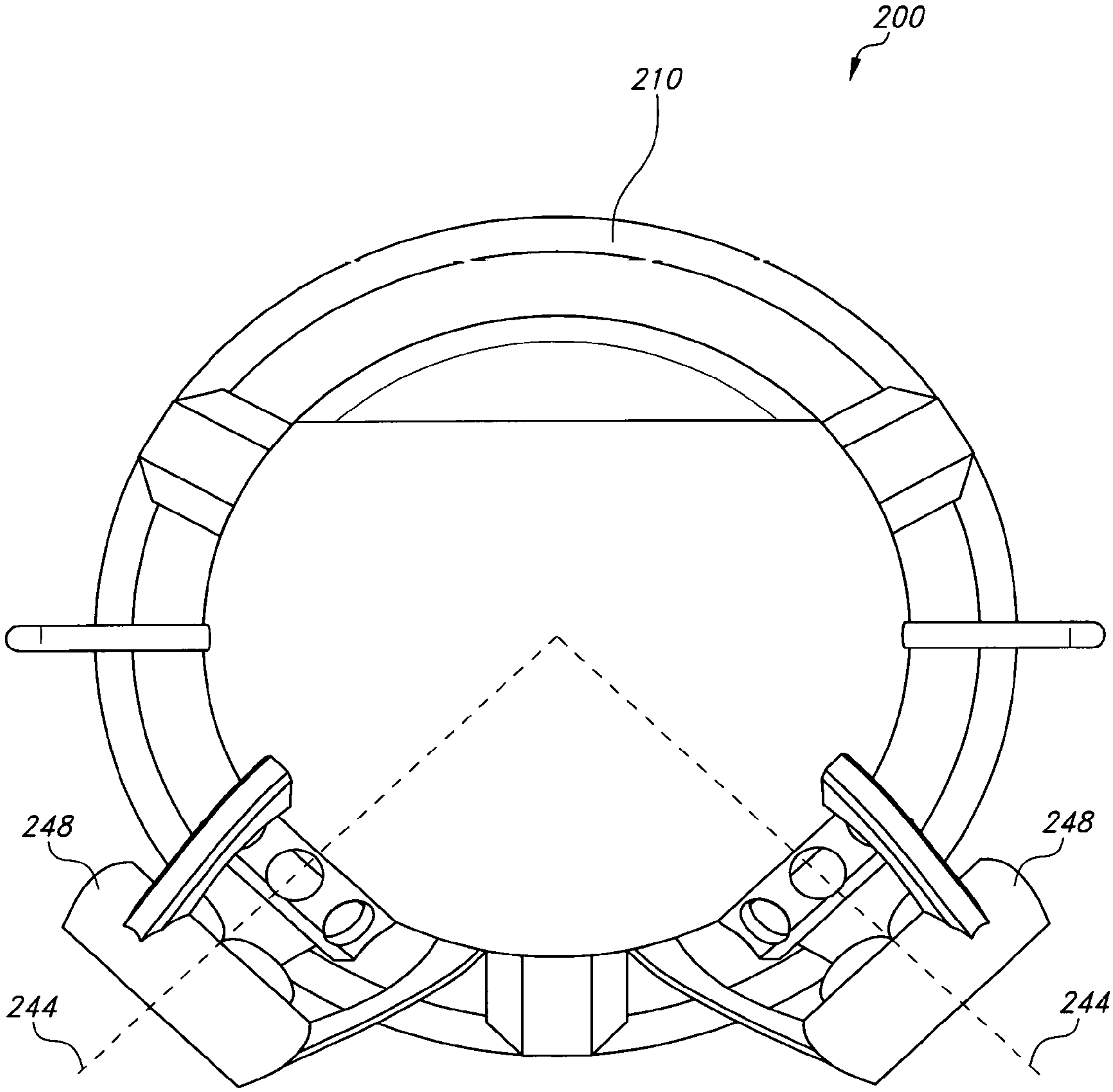

In the field configurable UUVs of FIGS. 2A-2D, thrusters 220 which may include propellers 242 are oriented as shown in FIG. 2C. The vector line of action 244 of each thruster 220 is thus preferably orthogonal to each other and pass through the center of gravity of UUV 200. In a preferred embodiment of the disclosure, the mass distribution of UUV 200 is designed such that the center of gravity, and center of buoyancy, is collocated with the center of sphere 201. UUV 200 is also according to embodiments of the disclosure, designed to be slightly positively buoyant.

The vector line of action of propeller 210 is also preferably through the center of gravity of UUV 200. Changing the speed of any of individual propeller 242 or 210 results in a thrust vector that can reposition or assist in station keeping UUV 200 without the introduction of significant unwanted moments about the vehicle's axes that must be then counteracted by the vehicle's control systems/surfaces to maintain vehicle attitude and orientation. This fact results in significant translational motion flexibility and minimizes off axis torques which, if present, would need to be counteracted by the vehicle's control systems, with corresponding adverse impact on vehicle performance, handling, and endurance.

The UUV 200 of FIGS. 2A, 2B, additionally includes shrouds 246 and 248 surrounding propellers 210 and 242 respectively. Shrouds 246 and 248 serve as a safety mechanism to prevent hands or clothing from being caught in a moving propeller. Shrouds 246 and 248 also protect the propellers from collision damage and deflect debris or plant life that may be in the water column. Shrouds 246 and 248 additionally help direct flow axially. A series of openings 249 surrounding each propeller assembly allow fluid moved by each of propellers 210 and 242 to escape past the vehicle.

Figure 2D:
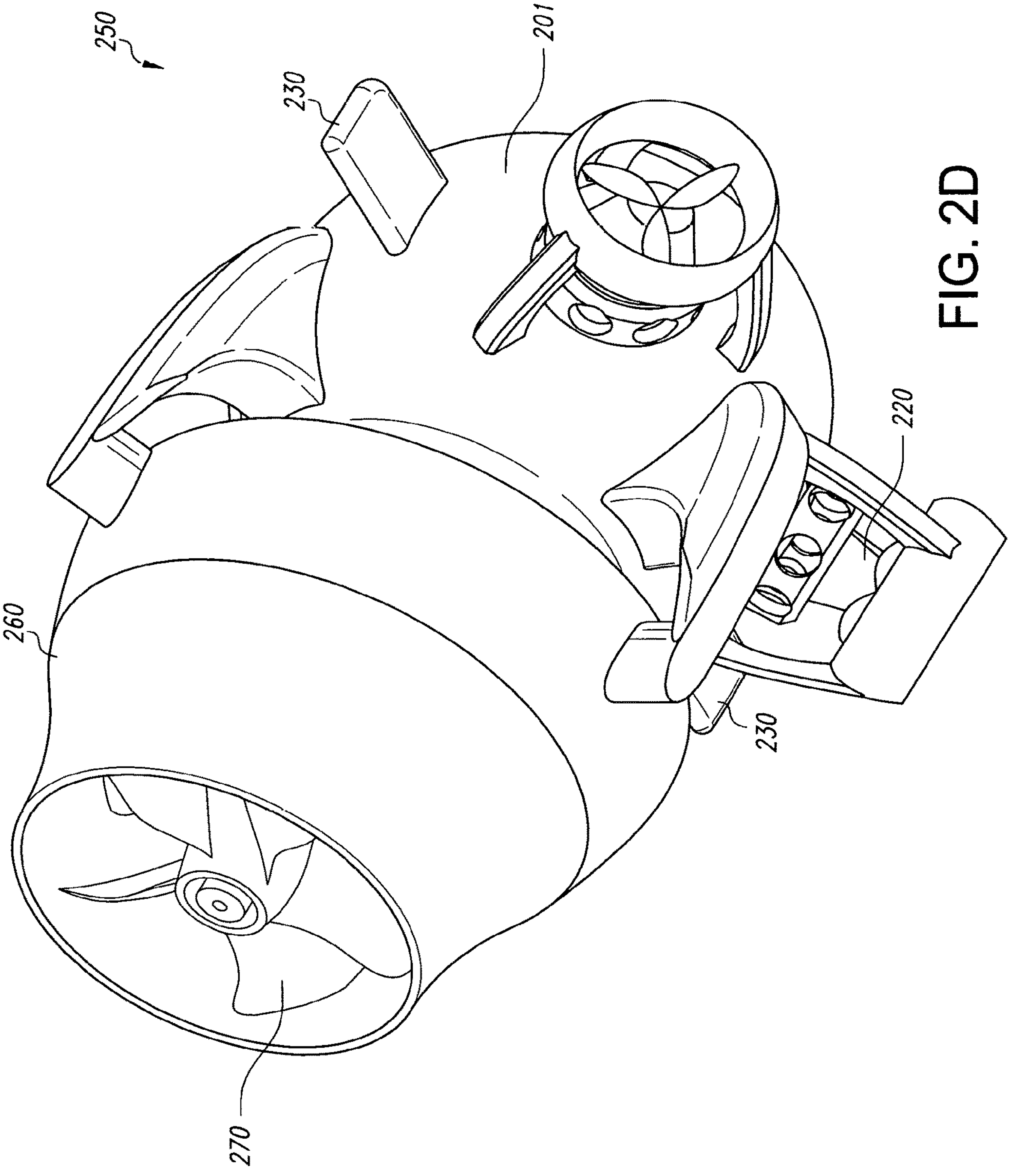

FIG. 2D illustrates an alternative spherical UUV 250 wherein UUV 250 additionally includes an extended shroud 260 and counter-rotating propeller assembly 270. Counter rotating propeller assembly 270 may also be constructed according to the teachings of the present disclosure as described more fully below. Counter rotating propeller assembly 270 minimizes roll torque imposed on the vehicle by the rotating motion of the propellers. Extended shroud 260 may additionally include internal vanes that separate out and direct the wash from the multiple propellers to prevent the propellers from interfering with each other.

Figure 3A:
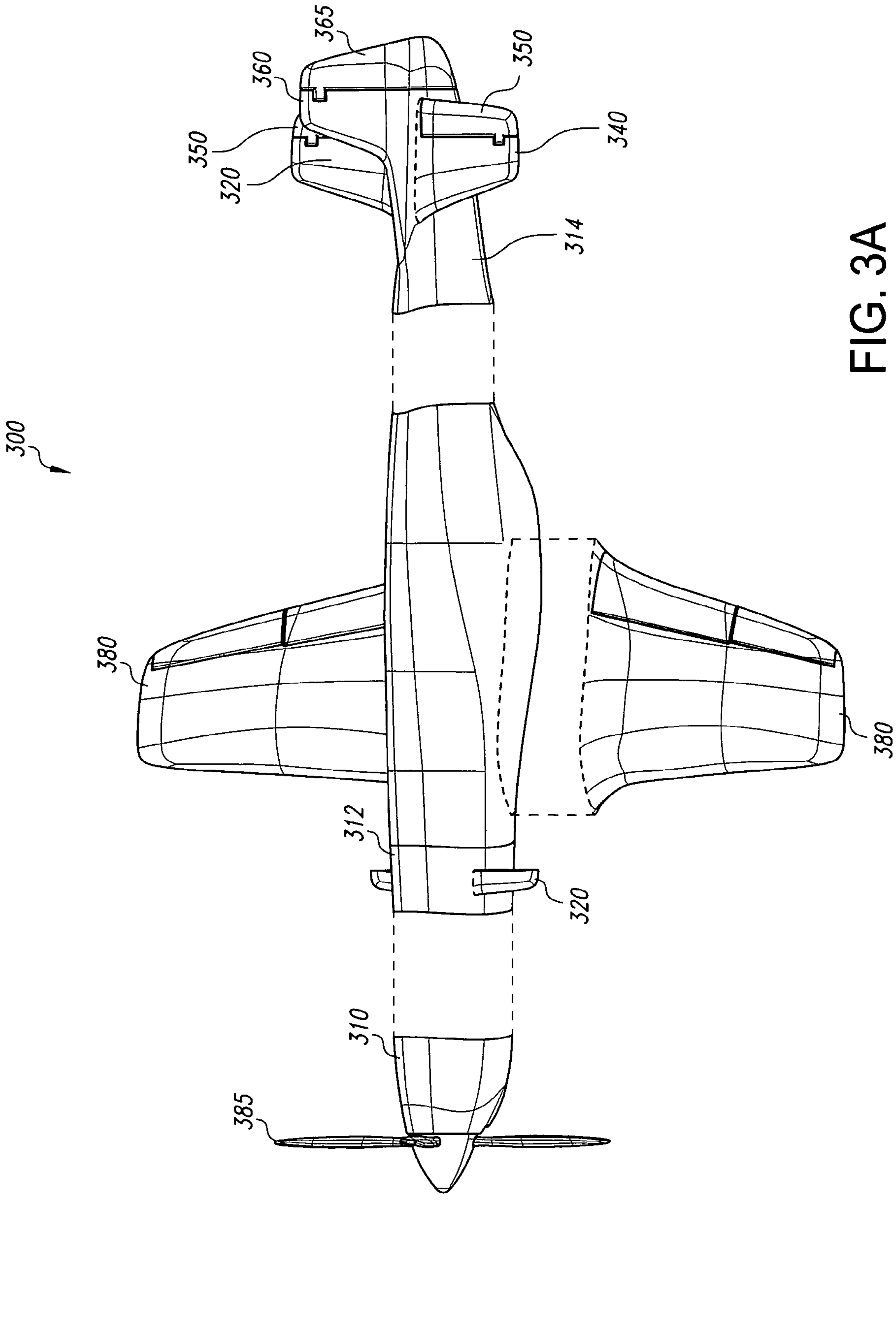
FIGS. 3A-3B illustrate other alternative embodiments of a field configurable autonomous vehicle according to the disclosure wherein the vehicle is an airborne vehicle.
Figure 3B:
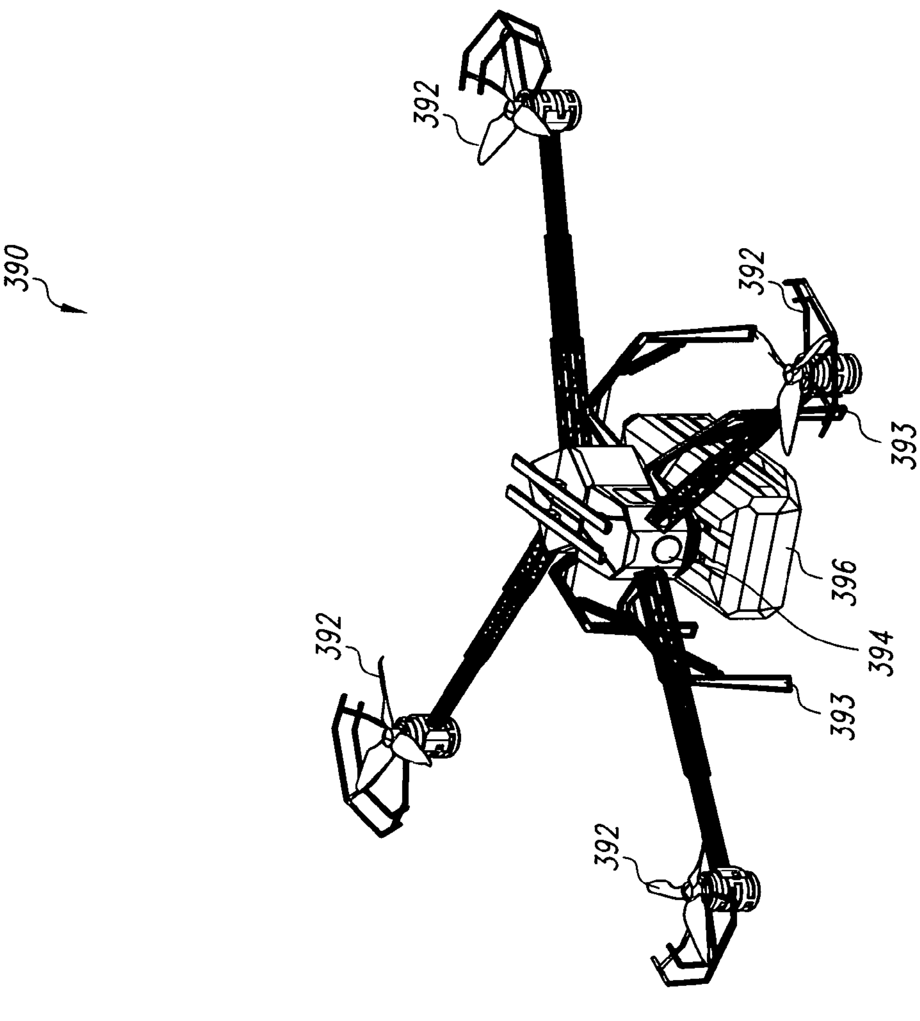

FIGS. 3A-3B illustrate other alternative embodiments of a field configurable autonomous vehicle according to the disclosure wherein the vehicle is an airborne vehicle. In the disclosure of FIG. 3A, a field configurable autonomous aircraft 300 may be assembled from two or more modular units 310, 312 and 314 in the same manner previously described in connection with FIGS. 1A-1D. The aircraft of FIG. 3A may also be configured according the inventive methods and apparatus described herein by attaching modular control surfaces such as, for example: a canard 320; a horizontal stabilizer 340 with elevators 350; a vertical tail 360 with rudder 365; one of a selection of wings 380, and a propulsion module or system propeller 385.

FIG. 3B shows an airborne modular vehicle 390 constructed according to the present disclosure wherein the airborne modular vehicle 390 comprises a helicopter-type drone. Drone 390 may be modularly configured by, for example, attaching different shapes of rotating propellers 392, adding or removing different footings or landing gear 393, adding or adding or removing different sensor packages 394, or adding or removing payload or ballast modules 396. As will be clear to those of ordinary skill in the art, the modular concepts of the present disclosure can apply equally to other types of airborne vehicles such as model aircraft, lighter than air (LTA) airborne vehicles such as blimps, dirigibles, and controllable balloons, as well to radio controlled UAS vehicles, and toys.

Figure 4A:
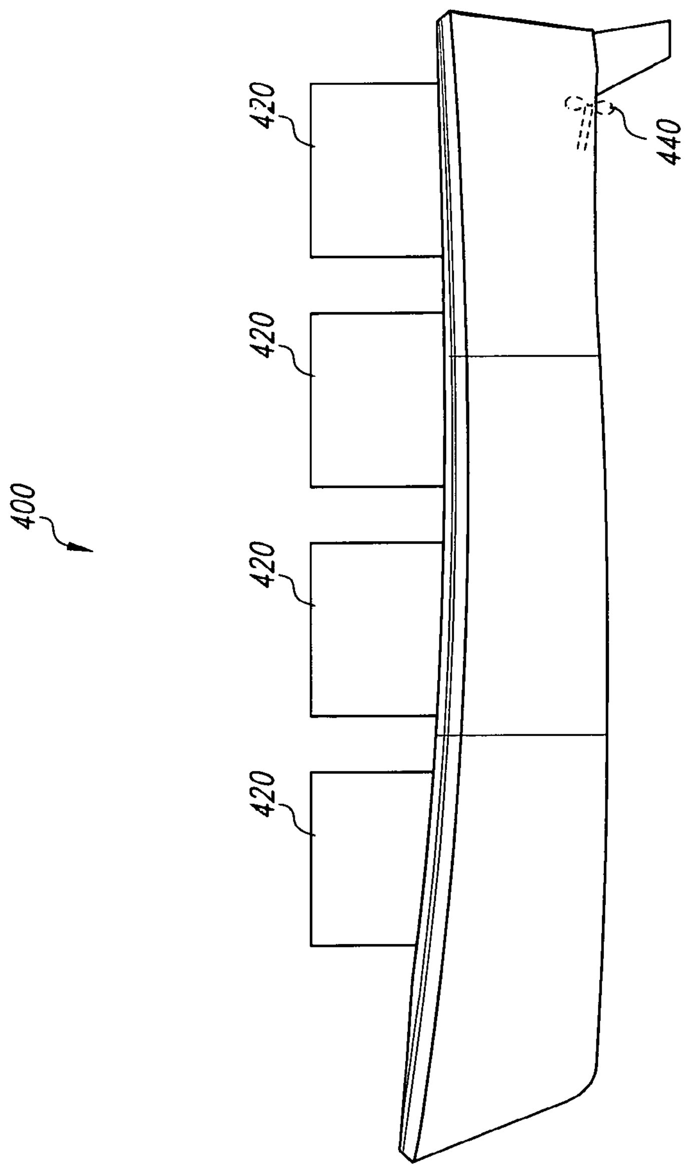
FIGS. 4A-4B illustrate yet another alternative embodiment of a field configurable autonomous vehicle according to embodiments of the disclosure wherein the vehicle comprises a surface vehicle such as an autonomous toy truck or a boat.
Figure 4B:
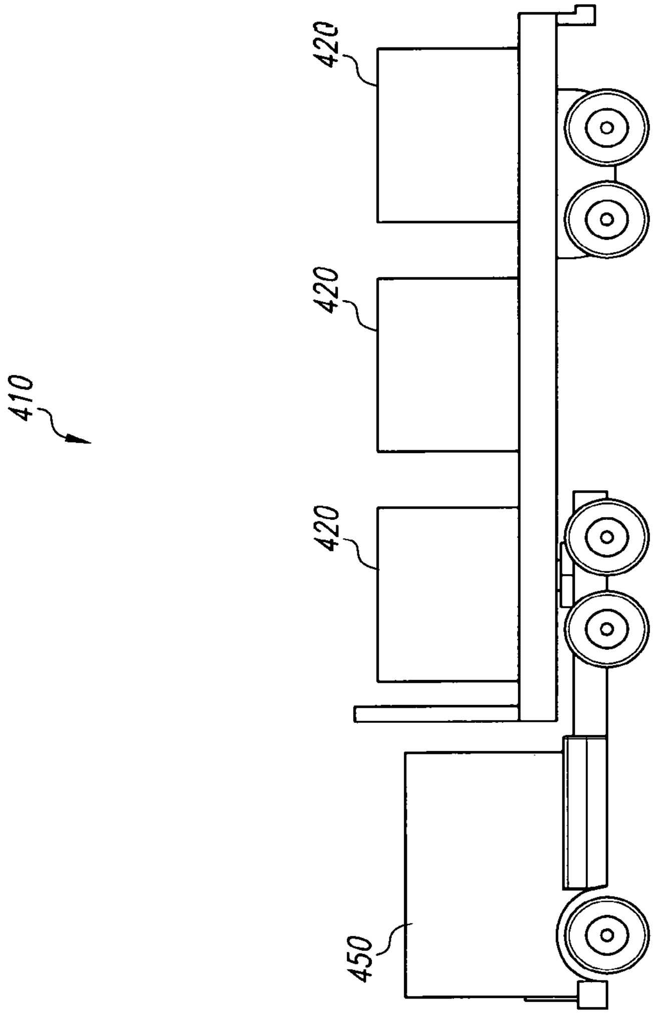

FIGS. 4A-4B illustrate yet another alternative embodiment of a field configurable autonomous vehicle according to embodiments of the disclosure wherein the vehicle comprises a surface vehicle such as an autonomous boat 400 or a toy truck 410. Surface vehicles 400 and 410 may be configured as desired by attaching and removing payloads 420, propellers 440, power pack 450 or other modular items in a manner as described previously in connection with FIGS. 1-3 above.

Solely for ease of discussion, the various modular components and vehicle subsystems shall now be further described with reference to vehicle 100 of FIGS. 1A-1D. The principles, methods, and apparatus described below also apply to any field configurable autonomous vehicle including, but not limited to, those described in FIGS. 2-4.

1.1 Module Fabrication and Field Joints for Connecting Modules and Elements

Module hulls may be fabricated from a variety of materials, such as, for example, metals, composites, or plastics; using a variety of techniques known to those of skill in the art, such as machining, molding, casting. In a preferred embodiment of the disclosure, modules can be fabricated using additive manufacturing techniques, such as, for example, 3D printing. When modules are formed of composite materials, modules can be spun on a drum or spindle in a manner used in the textile industry or similar to that used in the aerospace industry to make the composite hull of the B787 aircraft. When modules are intended for use as a UUV or in other applications that may include exposure to water, modules are formed from non-porous materials or other materials designed to prevent the penetration of water past the hull to the interior of vehicle 100.

In one embodiment of the disclosure, module hulls are manufactured using additive manufacturing techniques known to those of skill in the art. The modules are made of PA-12 nylon, the complete specification of which is incorporated herein by reference; and are formed in two longitudinal halves with closed ends having a mechanism for joining with other modules. Prior to assembling the halves together, the internal components of each module can be placed or secured in the interior; and then the halves joined together to make the model. The halves may be joined mechanically or via heat soldering or adhesives using techniques known to those of skill in the art.

Modules initially manufactured with open ends can be sealed at each end to protect interior components from damage and from ingress of dirt, grime and water. In one embodiment of the disclosure, the module is additionally filled with an engineered fluid for heat transfer such as NOVAC manufactured by 3M. The engineered fluid manages heat from electronics contained within the module and maintains the interior temperature of the module within a desired range to guard against damage to the electronics. The fluid may be injected into the module after its manufacture via an injection port which is then sealed closed. According to an additional embodiment of the disclosure, modules and elements manufactured using additive manufacturing techniques can be formed with capillaries in the hull wall structure. The capillaries are in fluid communication with the engineered fluid or may themselves contain the engineered fluid. The system of capillaries transfers heat from the interior of vehicle 100 to the exterior of vehicle 100. Optionally thermal management of each component module may be accomplished by including heat sinks, such as metal strips, in lieu of or in addition to use of engineered fluids.

When vehicle 100 comprises a UUV manufactured from HP-12 nylon, the wall thickness of the hull must be sufficient to withstand pressure at the vehicle's maximum operating depth. According to one embodiment of the disclosure, a wall thickness of 5.5 mm enables operation of UUV 200 at depths of 200 m with adequate safety factors. Exact specifications are dependent upon the water density and the safety factors chosen, as well as the forces exerted upon the vehicle during vehicle manoeuvres. Sizing of the hull wall thickness depending upon the material properties, operating environment, and mission parameters of vehicle 100 is well known to those of skill in the art.

Figure 5A:
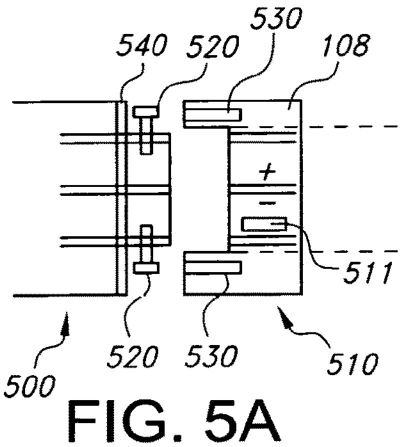
FIGS. 5A-5F are views of module and element joining systems according to embodiments of the disclosure.

FIGS. 5A-5F show enlargements of a module joining system according to an embodiment of the disclosure. As shown in FIG. 5A, each module includes a male connection 500 on a first end and a female connection 510 on a second end. Male connection 500 further includes pins 520 that slide into corresponding slots 530 in female connection 510. To secure module 108 to another module, male connection 500 slides into the female connection of the adjacent module and module 108 is rotated until approximately ninety degrees until pins 520 lock in place. Sealing gasket 540 prevents water from entering between the joint. Pressing the modules slightly together as they are joined helps to seal sealing gasket 540. As shown in FIG. 5A, female end 510 of module 108 would similarly mate to the male end of an additional module in the manner described above.

Figure 5B:
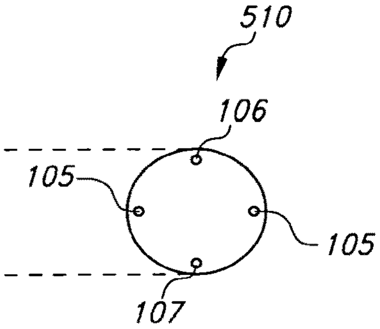

FIG. 5B illustrates an end view of the female portion 510 of the joining system of FIG. 5A. In FIG. 5B, module electrical connection points are located at 0° (top dead center); 90°; 180°; and 270°. The positive lead of power bus 105 is located at the 90° point. The negative lead of power bus 105 is located at the 270° connection point. According to one possible embodiment of the disclosure, a connection point of solid material assists with maintaining the strength and rigidity of the hull, and can include pogo-type connectors as shown in FIG. 5A.

Figure 5C:
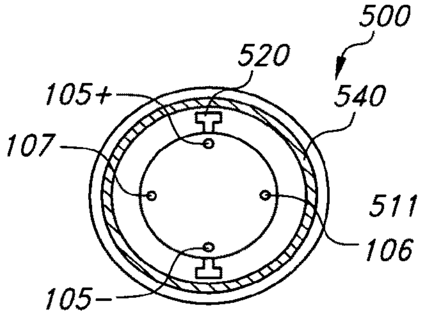

FIG. 5C shows an end view of male connector 500. On male connector 500 the CAN bus lead is located at an orientation 90° to the corresponding CAN bus lead on female connector 510. As the modules join and are twisted and locked into place, the CAN bus leads on male connector 500 and female connector 510 align, making the data bus and power bus connections between modules. An optional light emitting diode (LED) 511 can be coupled to power bus 105 and included with each configurable module or element. LED 511 can be included on a single end or on both male and female ends 500 and 510 as shown. When power is present on power bus 105 and one module is joined with another, LED 511 will illuminate to confirm to the operator that the modules are joined correctly and that electrical contacts have been made. LED 511 may optionally include a timer or be coupled to data bus 106, 107 to limit the length of time LED 511 flashes.

In an additional possible embodiment of the disclosure, LED 511 may also be coupled to a module microprocessor. When power is supplied to the module, the module microprocessor can initiate a series of module systems self-checks that query and verify the operational status of the module's subcomponents and optionally any attached elements. If the self-checks are concluded satisfactorily, LED 511 may blink or flash a first sequence; and if any of the self-checks fail, LED 511 may blink or flash a second sequence. For example, if when a navigation module is joined to a power module and all navigation systems are functioning properly, LED 511 may simply remain lit without flashing for a period of 5 seconds. If, however, a navigation component failed the self-check sequence, the module microprocessor could command LED 511 to steadily blink, for example, at the rate of one flash every half second.

Figure 5D:
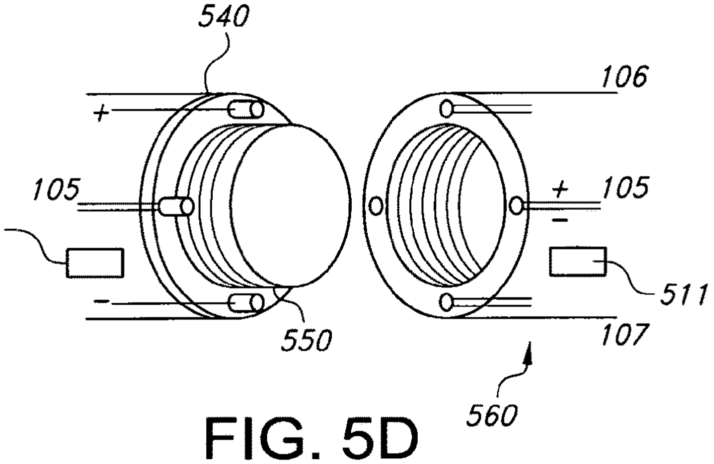
Figure 5E:
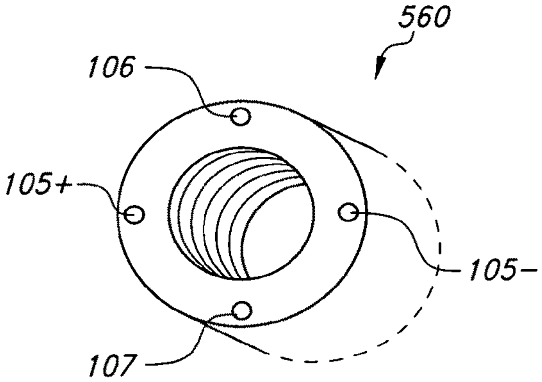
Figure 5F:
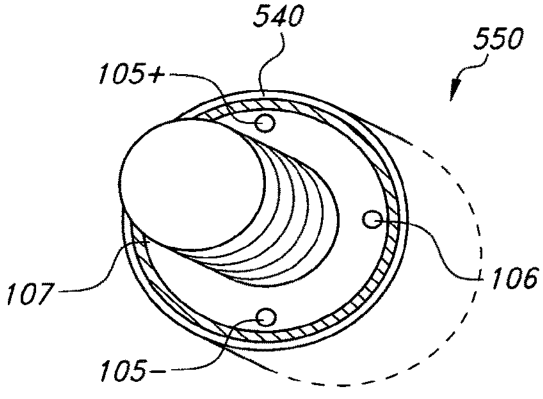

An alternative embodiment of the disclosure, shown in FIGS. 5D-5F, uses a threaded connection to join the modules together. In the embodiment of FIG. 5D, a male threaded connector 550 threads into a female connector 560. In the embodiment of FIG. 5D, CAN bus 106, 107 is located about the center of the module as illustrated in FIGS. 5E and F. The thread count of male connector 550 is such that when paired with female connector 560 and screwed into place, CAN bus 106 and 107 align properly with their counterpart in the opposing module and the proper connections are made. As in the previously described embodiment, an LED 511 may be included to visually confirm proper connections and a sealing gasket 540 included to create a water tight seal, protecting the electrical connections and preventing corrosion.

Should there exist certain modules that should not be connected to each other, or modules that should be connected in a certain sequence, then the male and female ends of such modules can be specially sized or configured. In this manner, modules cannot be mated with an incompatible module or mated in an unacceptable sequence. For example, if one module contains hazardous cargo, there may exist a preference to avoid placing that module next to an ignition source such as the power module, or next to a communications module.

Modules can also be color or visually coded to visually indicate the type of module to the operator. For example, propulsion modules could be colored yellow; power modules colored green, and hazardous modules colored bright orange. In this manner, an operator can readily identify the type of module or element without having to read a placard or look for other identifying indicia. This feature also assists with avoiding the pairing of incompatible modules. According to one embodiment of the disclosure, the pattern or color may be included as part of the module manufacturing process by simply selecting the fabrication material to be of a certain color. The exterior of vehicle 100 modules may optional include reflective tape or material to assist with locating and retrieving vehicle 100.

At the conclusion of a mission, the modules can be separated from each other and returned to storage for later use and configuration of a new vehicle. To separate the attached modules, the modules are simply rotated in an opposite direction from the direction of attachment. In the embodiment of FIGS. 5A-5C, this act causes pins 520 to unseat from and clear pin slots 530. In the embodiment of FIGS. 5D-5E, male connector 550 is simply unscrewed from female end 560. The construction of the male and female connectors as shown does not damage or introduce wear on any of power buses 105 or data buses 106, 107.

1.2 Module Data Bus and Electrical Distribution System

Vehicle 100 may optionally include an electrical distribution system in the form of a power bus 105; and a data bus 106, and 107 for routing electrical power and data between modules. In a preferred embodiment of the disclosure, power and data buses 105, 106 and 107 comprise a Controller Area Network (CAN) bus commonly used in modern automobiles and described in the document: "CAN Bus Explained-A Simple Intro (2020)" by CSS Electronics and in "Introduction to the Controller Area Network," by Texas Instruments; the complete contents of which are incorporated herein by reference.

One advantage of the CAN bus architecture is that it permits microcontrollers to communicate with each other and share data between applications without the need for an additional host computer. The CAN message based system ranks vehicle commands according to the CAN bus defined logic and gives priority on the CAN bus to urgent commands followed by lower priority message traffic.

FIG. 5B shows an end view of the female connector portion 510 of FIG. 5A in which a CAN bus architecture can be seen. The CAN bus includes two wires CAN-High (CAN-H) 107 and CAN-low (CAN-L) 106 for carrying data signals. FIG. 5B also shows power bus 105. Other bus systems known to those of skill in the art may be employed, such as for example, an ARINC 429 bus or IEEE 802.11 architectures.

According to a preferred embodiment of the disclosure, the electrical distribution system of vehicle 100 includes two wires (+/−) 105 that form the power bus. The power bus nominally carries 30 volts DC at 20 amps. Power can be supplied by batteries within each module or a single battery module that routes power via the power bus 105 to connected modules. A solar cell may also be included on the power module to recharge the batteries or to supply power directly.

1.3 Magnets for Modular External Elements, Transit, and Drive Systems

In prior art vehicles external devices and attachments must mate with the main body of the vehicle via a shaft or other mechanical attachment that penetrates the hull. The hull penetrations of the prior art allow dirt and particulate to enter the interior of the vehicle. These contaminants can in turn compromise the electrical contacts between connectors and circuitry on the interior of the vehicle. Buildup of these contaminants in the form of grime, can also foul the operation of moving parts within the vehicle. When the vehicle comprises a UUV, the interior of the vehicle must be sealed off to prevent the ingress of seawater and prevent capsize or loss of the vehicle.

Hull penetrations, especially those for transmission of motion, must therefore be carefully designed and maintained. Hull penetrations thus add significant cost to vehicle design, fabrication, and maintenance. Prior art methods for sealing hull penetrations rely on a combination of epoxy "potting", requiring semi-permanent assemblies; elastomer seals, which can degrade with time; or novel mechanical sealing methods, requiring stringent design and fabrication considerations. When the vehicle is a UUV, even partial failure of these seals provides an avenue for water ingress that endangers sensitive electronics or corrodes internal components.

The magnetically coupled drive systems and control surfaces of the present disclosure eliminate the costs and failure points related to shaft seals and hull penetrations in prior art unmanned vehicles. A configurable vehicle according to the present disclosure minimizes or eliminates the need for hull penetrations by employing magnetics to attach certain configurable components to the exterior of the vehicle. Magnets may also be employed in the drive and propulsion system of the vehicle to provide similar advantages in minimizing hull penetrations while additionally providing an efficient and pollution free means of vehicle propulsion.

1.3.1 Overview of Magnets and Diametric Magnet Principles

Figure 6A:
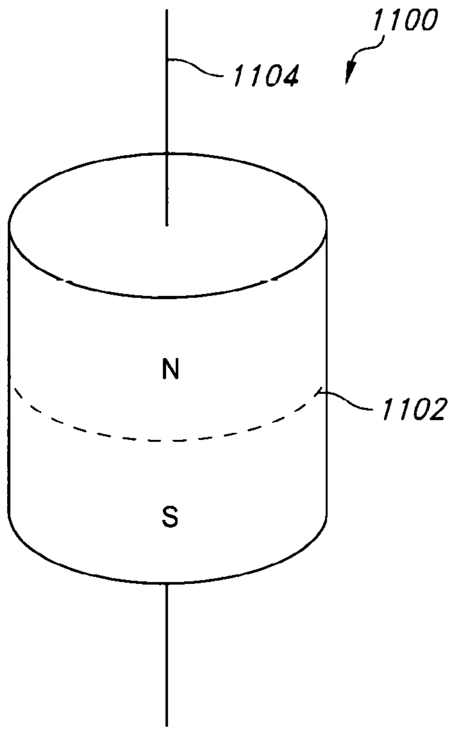
FIGS. 6A-6D is an illustration of axially and diametrically magnetized magnets and their operation according to embodiments of the disclosure.
Figure 6C:
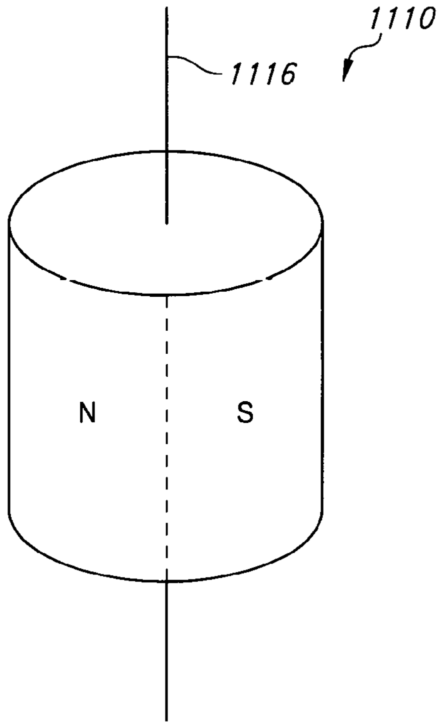
Figure 6B:
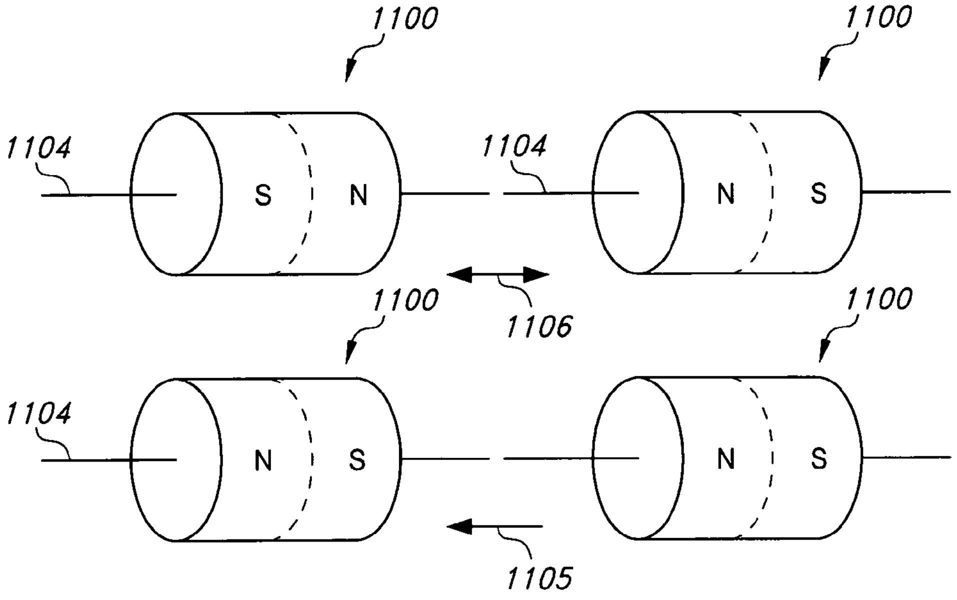

FIGS. 6A-D show a brief explanation of ways in which a magnet may be magnetized. According to a first method in FIG. 6A, an axially magnetized magnet 1100 is magnetized along a horizontal axis 1102, where N and S poles are on either the top or bottom. When two axially magnetized magnets 1100 are aligned about axis 1104 with opposite poles facing each other as shown in FIG. 6B the magnets attract and a magnetic force 1105 pulls the two magnets toward each other. When two magnets 1100 are aligned about axis 1104 with similar poles facing each other, a magnetic force 1106 repels the magnets away in opposite directions, as also illustrated in FIG. 6B.

According to a second method for polarizing magnets, illustrated in FIG. 6C, diametrically magnetized magnets 1110 are magnetized to create N and S poles along the left and right sides of a vertical axis 1116. As illustrated in 6D, the principles of magnetic attraction and repulsion previously illustrated in FIG. 6B, can be used by magnets 1100 and 1110 to position, drive, or release apparatus by setting magnets in motion relative to each other.

Figure 6D:
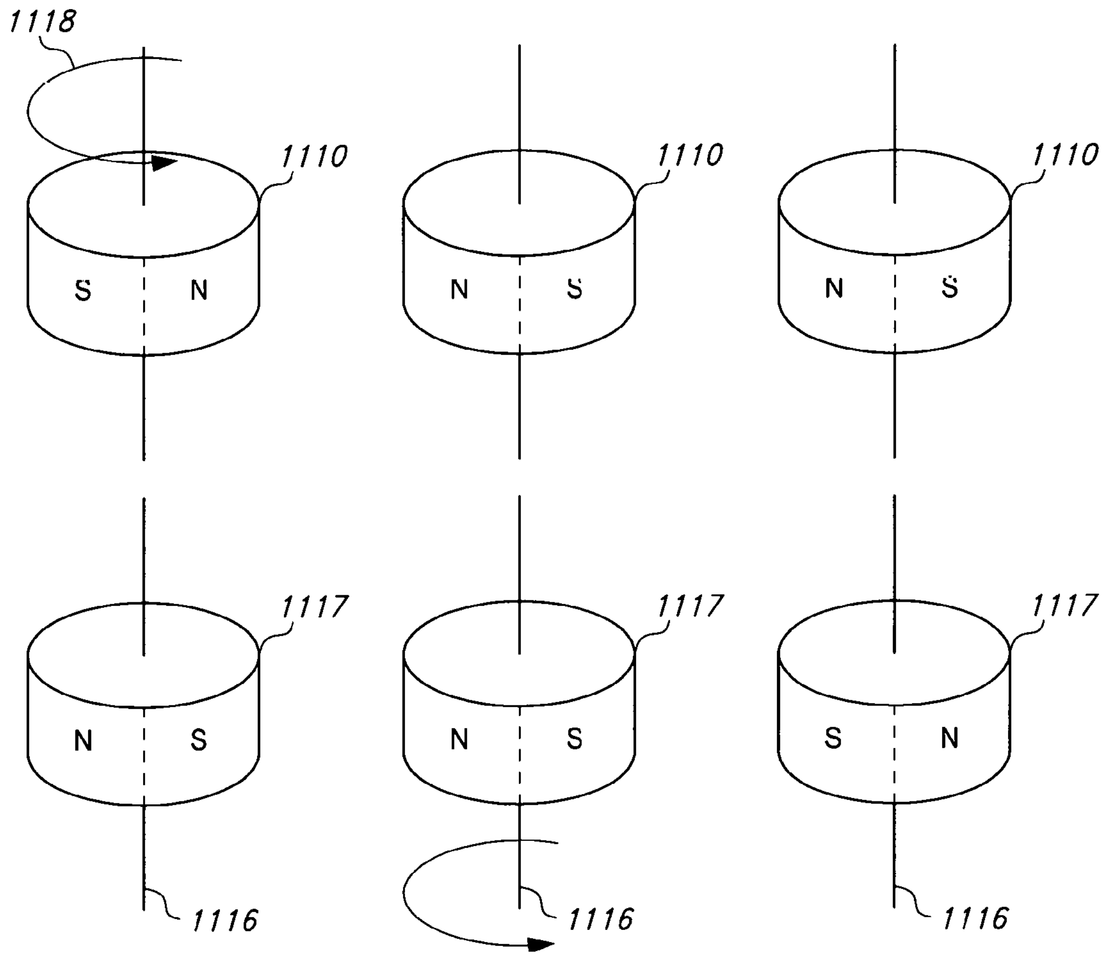

In FIG. 6D, when a first diametrically magnetized magnet 1110 spins about axis 1116, and a second diametrically magnetized magnet 1117 spins in the same direction 1118 at the same rate, the opposite N-S poles try to remain aligned. When one magnet, e.g. 1110 accelerates or stops, a repulsive force caused leg similar (N-N) poles temporarily being in alignment causes the remaining magnet 1117 to spin to re-achieve an alignment of opposite N-S poles. Spinning diametrically magnetized magnets in this manner is leveraged by the disclosure to eliminate the need for hull penetrations that would otherwise be needed in the prior art to attach or actuate moving parts such as for example, for propulsion, payloads, ballasting systems, or control surfaces. The forces created by attraction of opposite magnetic poles; and the repulsion of similar magnetic poles is also used by embodiments of the disclosure to secure fixed or non-moveable modular elements to the exterior of the vehicle.

According to an embodiment of the disclosure, diametrically magnetized neodymium magnets 1100 and 1110 comprise of neodymium iron boron (NdFeB) magnets due to the strength of their magnetic field compared to their size. Although magnets 1100 and 1110 are shown in FIG. 6 as cylindrical, any shape magnet may be diametrically magnetized.

1.3.2 Mounting Fixed External Configurable Elements to Modules

Figure 7:
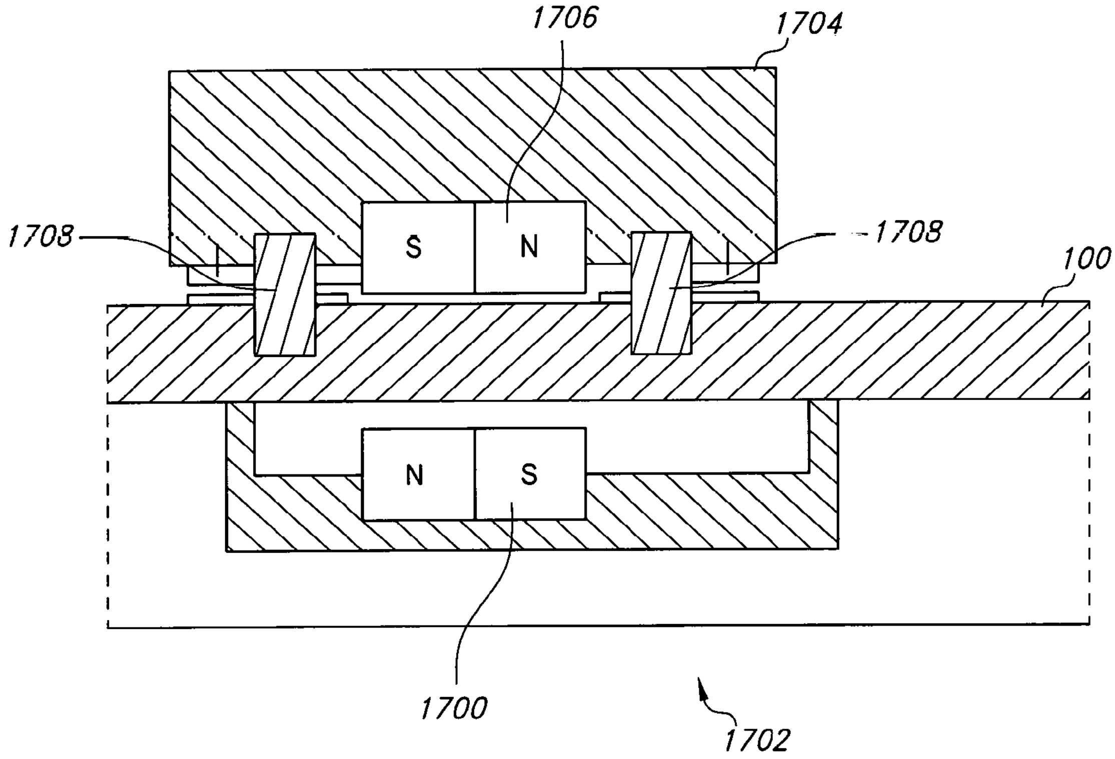
FIG. 7 is a cross sectional view of a mechanism for attaching fixed external configurable elements to a configurable autonomous vehicle according to an embodiment of the disclosure.

The alignment of opposite magnetic force and the creation of an attracting magnetic force can be used to secure a fixed configurable element to the exterior of vehicle 100 as shown in FIG. 7. In FIG. 7 a magnet 1700 having a first pole orientation is located on the interior of vehicle 100 proximate to the location 1702 where a modular part 1704 is to be fixedly mounted. A plurality of attachment locations 1702 may be included along the periphery of vehicle 100 and its component modules. Modular part 1704 is shown as a payload or ballast in FIG. 7, but can be any type of modular attachment desired such as for example cargo, sensor package, or a communications package, or a camera.

On the interior of modular part/element 1704, is a magnet 1706. Magnet 1706 comprises a diametrically polarized magnet with opposite polarity to magnet 1700. When element 1704 is mated with vehicle 100, magnet 1706 sits proximate to magnet 1700. As modular part 1704 is brought into proximity to the mating surface on vehicle 100, magnets 1700 and 1706 attract and the resulting magnetic force secures and holds external configurable element 1704 into place. An optional pair of guide and locking pins 1708 can be used to align element 1704 and magnets 1706 and 1700. Pins 1708 also provide additional mechanical attachment of element 1704 to the hull of vehicle 100.

Fixed external elements attached externally to vehicle 100 may include a variety of objects and types of devices. These external elements may include, but are not limited to, landing feet of various types and sizes, externally carried payloads or ballast, fixed position antennae, cameras, sensors, or fixed control surfaces. As will be apparent to those of ordinary skill in the art, other types of external fixed elements may also be attached to vehicle 100 using the method and apparatus described above.

1.3.3 Mounting Detachable Elements to Modules

Figure 8:
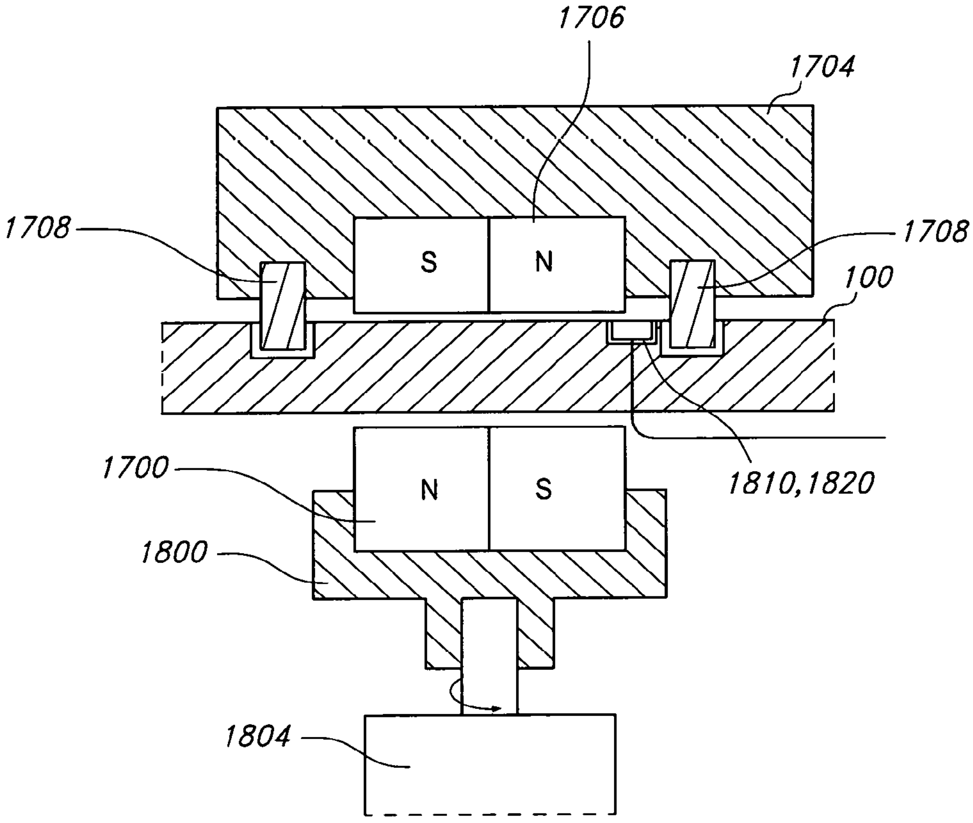
FIG. 8 is a cross sectional view of a mechanism for attaching and detaching releasable external configurable elements to/from a configurable autonomous vehicle according to an embodiment of the disclosure.
Figure 9:
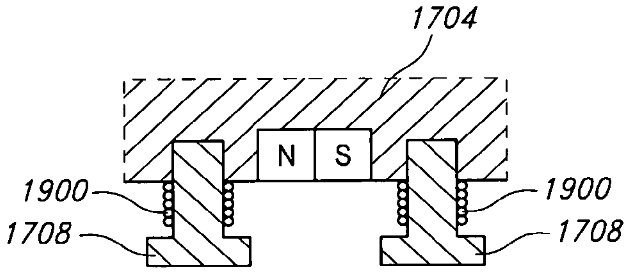
FIG. 9 is cross section of coil spring releasing mechanism according to an embodiment of the disclosure.
Figure 10:
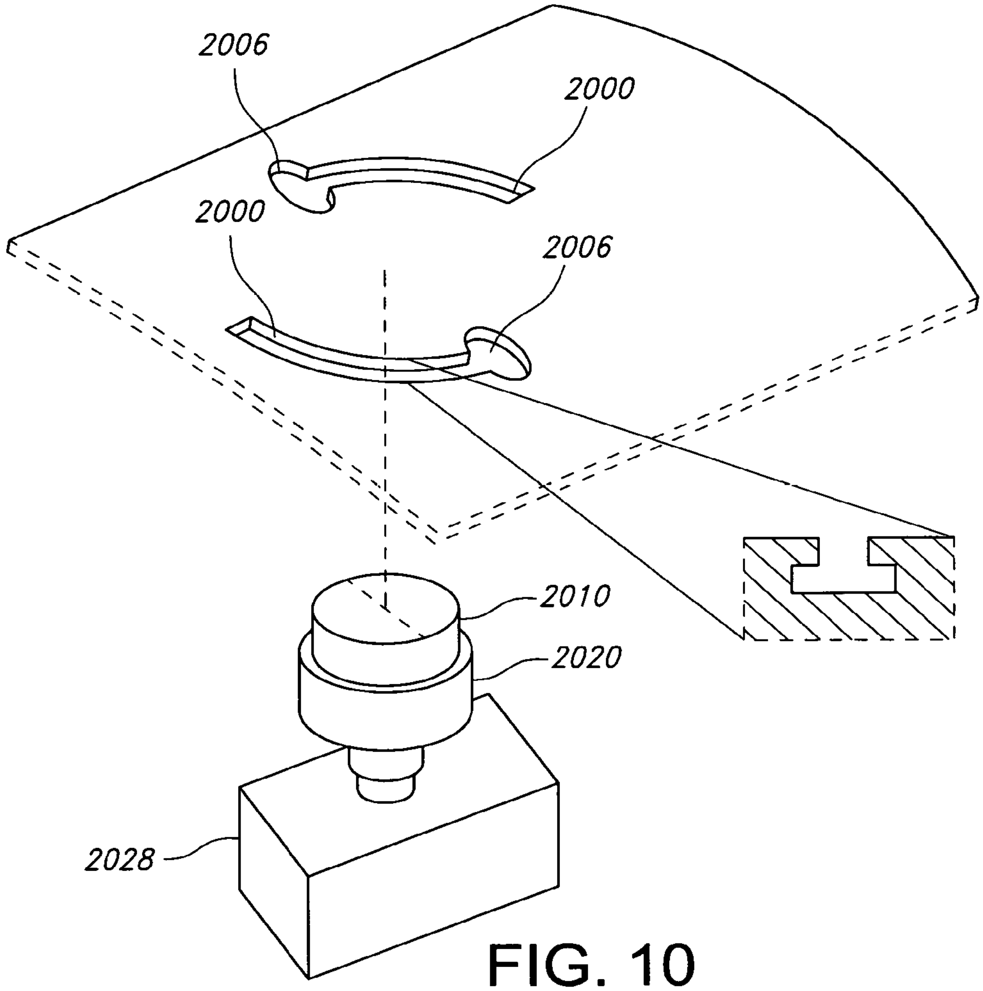
FIG. 10 is a perspective and cross sectional views of a mechanism for attaching and releasing a configurable element from a configurable autonomous vehicle according to an alternative embodiment of the disclosure.

The attachment mechanism of FIG. 7 can be further modified such that elements may be detachably secured to vehicle 100 as shown in FIGS. 8-10. Although the discussion of FIGS. 8-10 describes ballast or cargo as the detachable element, the principles apply to any element that can be commanded to detach or release from the vehicle. The mechanisms of FIGS. 8-10 may also be used to carry and release cargo or other payloads in lieu of or in addition to ballast.

In the mechanism of FIG. 8 magnets 1700 located on the interior of vehicle 100 are no longer secured to the hull in a fixed manner as was shown in FIG. 7. Magnets 1700 now reside in an actuator coupling 1800 which couples to a servo/actuator 1804. In operation, a release command signal causes servo/actuator 1804 to turn clockwise or counter-clockwise. As magnets 1700 rotate, the attractive force of the original N/S and S/N opposite pole pairing as drawn reverses and becomes a repelling force. The repelling force jettisons payload 1704 from vehicle 100.

Also shown in FIG. 8 is an optional Hall Effect sensor 1810. Hall Effect sensor 1810 is embedded in the exterior of hull 100, secured by epoxy, and covered by u metal shield. Hall Effect sensor 1810 detects when payload/ballast 1704 has been released by detecting the presence or absence of the magnetic field between diametrically magnetized neodymium magnets 1700 and 1706. As known to those of ordinary skill in the art, u metal shields electronics from low-frequency or static magnetic fields. A shield 1820, formed of u metal or other magnetically shielding material, covers Hall Effect sensor 1810 to eliminate interference from the magnetic field created by magnets 1700 and 1706.

In an alternative embodiment of the disclosure, as shown in FIG. 9 an optional coiled spring 1900 may be integrated into the payload/ballast 1704 or into hull 100 to facilitate movement away from hull 100. When servo/actuator 1804 of FIG. 8 rotates magnets 1700; magnets 1706 of module 1704 also try to rotate to maintain the initial opposite pole alignment. This motion, however, is constrained by locking pins 1708. This torque causes springs 1900 of FIG. 9 to coil. As the like poles align, repel one another, and release the payload, coiled spring 1900 uncoils and helps to propel module 1704 away from hull 100.

FIG. 10 illustrates yet another alternative embodiment that may also be used to carry and release detachable modules according to the disclosure. In the embodiment of FIG. 10 detachable element 1704 comprises magnets 1706 as previously shown, plus a plurality of locking pins 1708. The heads of locking pins 1708 are slightly larger than a locking track guide 2000 cut into the hull of vehicle 100. The heads of locking pins 1708 are also smaller than opening 2006 at the terminus of locking track guide 2006.

Detachable element 1704 secures to vehicle 100 by inserting pins 1708 in the guides 2000. The detachable element assembly is slid in track guide 2000 until element magnet 1706 is of substantial opposite polarity to a magnet 2010 located on the interior of vehicle 100 and proximate element 1704. The attractive force holds element 1704 in place.

As shown in FIG. 10, magnet 2010 is coupled to a servo/actuator coupling 2020. Servo/actuator coupling 2020 is in turn coupled to a servo/actuator 2028. To automatically release or detach element 1704, servo/actuator 2028 receives a command from vehicle 100 and turns thereby rotating magnet 2010. Inside payload 1704, magnets 1706 start to rotate in an effort to maintain the original N/S and S/N opposite pole alignment. This action causes the detachable element assembly and its locking pins 1708, to slide along track 2000 until pins 1708 reach opening 2006. When the like poles of element magnet 1706 and magnet 2010 align, the repelling force ejects element 1704 and pins 1708 clear through opening 2006.

In one alternate embodiment of the disclosure, locking track pins 1708 are slightly longer than the depth of locking track 2000. Ejection assist springs 1900 of FIG. 9 may optionally be included in the release mechanism of FIG. 10. Ejection assist springs 1708 compress up toward element 1704 when element 1704 is attached to hull 100. Once locking track pins 1708 reach opening 2006 of locking track 2000, ejection assist springs 1708 uncoil rapidly, propelling element 1704 away. The release mechanism of FIG. 10 may also operationally include a Hall Effect sensor to detect the release of detachable element 1704.

1.3.4 Payload and Ballast Modules

One specialized type pf releasable element is ballast. When vehicle 100 comprises an UUV, one method for controlling the depth of the UUV is via use of releasable ballast. Buoyancy is the upward force on an object when that object is placed in water. When vehicle 100 is neutrally buoyant, the density of vehicle 100 equals the density of the water and there is no net upward buoyancy force. Vehicle 100 is at equilibrium and remains at the depth it is placed. When vehicle 100 is negatively buoyant, vehicle 100 sinks. When vehicle 100 is positively buoyant, vehicle 100 rises upward in the water and may surface.

Large, manned submarines utilize these same buoyancy principles. A submarine maintaining a specific depth has equalized the mixture of water and air in its ballast tanks to match the density of the surrounding water. When the submarine wishes to surface, the submarine uses a blast of high pressure air to purge water from the ballast tanks. The air replaces any water in the ballast tanks. The ballast tank air is less dense than the ocean water and the sub rises to the surface.

Pressurized air ballast systems like those used in submarines are possible but such systems are inherently complex, require extensive maintenance and thus also add to the cost of owning and acquiring a UUV. Thrusters, or control surfaces such as bow planes in combination with propulsion systems can be used to overcome forces of buoyancy to force UUV 100 to maintain the desired depth. The UUVs 200 and 250 of FIG. 2 include thrusters 220 which can be employed for this purpose. Use of thrusters or the vehicle propulsion system consumes fuel or other supplies of onboard energy and limits vehicle mission endurance.

According to one embodiment of the disclosure, UUV 100 includes a simple ballast module with releasable ballast weights. When the operator wants the UUV to seek and maintain a specific depth, the operator can assemble UUV 100 to include one or more ballast modules of sufficient weight. When UUV 100 is subsequently placed in the water, UUV 100 will then sink to the depth at which the total combined weight of UUV 100 and the ballast equals the density of the water. When UUV 100 wishes to rise up to a higher level or to surface, the onboard vehicle command and control system can command UUV 100 to release ballast from one or more ballast modules to attain the new desired depth or to surface. The use of ballast modules to manage the depth of UUV 100 decreases UUV 100's energy consumption budget and increases mission endurance. When a ballast module is used, UUV 100 need only use its propulsion and control surface systems to maneuver and such systems are not needed to maintain or attain a specific depth or to surface from depth.

In one embodiment of the disclosure, vehicle 100 includes a ballast module having a magnetically coupled ballasting system. The magnetically coupled ballasting system allows ballasts of different weights to be attached to and released from the ballast module using a release mechanism such as, for example, those described in FIGS. 8-10. In operation, the operator of UUV 100 may select a detachable ballast module having a desired weight; or including a releasable sled loaded with weights sufficient to attain the desired depth of operation. A UUV 100 comprising the releasable ballast module or releasable sled of weights taught by the present disclosure glides down to a pre-determined depth where it is neutrally buoyant. UUV 100 then maneuvers and conducts its operations at depth. When UUV 100 completes operations at that depth, UUV 100 commands release of the ballast to attain a second depth or to surface.

Multiple ballast modules or multiple sleds having weights in releasable lots of known amounts can be included in the composition of vehicle 100. The use of multiple ballast modules or groups of weights on sleds allows vehicle 100 to execute a mission profile inclusive of multiple depths of operation. Vehicle 100 simply commands the release of ballast to attain the next operating depth in the mission profile.

1.3.5 Parasitic Ferry Transfer and Parasitic Station Keeping

The release mechanisms of FIGS. 8-10 can also be employed in reverse such that vehicle 100 becomes the detachable item secured and then released from a ferry vehicle; or attached to a fixed structure. This mode of operation is advantageous when vehicle 100 cannot self-navigate from the point of assembly to the point of use. Such circumstances can arise when there are in route hazards e.g. wave heights that exceed the operating parameters of vehicle 100. Use of a parasitic ferry transfer may also be advantageous when the distance between the point of assembly and the point of use exceeds the capability of vehicle 100 to both transit that distance and execute the mission.

Use of a parasitic ferry transfer can also be employed to retrieve and return vehicle 100 from its point of use. After completion of a mission, vehicle 100 can navigate to a ferry vehicle and attach itself. The ferry vehicle inclusive of vehicle 100 can then return the vehicle to its intended destination. These types of operations also permit vehicle 100 to stay on station longer and execute mission profiles of longer duration than would be possible if vehicle 100 used its own energy stores to transit. Use of a parasitic ferry also can be used for emergency recovery of vehicle 100.

Figure 11A:
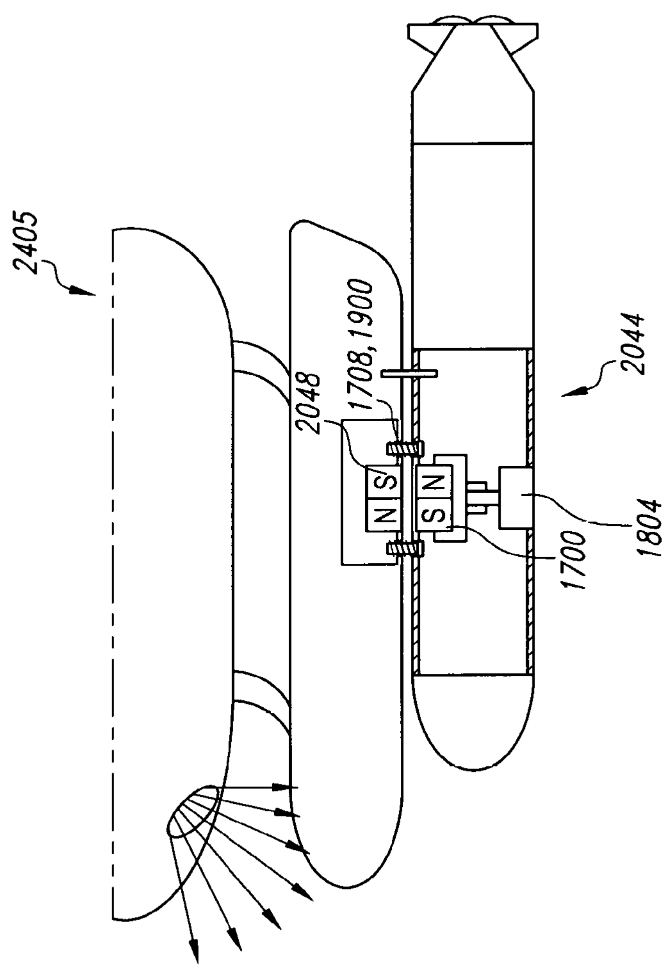
FIGS. 11A-11F illustrate parasitic transport and station keeping of a field configurable vehicle according to embodiments of the disclosure.
Figure 11B:
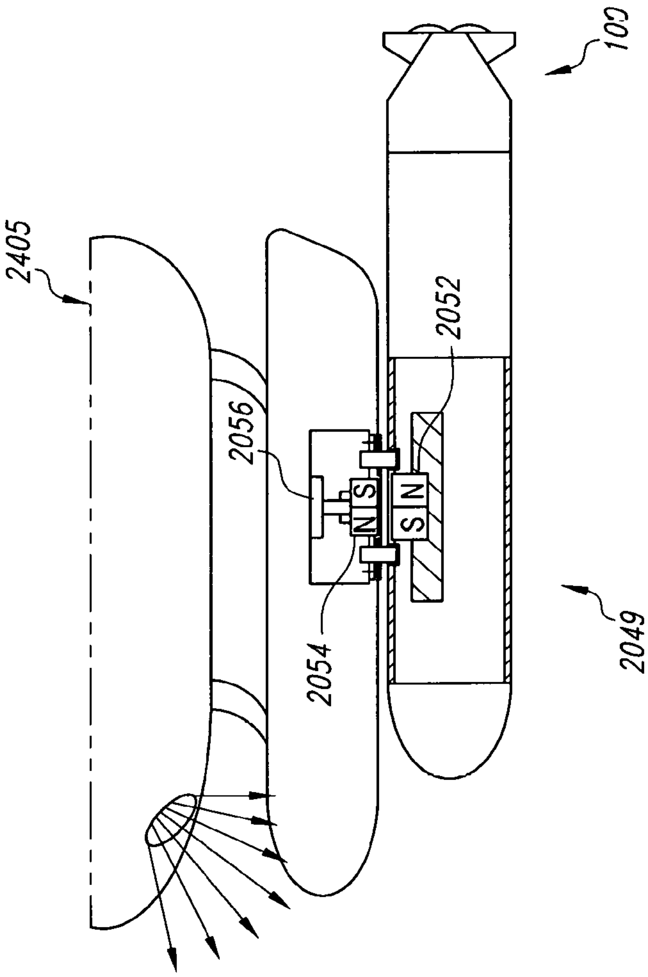

For parasitic ferry operation, vehicle 100 can include a module including the release mechanism of the embodiments shown and described in connection with FIGS. 8 and 9; and may also include Hall Effect sensors to detect and communicate the presence or absence of the parasitic ferry vehicle. FIG. 11A illustrates possible embodiment and use of a detachable/release mechanism for ferry operation. FIG. 11A shows vehicle 100 including module 2044 parasitically attached to a ferry vehicle 2045. In the embodiment of FIG. 11A, ferry 2045 includes a diametrically magnetized magnet 2048 and locking pins 1708, which also may include optional springs 1900. Vehicle 100 can be attached and secured by the operator by attaching vehicle 100 to ferry 2045 at the location of magnet 1700. When vehicle 100 reaches the point of release, vehicle 100 commands actuator 1804 to rotate, and the resulting motion of magnets 1700 creates a repelling force that separates vehicle 100 from ferry 2045. Ferry 2045 can optionally include a vertical guide post that prevents the attached vehicle 100 from rotating during release.

To autonomously reattach or attach vehicle 100 to ferry 2045, vehicle 100 navigates alongside ferry 2045. Guide pins 1708 engage with the hull of vehicle 100 at the corresponding location along the hull exterior. When entering the docking mode, servo 1804 has already commanded magnets 1700 to an orientation with poles opposite the fixed location of the poles of magnets 2048. This attractive magnetic force assists with guiding vehicle 100 to proper location on ferry 2045 and alignment with the locking pins.

The opposite construction is also possible as shown in FIG. 11 B. In FIG. 11B, vehicle 100 contains a module 2049 having fixed magnets 2052. Rotating magnets 2054 and a servo 2056 are located aboard ferry 2045. Any of the unoccupied magnetized locations and attach points on vehicle 100 will serve as a suitable mating spot for pairing with magnets 2054. When vehicle 100 is to be released, ferry 2054 rather than vehicle 100 initiates the command for separation. Once released, vehicle 100 executes its mission.

Figure 11C:
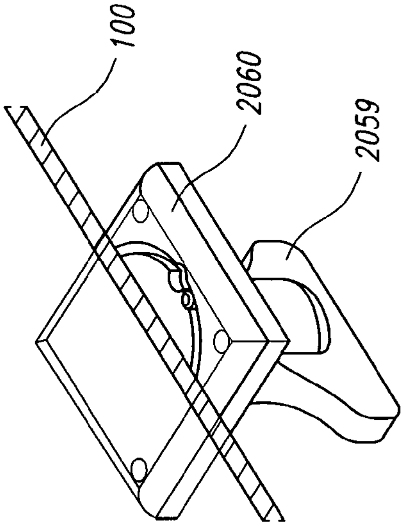
Figure 11D:
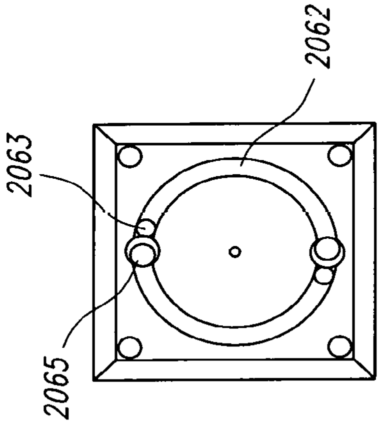
Figure 11E:
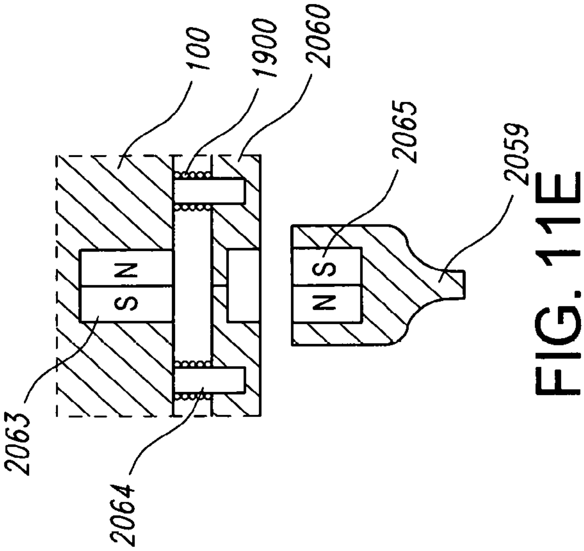

FIGS. 11C-E shows a cross section of yet another ferry or structured attachment mechanism that can include a manual release key 2059 located inside ferry 2045. In the embodiment of FIG. 11C, key 2059 couples to a pivotable adapter 2060 having guide tracks 2062. Mating pins 2064 having springs 1900, can be located on vehicle 100 and fit into guide tracks 2062. In FIGS. 11C-E, adaptor 2060 is shown located on ferry vehicle 2045. Reattaching or attaching vehicle 100 to ferry 2045 works as described in the previous paragraph.

Use of the adaptor prevents the entire ferry vehicle 2054 or vehicle 100 from rotating in the guide tracks 2062. As drawn in FIG. 11D, when vehicle 100 is to be released, the operator turns key 2059 to rotate magnets 2063 which causes adaptor 2060 to rotate and pins 2064 to move inside the vehicle guide tracks 2062 until reaching stop 2063. The rotational stop prevents vehicle 100 from rotating while adapter 2060 rotates in slots 2062. Magnets 2063 and 2054 are then in a N/N and S/S alignment and pins 2064 align with ejection cavity 2065. Vehicle 100 is then pushed away from ferry 2060 by repelling force of the repositioned magnets. Reattaching or attaching vehicle 100 to the ferry via the release mechanism just described simply works in reverse. Manually turned key 2059, can also be replaced by a servo mechanism to turn adapter 2060 as illustrated in previous embodiments.

Figure 11F:
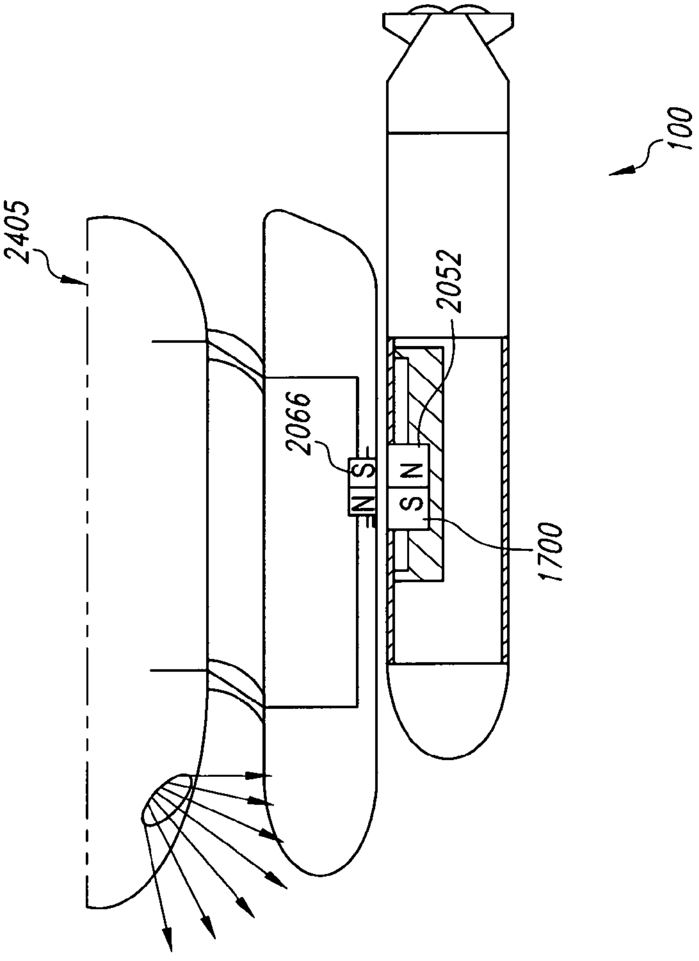

A third option for using magnets for parasitic ferry transport is the mechanism shown in FIG. 11F. In this embodiment, one or more energized magnets 2066 is included in the nonferrous body of ferry 2045. When magnet 2066 is energized, any of the fixed magnet structures 1700 of FIG. 7 included in vehicle 100 and not otherwise occupied; or optionally, any of the unoccupied magnet structures 2010 or 1700 of FIGS. 10 and 8; will be attracted to energized magnets 2066. Once vehicle 100 navigates near enough to ferry 2045 it may be "captured" by the energized magnet 2066 without worrying about alignment of pins 1708. Optionally, an operator may place vehicle 100 proximate to energized magnets 2066 to secure vehicle 100 to ferry 2045 for transport. To release vehicle 100, ferry 2045 or the operator simply commands magnets 2066 be de-energized. Upon that event, the magnetic attraction ceases and vehicle 100 drifts away from ferry 2045, free to execute its mission.

Any of the parasitic ferrying methods described in connection with FIGS. 11A-11F may also be used to affix vehicle 100 to a stationary object. The sole difference being that instead of a moveable ferry 2045; a fixed object such as a buoy, oil rig, wharf, or other structure is substituted therefor. Navigating to and then attaching itself to a fixed structure allows vehicle 100 to be easily retrieved from a known location. Navigating to and then attaching itself to a fixed structure also allows vehicle 100 to proceed to a test or observation location, remain there without expending energy to station-keep, detach itself and return. When vehicle 100 is used for collection of scientific data from remote locations, attaching at a fixed and determinate location often aids in the precision measurement of results.

1.3.6 Mounting Moveable External Configurable Elements to Modules

Various control surfaces on vehicle 100 can be used to adjust the pitch, roll, or yaw of the vehicle. As previously illustrated in FIGS. 1-2, when vehicle 100 comprises an UUV, the control surfaces may include a sail plane or a dorsal fin 120, flippers 122, rudders and stabilizers 124. Moveable external configurable elements such as control surfaces help to steer vehicle 100 and to control motion about the pitch, roll, and yaw axis. Any number or different types of control surfaces or moveable external elements may be mounted to vehicle 100 modules. Other types of moveable external configurable elements may include, for example, a camera, or antennae. The modularity of the present disclosure permits different types, sizes, shapes and characteristics of moveable external control surfaces and elements to be attached as desired to configure vehicle 100 as wished.

In the prior art, these moveable control surfaces are controlled through drivetrains and shafts penetrating through the hull of vehicle 100, requiring the use of epoxies and other sealants to prevent water from entering the interior of the hull at the point of penetration. Epoxies and other sealants degrade over time, causing avenues for water and other contaminants to enter the interior of vehicle 100 and damage sensitive electronics. Magnetically coupled control surfaces eliminate these avenues by removing the need to penetrate the hull.

Figure 12:
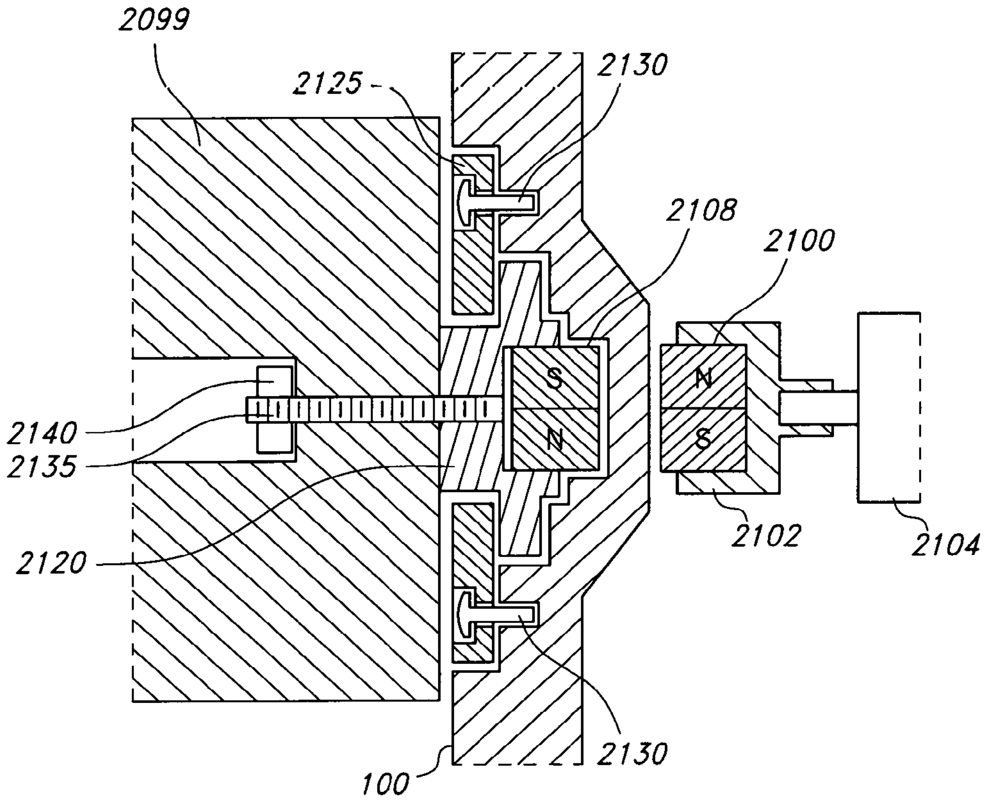
FIG. 12 is a cross sectional view of a mechanism for coupling a moveable element or control surface to a configurable autonomous vehicle according to an embodiment of the disclosure.

FIG. 12 illustrates a magnetically coupled control surface or moveable/positionable element 2099. Inside of vehicle 100, an internal diametrically magnetized neodymium magnet 2100, adhered with epoxy to a coupler 2102, couples to servo/actuator 2104 the motion of which moves magnet 2100 to control the positon of element 2099. A second diametrically magnetized neodymium magnet 2108 is adhered with epoxy to a control surface coupling 2120. A coupling retainer 2125 holds control surface coupling 2120 against hull 100. Control surface coupling retainer 2125 reduces the chances of losing control surface 2120 to over-oscillation or impact. According to one possible embodiment of the disclosure, coupling retainer 2125 secures to hull 100 by several control surface coupling retainer fastening bolts 2130 which do not penetrate the hull.

A drive train shaft 2135 changes the position of control surface or moveable element 2099. Control surface drivetrain shaft 2135 couples to external diametrically magnetized neodymium magnet 2108 through control surface coupling 2120. A nut 2140 located at the end of control surface drivetrain shaft 2135 secures control surface/moveable element 2099 to drive shaft 2135.

In the embodiment as drawn in FIG. 12 parts 2099 and 2120 are shown as separate parts. Parts 2099 and 2120 may, however, be fabricated as a single piece. When parts 2099 and 2120 are fabricated as a single piece, drive shaft 2135 and nut 2140 are no longer necessary. As magnet 2108 rotates, the combined assembly of parts 2120 and control surface/moveable element 2099 also rotates. Such a construction reduces the total number of parts comprising the moveable element or control surface and may reduce overall cost and complexity.

In operation, a signal is sent from vehicle 100 command and control system to servo/actuator 2104. Servo/actuator 2104 is capable of turning coupling 2102 in either a clockwise or counter-clockwise direction. As internal diametrically magnetized neodymium magnet 2100 rotates, external diametrically magnetized neodymium magnet 2108 starts to rotate, as both magnets try to keep a N/S and S/N pairing. The motion of magnet 2108 moves control surface 2099 via the motion of drive shaft 2135.

Although the previous paragraphs explain the construction and operation of moveable external attachments in the context of moveable control surfaces, the principles described above apply equally to the construction and operation of additional types of moveable/position-able external elements. For example, moveable external elements may additionally include thrusters, antennae and sensors that rotate and are moveably affixed to the exterior hull portion of vehicle 100.

1.3.7 Propulsion Module and Propulsion Systems

Attachment and drive systems similar to these shown in FIG. 12 may also be included in vehicle 100 to comprise propulsion systems and modules. As previously described in connection with both fixed and moveable external attachments, prior art propulsion assemblies require hull penetration for mechanically connecting the propeller assembly to the internal motors and drive systems. The configurable propulsion systems of the present disclosure avoid the need for such potentially problematic hull penetrations.

Prior art propulsion systems also typically include a shear pin. The shear pin breaks, or shears, whenever the propeller load exceeds a certain limit as might happen when the propeller stops turning because it has been fouled by seaweed or debris. If the motor kept commanding the propeller to rotate when it could not, the resulting torque would be transferred to the motor, and perhaps to the entire vehicle, causing significant and perhaps irreparable damage up to an including potential loss of the vehicle. The shear pin is designed to break and detach the propeller under these conditions to prevent such damage. When the shear pin breaks, however, the propeller is lost and the vehicle rendered without propulsion and unable to complete its mission. The configurable propulsion system of the present disclosure does not require a shear pin and recognizes and avoids the problems of the prior art.

Figures 13A, 13B:
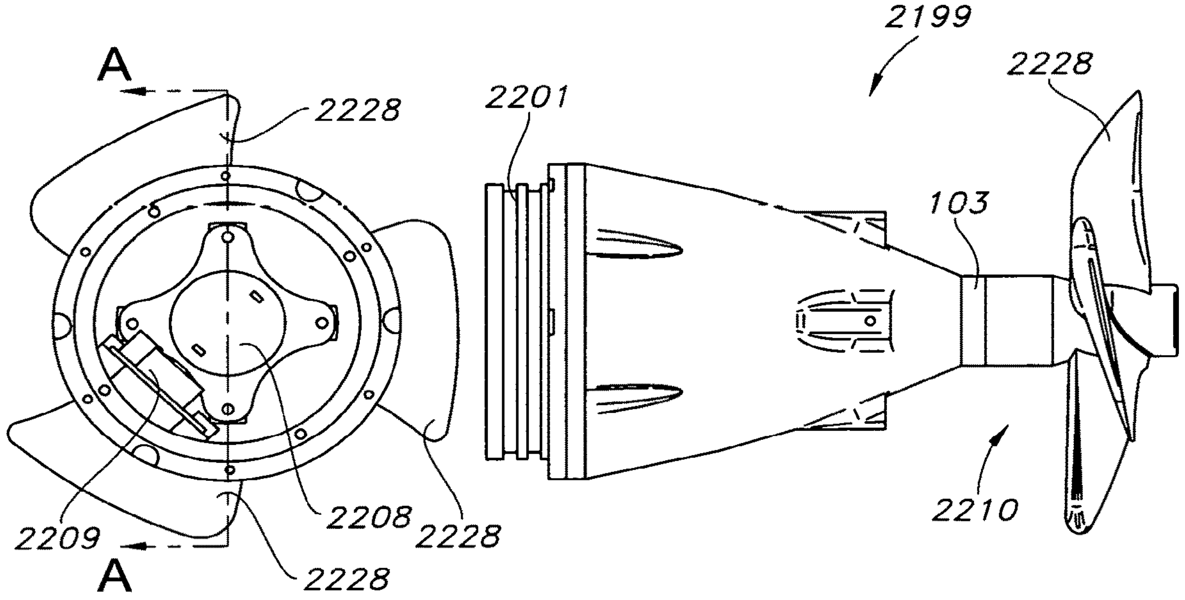
FIGS. 13A-13C are side end, and cross sectional views respectively of a propulsion module according to an embodiment of the disclosure.
Figure 13C:
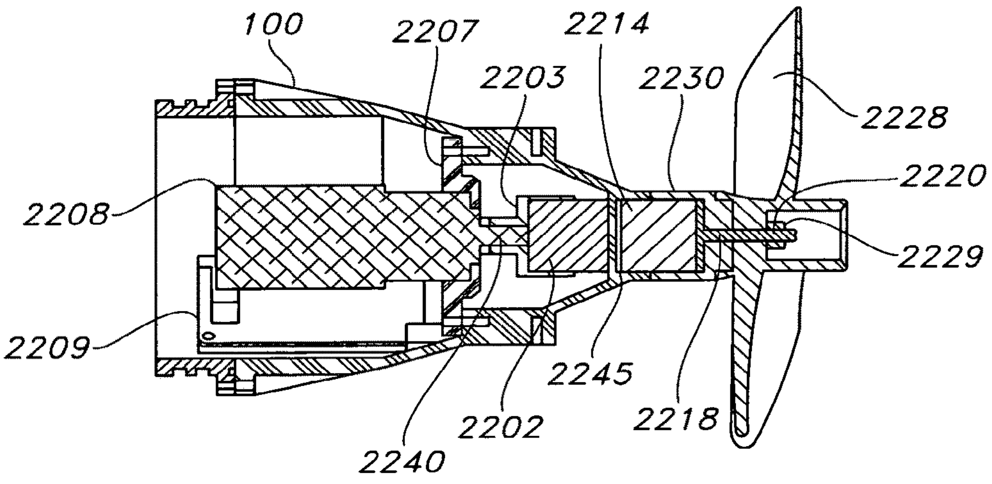

FIG. 13A shows a side view of a propulsion module 2199, FIG. 13B shows an end view, and FIG. 13C shows a cross sectional view. Propulsion module 2199 may include threads 2201 for attaching module 2199 to the remainder of vehicle 100. Although a threaded system such as that shown in FIGS. 5D-5F is shown in FIG. 13A, any mating system may be used including the systems of FIGS. 5A-5C.

Figure 13D:
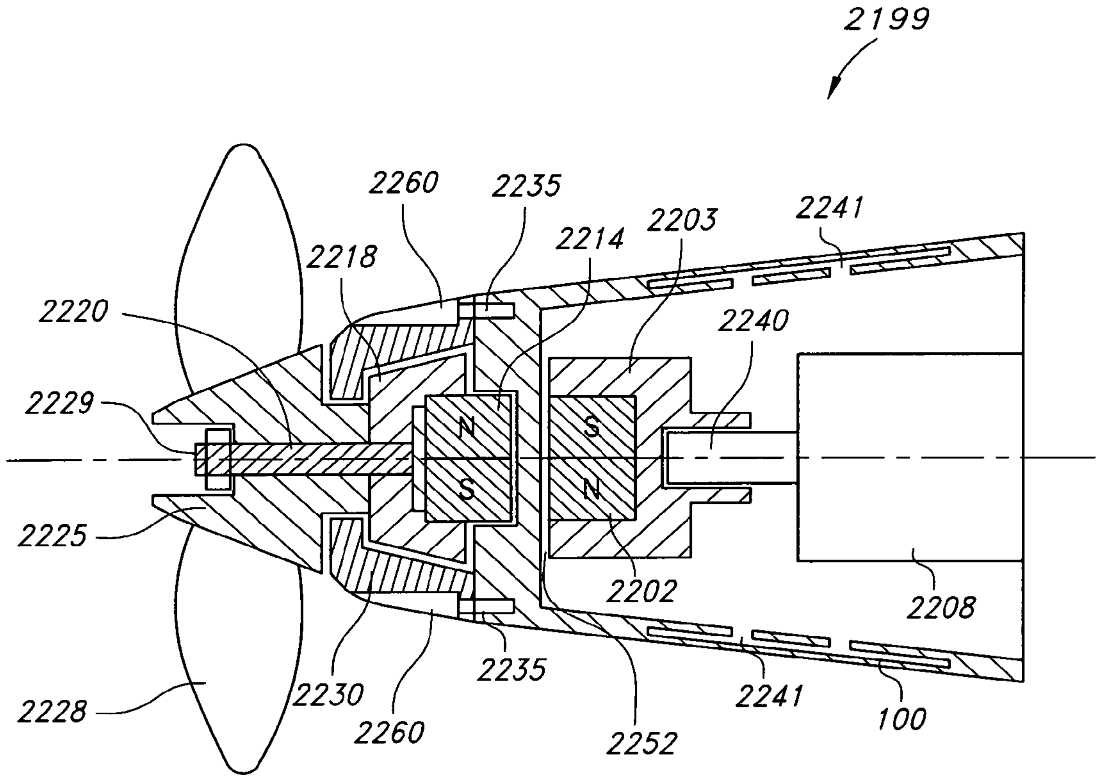
FIG. 13D is a cross sectional view of a propulsion module according to an alternative embodiment of the disclosure.

As seen in the end view of FIG. 13B and the cross sectional view of FIG. 13C, propulsion module 2199 includes components internal to hull 100: magnet 2202, servo coupler 2203, motor mount 2207, DC motor 2208, and motor controller 2209. FIG. 13D shows a cross sectional view of an alternative embodiment of propulsion module 2199 having these components arranged in an alternative construction. As shown in FIGS. 13B-13D, propulsion module 2199 additionally includes a propeller assembly 2210 that couples magnetically to the remaining portion of propulsion module 2199. The propeller assembly 2210 includes: a magnet 2214 which rests in coupler 2218 and which is coupled via a drive shaft 2220, which can be located internal to a propeller housing 2225, to a propeller 2228. A nut 2229 secures propeller 2228 to drive shaft 2220. A mechanical coupling 2230 includes fasteners 2235 (FIG. 13D) to secure assembly 2210 to the remainder of the propulsion module 2199. Mechanical coupling 2230 stabilizes the turning motion of propeller assembly 2210 and prevents it from vibrating off hull 100. Propulsion module 2199 may also include Hall Effect sensors (not shown in FIG. 13) as shown and described previously to detect the presence or absence of propeller assembly 2210 or of propeller 2228.

In operation, motor 2209 receives instructions from vehicle 100's command systems to introduce, increase, or decrease power to DC motor 2208. Rotating shaft 2240 causes internal diametrically magnetized neodymium magnet 2202 to rotate. Motor mount 2207 isolates DC Motor 2208 from the vibrations caused by spinning shaft 2240 and the magnet assembly.

Motor 2208 can generate a significant amount of heat during operation. As previously discussed, the interior volume of propulsion module 2199 can include engineered fluid for thermal management. As seen in the cross section of FIG. 13D, the walls of module 2199 can additionally include capillaries 2241 fluidly coupled to the interior volume of module 2199. Capillaries 2241 help transfer heat to the exterior of vehicle 100. The wall structure including capillaries 2241 can be designed for the needed structural strength according to techniques known to those of skill in the art. Incorporating capillaries 2241 into the wall of propulsion module 2199 or any other vehicle 100 module is achievable using any manufacturing technique, but is especially easy to build when employing additive manufacturing.

As DC motor 2208 rotates internal diametrically magnetized neodymium magnet 2202, magnet 2214 also rotates as both diametrically magnetized neodymium magnets strive to keep a N/S and S/N pole attraction. As magnet 2214 rotates, drive shaft 2220 turns causing propeller 2228 to spin. A Teflon or other wear surface 2245 (FIG. 13C) may optionally be included to minimize friction and wear between propeller assembly 2210 and the remainder of propulsion assembly 2199.

An airgap 2252 exists between the rotating magnets and the hull or part exterior. In the absence of airgap 2252, internal diametrically magnetized neodymium magnet 2202 and external diametrically magnetized neodymium magnets 2214, would bear against the exterior wall and rotate against it, wearing and eventually compromising the wall material. Inclusion of airgap 2252 reduces the wear on propulsion module 2199.

The fixed pitch propeller 2228 rotates to propel vehicle 100 to move forward. Changing the direction of rotation for propeller 2228 will propel vehicle 100 backward. A Hall Effect sensor (not shown in FIG. 13) located just below internal diametrically magnetized neodymium magnet 2202, measures the strength of the magnetic fields created by magnets 2202 and 2214. The measurements detected by the Hall Effect sensor are indicative of the proximity, position, and/or speed of the magnets and are especially useful for indicating propeller RPM. This data is communicated via data busses 106 and 107 the vehicle's command system to control operation of propulsion module 2199.

External retention collar 2230 helps to constrain motion of propeller assembly 2210 to the rotational direction and to minimize vibration and out of plane motions. Retention collar 2230 attaches to propulsion module 2199 by propeller caps 2260 and fasteners 2235. When vehicle 100 is in use, external retention collar 2230 makes vehicle 100 more resilient to impact, reducing the chances for propeller 2228 or propeller assembly 2210 to be dislodged.

As discussed in connection with FIG. 12, the overall complexity and part count for propulsion assembly 2210 can be reduced by eliminating nut 2229 and drive shaft 2220. Propeller housing 2225 and mechanical coupler 2218 can be fabricated as a single piece. In this configuration, when magnets 2214 rotate, the entire combined assembly rotates, thereby turning propeller 2228.

One advantage of the propulsion module of the present disclosure, is that when the propeller is fouled and cannot rotate, the propeller need not be severed from the vehicle or lost. If propeller 2228 stops rotating, drive magnet 2202 simply continues to rotate. The driven magnet, 2214 will "cog" or "slip" as it tries to maintain the N/S alignment, but this motion will not impose harmful torques on propeller assembly 2210, motor 2208, or the remainder of vehicle 100. Retainer pins 2235 will keep propeller assembly 2210 from detaching from the vehicle. Once the debris or object clears the propeller and it is no longer fouled, propeller assembly 2210 and propulsion module 2199 return to normal operation. The mission can be completed without the need to retrieve a stranded vehicle and replace the propeller. This advantage of the present disclosure also applies to moveable configurable elements such as moveable control surfaces that can also become fouled or impeded through their range of motion.

Figure 14A:
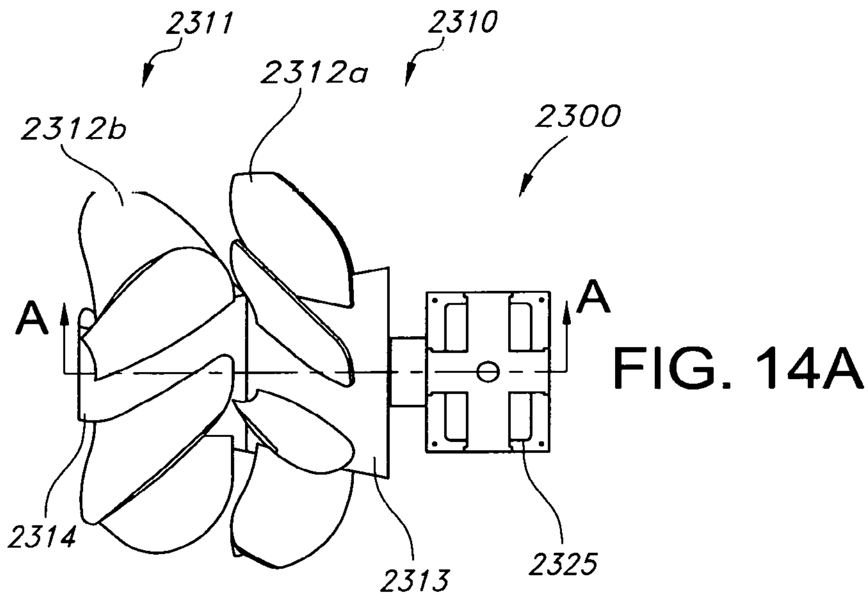
FIGS. 14A and 14B are illustrations of a counter rotating propeller assembly according to an embodiment of the disclosure.
Figure 14B:
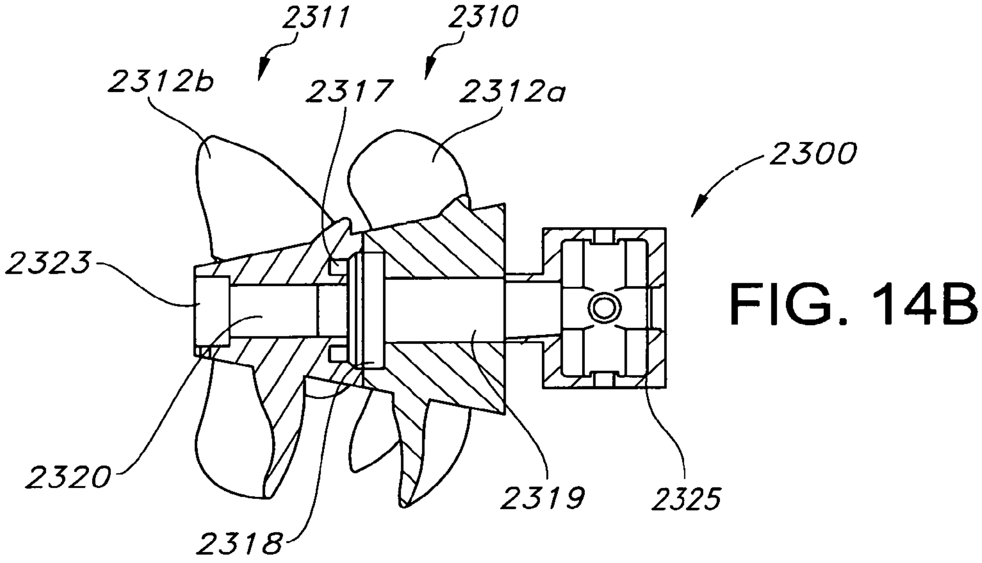

FIGS. 14A and 14B show an alternative embodiment of a propeller assembly 2300 having counter rotating propellers 2310 and 2311. Propellers 2310 and 2311 include a plurality of individual blades 2312*a* and 2312*b* secured to a housing. Blades 2312*a* and 2312*b* are preferably of substantially opposite pitch. As draw in FIG. 14A, the blades 2312 of propeller 2310 secure to housing 2313 and the blades of propeller 2311 secure to housing 2314. Housing 2313 is coupled to housing 2314 by bolts 2317 and plate 2318. Housings 2313 and 2314 as well as blades 2312 may be made using additive manufacturing techniques such as 3D printing.

As seen in the cross section of FIG. 14B, propeller assembly 2300 also includes a larger diameter inboard drive shaft 2319 and a smaller diameter shaft 2320. A nut 2323 at the end of drive shaft 2320 secures and retains housings 2313 and 2314. Smaller diameter shaft 2320 extends to fit inside larger diameter shaft 2319 and both shafts 2319 and 2320 couple to a bevel gear box 2325. Gear box 2325 contains the gearing mechanisms that drive shafts 2319 and 2320 as is known to those of skill in the art, which in turn are coupled to rotating magnets 2214 (not shown in FIG. 14) that turn the gears in gear box 2325.

The entire propeller assembly couples to the remainder of the propulsion module 2199 as shown and described previously in FIG. 13. As DC motor 2208 causes magnets 2202 to rotate, magnets 2214 of propeller assembly 2300 also rotate. The rotation of magnets 2214, in turn cause the gears in gearbox 2325 to rotate shafts 2319 and 2320 and spin propellers 2311 and 2310.

Propellers 2311 and 2310 counter-rotate, with one propeller and propeller shaft spinning clockwise and the second spinning counterclockwise. In single propeller designs, the single propeller introduces a yawing moment, or turning tendency, for which the vehicle control systems must compensate to keep the vehicle oriented as desired. With the propeller assembly 2300 of the present disclosure, the counter rotating propellers each cancel out the yawing moment of the remaining propeller, thereby improving vehicle handling and reducing the need for additional control forces to keep the vehicle oriented.

1.4 Vehicle Scuttle Module

When vehicle 100 comprises a UUV, the vehicle operator may wish to allow for scuttling of the vehicle. Scuttling the vehicle may be desirable to prevent unauthorized access to vehicle 100, to prevent vehicle 100 from being detected by an adversary, or to halt vehicle 100 operations when extreme hazards exist. Other reasons for scuttling vehicle 100 may exist.

Figure 15A:
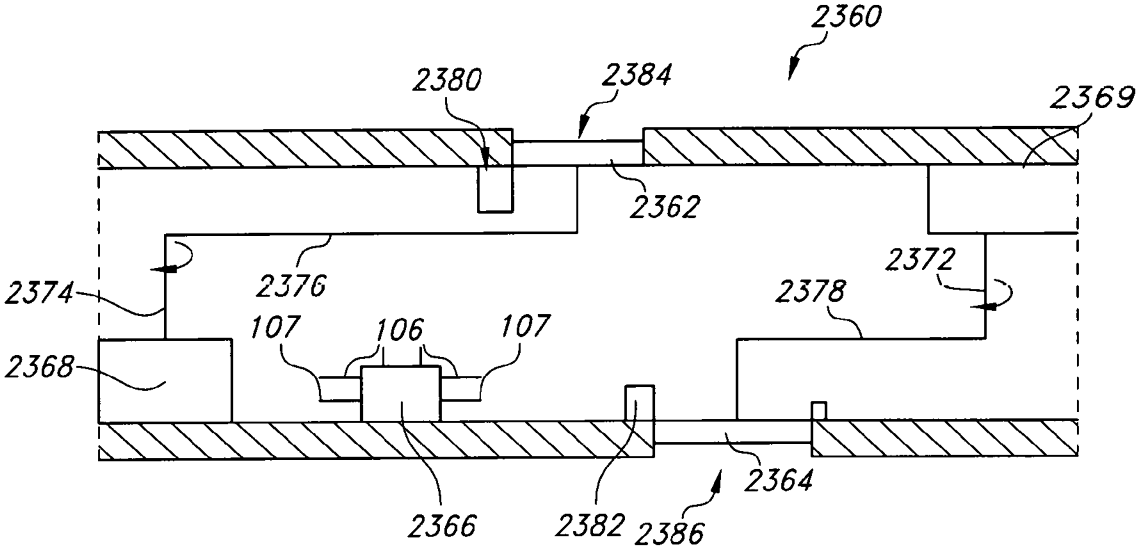
FIGS. 15A and 15B are cross sectional views of embodiments of a scuttle module according to embodiments of the disclosure.
Figure 15B:
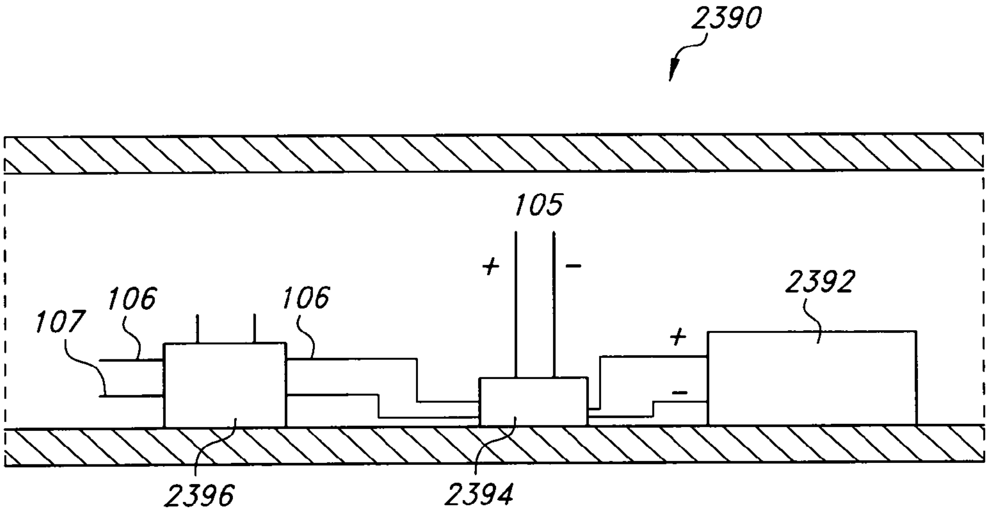

According to an embodiment of the disclosure, vehicle 100 includes a scuttle module to autonomously scuttle the vehicle in predetermined conditions; or upon receiving an external communication to do so. FIGS. 15A-15B illustrate embodiments of a scuttle module 2360 according to the disclosure. In the embodiment of FIG. 15A, scuttle module 2360 includes a set of operable doors 2362 and 2364. When closed, doors 2362 and 2364 prevent water from entering module 2360. If vehicle 100 is to be scuttled, a command is sent via CAN bus 106, 107 to a module microcontroller 2366 which then commences operation of DC motors or servos 2368 and 2369. Motors 2368 and 2369 cause shafts 2372 and 2374 to turn and via linkages 2376 and 2378, doors 2362 and 2364 pivot on their respective hinges 2380 and 2382 exposing openings 2384 and 2386 to the sea. Optionally, doors 2362 and 2364 can be constructed to slide in a track by coupling the door to a gear operated by DC motors 2368 and 2369. Other linkages and mechanisms are possible.

With doors 2362 and 2364 open to the sea, water floods the interior of module 2360. The interior volume of module 2360 is sized such that vehicle 100 propulsion and control systems will not be able to overcome the added weight of the water, and vehicle 100 will sink. Multiple scuttle modules 2360 can be used to configure vehicle 100 to ensure that a volume of water sufficient to scuttle the vehicle floods the modules.

In lieu of hinged doors, any of vehicle 100's modules can also optionally include voids covered initially by water tight doors. These doors can be opened using the rotational magnet mechanisms illustrated in any of FIGS. 8-10. When commanded, the servo rotates the attached magnet, causing the magnet coupled to the watertight door to rotate and open the door. With the watertight doors of the modules commanded open, water floods the vehicle causing it to sink.

FIG. 15B illustrates yet another alternative embodiment of a scuttle module 2390. In the embodiment of FIG. 15B, module 2390 includes a small explosive charge 2392. Explosive charge 2392 is coupled to a detonator 2394 according to principles known in the art. If vehicle 100 is to be scuttled, a command is sent via CAN bus 106, 107 to trigger the detonator. For additional safety, the command may be routed through a local processor 2396 included with module 2390 that performs a series of check sums, key exchange, or other secure validation of the command or command sequence. If the command sequence is valid, processor 2396 forwards the detonation command to detonator 2394. The resulting detonation of explosive charge 2390 is sized large enough to break apart vehicle 100 and send her to the bottom. According to additional embodiments of the disclosure, module 2390 also includes electrical fault isolation systems to prevent errant currents or short circuits from triggering detonator 2394.

Constructing a scuttle module according to the embodiment of FIG. 15B, requires operators receive specialized training in the safe handling, use, and storage of module 2390. Painting or coloring module 2390 hazard orange and labeling the module with appropriate safety placards is also recommended. These actions provide a visual clue to the operator that module 2390 requires special handling and care when being attached to vehicle 100 during vehicle 100 use.

2.0 Vehicle Systems

Vehicle 100 includes both a physical systems and a logical systems architecture. Vehicle 100 physical architecture includes hardware such as computing architecture, power systems, power distribution buses, internal storage and memory, device controllers, sensors, and data buses. Vehicle 100 logical systems include command and control logic and stability and control logic.

2.1 Hardware Systems Architecture

Figure 16:
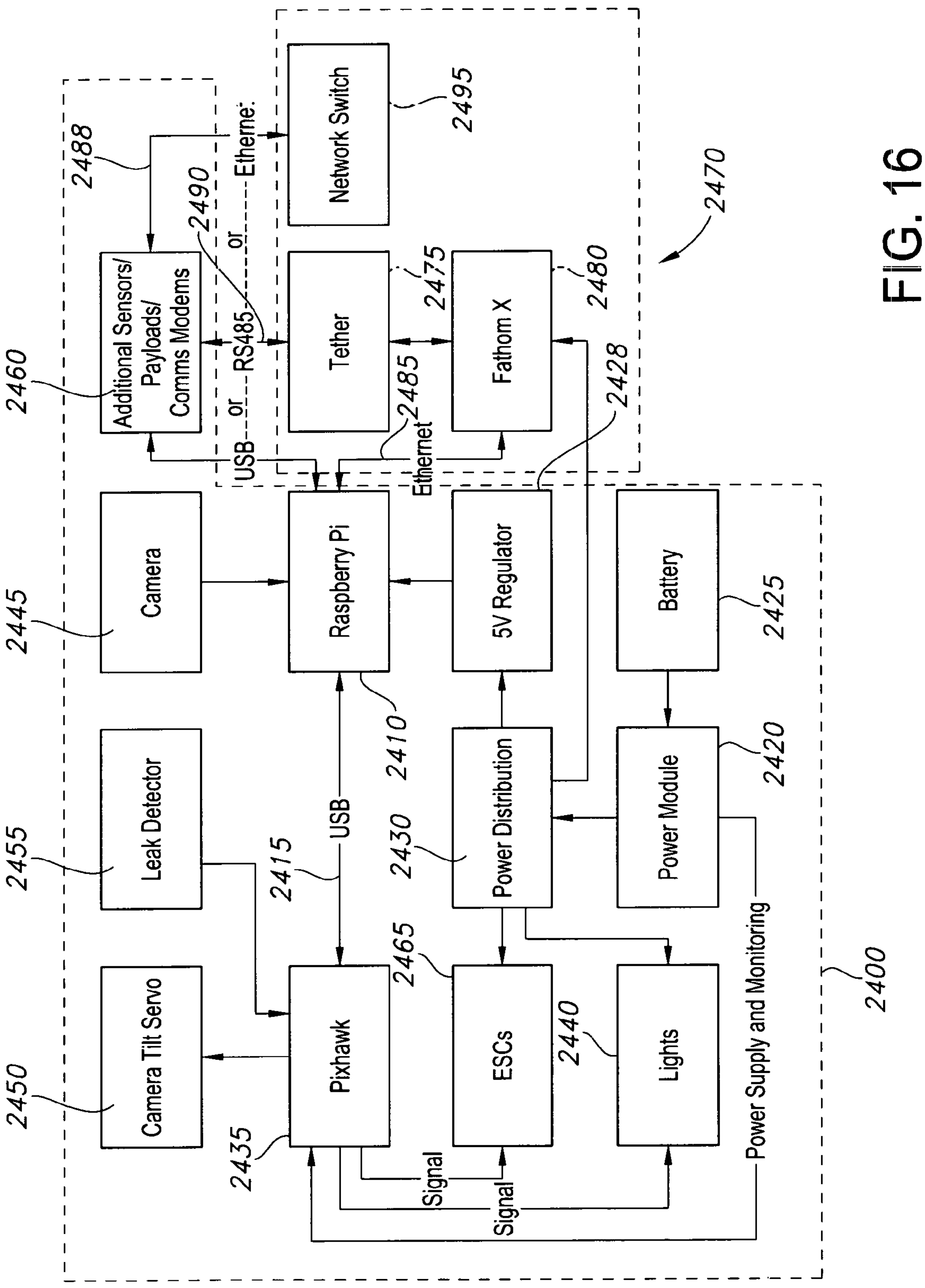
FIG. 16 is a systems block diagram of a configurable autonomous vehicle according to an embodiment of the disclosure.

FIG. 16 contains a hardware systems diagram of vehicle 100. In the diagram of FIG. 16, a set of onboard hardware components 2400 include several hardware subsystems. According to one embodiment of the disclosure, a central computer 2410 interfaces with the remaining vehicle subsystems and reads and writes commands and data to other vehicle 100 components via a USB or CAN Bus 2415. In a possible embodiment of the disclosure, computer 2410 comprises a commercially available Raspberry Pi computer mother board manufactured by DigiKey, the technical overview of which is incorporated herein by reference. In one possible embodiment of the disclosure, vehicle 100 may include a discrete command module that includes computer motherboard 2410 and associated memory and electronics.

Motherboard 2410 is powered by a vehicle 100 power module 2420. Power module 2420 may be physically collocated with motherboard 2410 or comprise a separate configurable power supply module with different types or quantities of power. In one embodiment of the disclosure, power module 2420 includes a battery 2425 as a power supply. In the hardware systems diagram of FIG. 16, power module 2420 supplies 5V DC to motherboard 2410 via a power conditioning device, regulator 2428. A power distribution system, or switches, 2430 route power to other vehicle 100 components needing electrical power. As described above, power is distributed throughout vehicle 100 via power bus 105.

Power and data signals are shared with peripherals using a standard interface and interface definition such as, for example, Pixhawk drone hardware interface and interface standards 2435, available from www.pixhawk.org the definitions of which are incorporated herein by reference. Peripherals can include lights 2440 that may be used as a means of communication or as a source of illumination for a camera 2445. The position of camera 2445 can be fixed or can be controlled by a camera tilt servo 2450. When vehicle 100 comprises a UUV or other watercraft, peripherals may additionally include one or more leak detectors 2455. Leak detectors 2455 may be distributed throughout vehicle 100 to detect the ingress of water into individual modules that may cause vehicle 100 to sink or capsize. Additional sensors or payloads 2460 as previously described may also be included within the hardware systems of vehicle 100. An electronic systems controller(s) 2465 interfaces with power distribution system 2430 to control peripherals according to instructions received from computer 2410.

Onboard vehicle systems 2400 may interface with shore-side controller hardware 2470. According to one embodiment of the disclosure, controller hardware 2470 comprises an electronic tether 2475 coupled to a Fathom X endpoint 2480. Tether 2475 and Fathom X device 2480, couple to vehicle 100 via an Ethernet link 2485 allowing the vehicle operator to configure vehicle 100 systems via motherboard 2410. Tether 2475 can optionally also couple to other vehicle sensors 2460 via an Ethernet link 2488 or another communications bus such as, for example, an RS 485 bus 2490. A network switch 2495 controls connections to any given peripheral or to a specific communications bus by shore-side controller hardware 2470.

2.2 Software and Logic Systems Architecture

Figure 17:
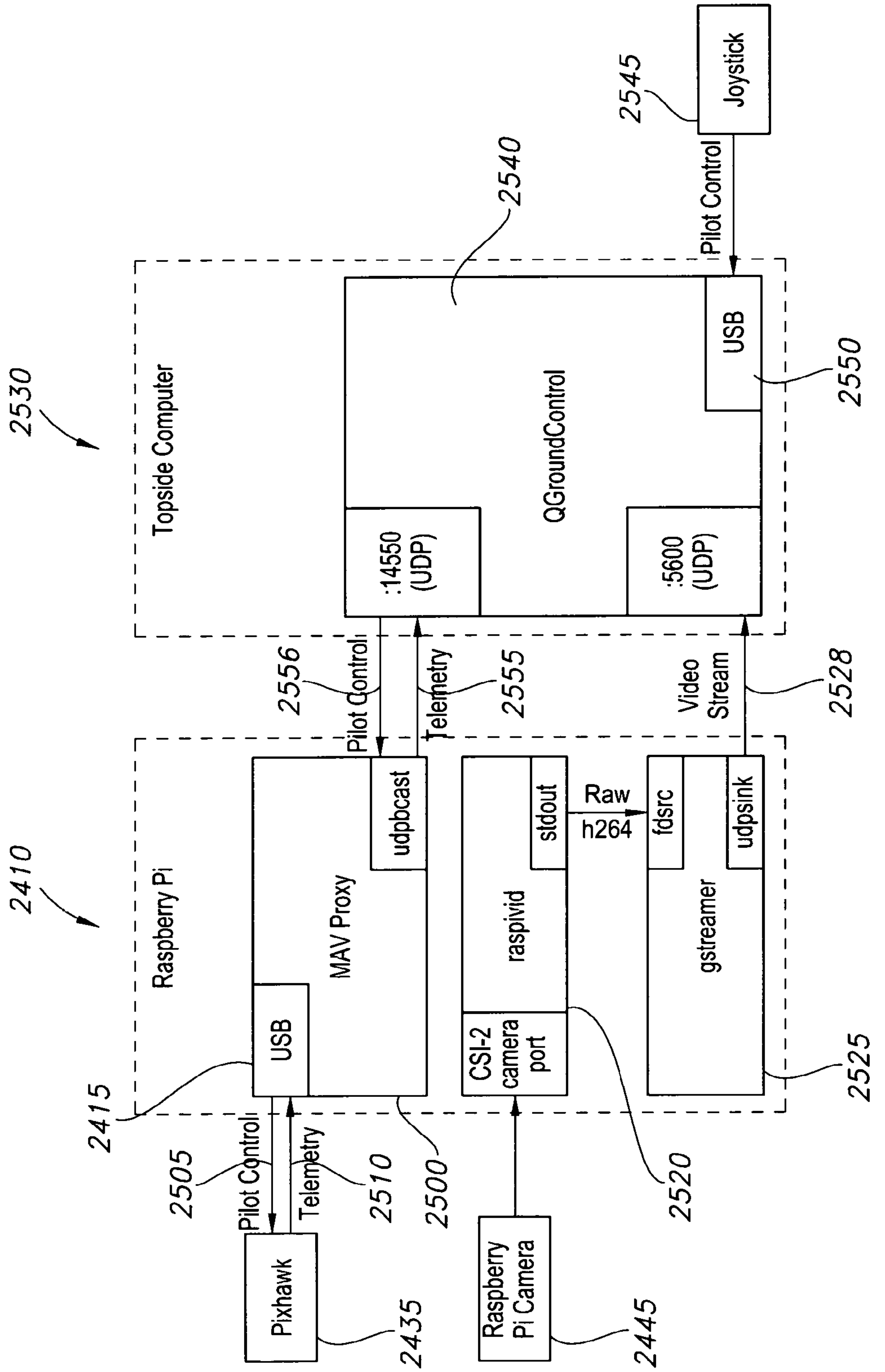
FIG. 17 is a block diagram of a vehicle software architecture according to an embodiment of the present disclosure.

FIG. 17 contains a block diagram of a vehicle 100 software system according to one embodiment of the disclosure. In the systems architecture of FIG. 17, the Raspberry Pi computer 2410 includes a variety of firmware or software logic for controlling and operating vehicle 100. A first logical component 2500 which may comprise MAVProxy software produced by ArduPilot.org reads and writes data and instructions via a USB or other electronic data port/modem 2415. Optionally, Mathworks of Natick, MA, makers of MATLAB and Simulink mathematical computing software, has under development command and control logic that may also be included to form logic component 2500 and to configure vehicle 100, once such tools are completely developed. The instructions for controlling and operating vehicle 100 may include command and control logic instructions 2505 exchanged according to the Pixhawk interface 2435. Logic 2500 also receives data and telemetry 2510 received from peripherals or attached devices via interface 2435 and USB port 2415. As discussed in greater detail below, logic module 2500 may also include logic for navigating and positioning vehicle 100 via manipulation of propulsion module 2199 and vehicle 100 control surfaces according to navigation data and other mission parameter data and functions stored and executed by logic 2500 and onboard computer 2410.

A second vehicle logic module 2520 operates onboard cameras and optics. In one embodiment of the disclosure, software module 2520 comprises raspivid software which reads and writes data and instructions from a camera 2445. According to one embodiment of the disclosure, camera 2445 comprises a Raspberry pi camera procured through DigiKey, the complete technical specification of which is incorporated herein by reference.

According to one possible embodiment of the disclosure, visual data captured by camera 2445 is written to software module 2520 and raw image data then transmitted (or rewritten) by software module 2520 to a streaming software logic function 2525. Streaming function 2525 can then upload or stream data 2528 off of vehicle 100 to shore-side computers 2530 or other data and telemetry receiving devices.

As will be readily apparent to those of ordinary skill in the art, the vehicle software architecture 2410 of FIG. 17 may be implemented in software, firmware, or ASIC devices and is not limited to the specific software shown in FIG. 17. The logic functions may also be apportioned across various software routines or firmware and need not be strictly segregated into the software modules as drawn.

According to one possible embodiment of the disclosure, vehicle 100 interfaces with a shore-side computer 2530 via a controller 2470 (shown in FIG. 16). Topside computer 2530 may include a vehicle configuration and control software, QGroundControl 2540 found at qgroundcontrol.com and managed by the Dronecode Project, the complete technical description of which is incorporated herein by reference. Software 2540 may optionally interface with a joystick 2545 which may serve as a means for operator control of a tethered vehicle 100 when not operating autonomously; or as means for inputting data to QGroundControl software 2540. Joystick 2545 provides data to software 2540 via a USB port 2550 or other electronic port known to those of skill in the art.

Command and configuration data and information exchanges 2555 and 2556 received from vehicle 100, may be communicated to/from topside computer 2530 via a USB or Ethernet link with Raspberry Pi computer 2410 via software module 2500 and software module 2540. As noted in connection with the description of the vehicle 100 logic architecture, topside logic 2530 may be implemented using other software, firmware or ASIC modules as is known in the state of the art and is not limited to the specific software configuration shown in FIG. 17.

Figure 18:
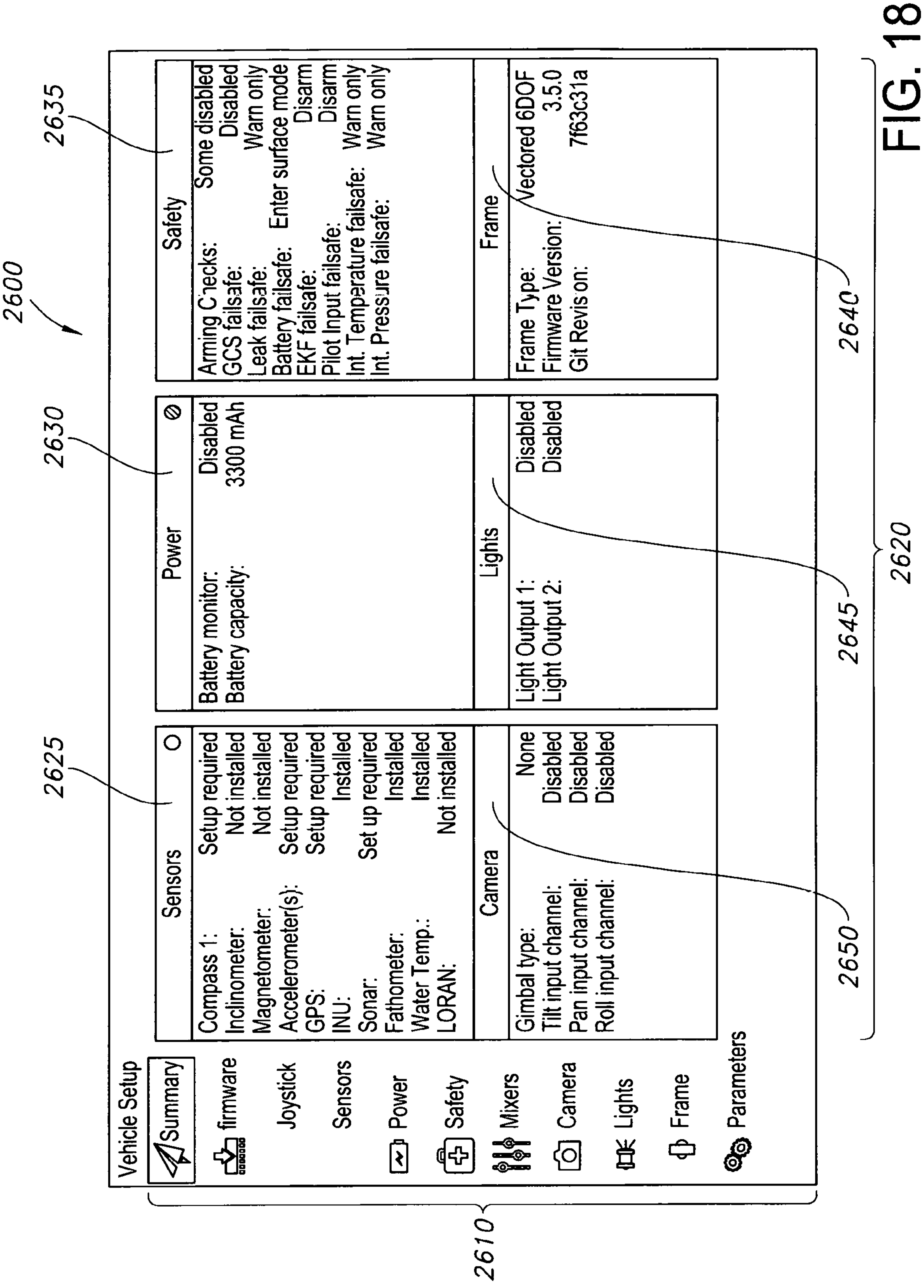
FIG. 18 is a graphical user interface for configuring an autonomous vehicle according to an embodiment on the disclosure.

Topside software and computer 2530 may be used by operators of vehicle 100 to configure vehicle 100 systems, load mission parameters and instructions, and to validate the status of vehicle 100 systems, modules, sensors, payloads and other elements and components. FIG. 18 shows an example of a vehicle user interface 2600. In the example user interface of FIG. 18, a left side menu 2610 allows the user to select various top level systems for further parameter definition and configuration. As illustrated in FIG. 18, a summary page is selected and area 2620 of the user interface summarizes the current status and configuration of various onboard systems including: navigation sensor packages 2625, power systems 2630, safety systems 2635, frame parameters 2640, lights 2645, and camera systems 2650. In one possible embodiment of the disclosure, user interface 2600 comprises ARDUSub software or firmware found at www.ardusub.com manufactured by BlueRobotics, the specifications of which are incorporated herein by reference.

Other user interface systems may be used with the present disclosure, and the disclosure is not limited to the specific software or user interface shown. In addition, as described previously, vehicle 100 may be configured for a variety of missions and uses, and may include a variety of different types of sensors, telemetry, power, safety, and other onboard systems not depicted in FIG. 18 as drawn. The option to configure, status and set parameters for such additional systems is also preferably available to the vehicle operator via user interface 2600 as desired.

2.3 Vehicle Stability and Control

In prior art vehicles of fixed design and configuration, the vehicle mass and control configurations are established in advance and are known. Thus, when operating prior art vehicles in an autonomous mode, the vehicle's moments of inertia and its stability control coefficients: information needed to control and manoeuvre the vehicle remains a known set of constants. In contrast, adding and removing modules, and adding and removing various propulsion systems, and external modular elements to vehicle 100 alters the center of mass, center of buoyancy and the stability and control parameters of vehicle 100 each time a new vehicle 100 is configured.

2.3.1 Dynamically Determined Stability and Control Logic

According to one embodiment of the disclosure, vehicle 100 includes onboard logic or programming that receives configuration data from each module and component which makes up vehicle 100. Such configuration data may include the individual dimensions and mass properties of each attached module or component, as well as its stability and control parameters, and/or its performance parameters and operational limits, payloads, design limits, or other information.

Data about the module or element may be collected by the operator topside, for example by reading from a label or inscription on the element or module, at the time of vehicle configuration. This information can then be entered and loaded into vehicle computer 2410 via topside computer 2530. Vehicle 2410 via topside computer 2530. Vehicle 2410 can them compute the stability and control coefficients and control laws for vehicle 100. Optionally, each individual module may have its information stored in a memory and a processor located aboard each module. According to one embodiment of the disclosure, modules may include a Beagle Bones microprocessor, coupled to CAN bus 106, 107 for this purpose. Individual elements may also include a small read only memory (ROM) device, also coupled to a CAN data bus, that stores information about the individual element. This memory can be queried by the microprocessor aboard the attached module, or directly from the vehicle central processing system 2410.

For example, propulsion system 2199 may transmit via CAN bus 107 and 108, the type of propeller attached including data such as propeller pitch and number of blades, as well as operating limits such as maximum revolutions and operating envelopes. Additionally, control surfaces and wing data may include lift and drag data, wing configuration, and stability coefficients. If such surfaces are not fixed, control surface data may include the range of motion or degrees of travel over which the surface can be positioned. Module data may include information about module capabilities; ballast and payload contents, if any; and module mass, moment of inertia, stability coefficients and dimensional properties. As will be evident to those of skill in the art, a variety of information about each configurable attachment and individual module may be transmitted via data bus 107, 106 as desired to aid in operating vehicle 100 and performing vehicle 100 mission evolutions.

According to one embodiment of the disclosure, when a module or component is attached to vehicle 100, that module or component transmits via CAN bus 107, 106 the configuration and characteristics data stored in local memory within that module or component. Optionally, when a module or component is attached to vehicle 100, that module or component can transmit a module or component identification value via CAN bus 106, 107. Computer 2410 has stored therein a look up table, memory, logic, or other programming that associates a set of configuration and characteristics data with the component identification value received.

Even with the individual module mass properties and stability coefficients provided to computer 2410, the overall vehicle stability coefficients, mass properties and dynamics must be calculated so vehicle 100 can be controlled and operated. Various approaches may be used to dynamically determine the necessary control laws and parameters. These approaches include direct calculation using the known properties of the individual modules; or empirically determining the control law values by having the assembled vehicle 100 execute a defined series of manoeuvres prior to departing on the mission; or some combination of both. In the latter case, a set of stability and control coefficients can be calculated and then vehicle 100 could conduct a short test run to validate or refine the calculated values. Vehicle 100 also dynamically updates its control parameters as it drops ballast or consumes consumables during operation. These calculations could also be periodically verified by vehicle 100 autonomously executing a short series of manoeuvres periodically during the mission to validate and update prior stability calculations or to just empirically determine the changed control parameters.

Methods for dynamically calculating vehicle 100 stability and control coefficients include: adaptive methods, least squares regression models, Kalman filter models and machine learning models. Any of the above methods can be used to dynamically calculate the vehicle 100 stability and control coefficient and control laws. Adaptive methods include the following.

a) 3 degree of freedom models: for example as described in Paine, "Adaptive Parameter Identification of Underactuated Unmanned Underwater Vehicles; a Preliminary Simulation Study," in *Oceans* 2018 *MTS/IEEE* Charleston, IEEE, October 2018, pp 1-6; and incorporated herein by reference.

b) decoupled 6 degree of freedom models: for example as described in, Smallwood, "Adaptive Identification of Dynamically Positioned Underwater Robotic Vehicles," *IEEE Transactions on Control Systems Technology*, vol. 11, no. 4 pp 505-515, July 2013; and Tyler Paine et. al, "Preliminary Feasibility Study of Adapted Parameter Identification for Decoupled, Underactuated, Unmanned Underwater Vehicles in 6 Degrees of Freedom," a paper presented at the Yale Workshop on Adaptive Systems and Learning; each of which is incorporated herein by reference.

c) fully coupled, fully actuated 6 degree of freedom plant models: for example as described in McFarland, "Comparative Experimental Evaluation of a New Adaptive Identifier for Underwater Vehicles," in 2013 *IEEE International Conference on Robotics and Automation*, May 2013, pp 4614-4620; Paine and Whitcomb, "Adaptive Parameter Identification of Underactuated Unmanned Underwater Vehicles; a Preliminary Simulation Study," 2018; and Harris, Paine, and Whitcomb, "Preliminary Evaluation of Null Space Dynamic Process Model Identification with Application to Cooperative Navigation of Underwater Vehicles," each of which is incorporated herein by reference. Embodiments of the disclosure as described more below include fully coupled, fully actuated 6 degree of freedom plant models.

Additional models which may be used to dynamically calculate vehicle 100 stability and control coefficients and control laws include least squares linear regression methods. These methods include the following more specific methods.

a) 3 degree of freedom models: for example as described in Hegrenaes et al. "Comparison of Mathematical Models for the Hugin 4500 AUV Based on Experimental Data," 2007 *Symposium for Underwater Technology and Workshop for Scientific Use of Submarine Cables and Related Technologies*, April 2007, pp 558-567; Ridao, "On the Identification of Nonlinear Models of Unmanned Underwater Vehicles," *Control Engineering Practice*, vol. 12, no. 12, pp 1483-1499, 2004 in *Guidance and Control of Underwater Vehicles*; and Graver, "Underwater Glider Model Parameter Identification," in *Proceedings of the* $13^{th}$ *International Symposium on Unmanned Untethered Submersible Technology* (*UUST*), vol. 1, 2003, pp. 12-13; each of which is incorporated by reference herein.

b) 6 degree of freedom models: for example as described in Martin, "Experimental Identification of 6 Degree of Freedom Coupled Dynamic Plant Models for Underwater Robot Vehicles," *IEEE Journal of Oceanic Engineering*, vol. 39, no. 4, pp 662-671, October 2014; Martin, "Experimental Identification of 3 Degree of Freedom Coupled Dynamic Plant Models for Underwater Vehicles," Springer International Publishing, 2017, pp 319-341; and Natarajan, "Offline Experimental Parameter Identification Using Onboard Sensors for an Autonomous Underwater Vehicle," in *Proceedings of MTS Oceans*, October 2012, pp 1-8; each of which is incorporated herein by reference.

c) reduced parameter 6 degree of freedom models for example as described in Randeni, "Parameter Identification of a Nonlinear Model: Replicating the Motion Response of an Autonomous Underwater Vehicle for Dynamic Environments," *Nonlinear Dynamics*, vol. 91, no. 2, pp 1229-1247, January 2018; Randeni, "Implementation of a Hydrodynamic Model Based Navigation System for a Low Cost AUV Fleet," in *IEEE OES Autonomous Underwater Vehicle Symposium* (*AUV*) no. November 2018; and Harris, "Preliminary Evaluation of Null Space Dynamic Process Model Identification with Application to Cooperative Navigation of Underwater Vehicles," 2018 *IEEE/RSJ International Conference on Intelligent Robots and Systems* (*IROS*) *IEEE*, October 2018, pp 3453-3459; each of which is incorporated herein by reference.

Kalman filter approaches for dynamically determining the stability and control coefficients and control laws of vehicle 100 also exist. Kalman filter variants include the following examples: Tiano, "Observer Kalman Filter Identification of an Autonomous Underwater Vehicle," *Control Engineering Practice*, vol. 15, pp 727-739, June 2007; and Sabet, "Identification of an Autonomous Underwater Vehicle Hydrodynamic Model Using the Extended, Curvature, and Transformed and Unscented Kalman Filter," *IEEE Journal of Oceanic Engineering*, vol. 43 no. 2, pp 457-467, April 2018; each of which is incorporated herein by reference.

Machine learning and neural network methods have also been developed as a method for calculating the stability and control coefficients and control laws. These methods include the following.

a) machine learning methods: for example as described in Wehbe, "Experimental Evaluation of Various Machine Learning Regression Methods for Model Identification of Autonomous Underwater Vehicles," in 2017 *IEEE International Conference on Robotics and Automation* (*ICRA*), May 2017, pp 4885-4890; Wehbe, "Learning Coupled Dynamics Models of Underwater Vehicles Using Support Vector Regression," in *Oceans* 2017, Aberdeen, June 2017; and Wu, "Parametric Identification and Structure Searching for Underwater Vehicle Model Using Symbolic Regression," *Journal of Marine Science and Technology*, vol. 22, no. 1 pp. 51-60, 2017; each of which is incorporated herein by reference.

b) neural network methods: for example as described in Vandeven, "Neutral Network Augmented Identification of Underwater Vehicle Models," *Control Engineering Practice* vol. 15, no. 6, pp 715-725, 2007, special section on control application in marine systems; and Karras, "Online Identification of Autonomous Underwater Vehicles through Global Derivative Free Optimization," 2013 *IEEE/RSJ International Conference on Intelligent Robots and Systems*, November 2013, pp 3859-3864; each of which is incorporated herein by reference.

Figure 19:
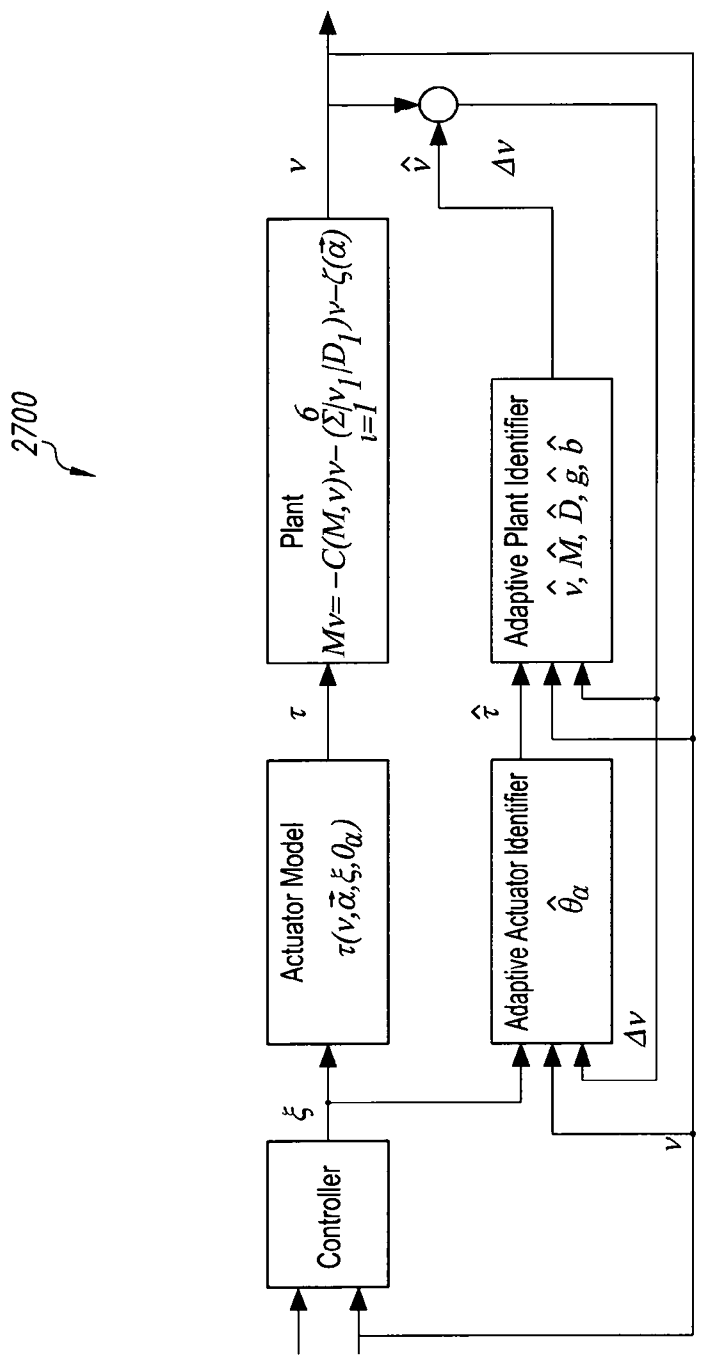
FIG. 19 is a block diagram of a fully coupled, fully activated 6 degree of freedom adaptive plant model control system according to an embodiment of the present disclosure.

Each of these above methods may be used with the present disclosure regardless of the type of vehicle. As is well known to those of skill in the art, the equations can be rewritten to account for the vehicle type and the nomenclature/symbology normally used in the associated field. According to one embodiment of the disclosure, vehicle 100 control laws include adaptive plant methods model 2700 as illustrated in the block diagram of FIG. 19 and as defined below by equation no. 1. Vehicle 100 executes these dynamic stability and control laws to control the motions and to navigate vehicle 100.

$$\underbrace{M\dot{\varpi}}_{\text{Ινερτιαλ Τερμσ}} = -\underbrace{X(M,\varpi)\varpi}_{\text{Χοριολισ Τερμσ}} - \underbrace{\left(\sum_{\iota=1}^{6}|\varpi_\iota|\Delta_\iota\right)\varpi}_{\text{Θυαδρατιχ Δραγ Τερμσ}} - \underbrace{\mathcal{G}(\alpha)}_{\text{ΒυοΨανχ Τερμσ}} + \underbrace{\tau(\varpi,\alpha,\xi,\theta_\alpha)}_{\text{Χοντρολ Φορχε/Μομεντσ}} \tag{1}$$

Where:

$v \in \mathbb{R}^6$ is the body velocity.

a is the body attitude vector.

$M \in \mathbb{R}^{6\xi6}$ is the positive definite symmetric mass matric.

$\Delta_i \in \mathbb{R}^{6\xi6}$, i=(1, 2, . . . 6) is the negative semidefinite drag matric for the $i^{th}$ degree of freedom.

$\xi \in \mathbb{R}^{\pi}$ are control inputs such as fin angle and propeller speed.

$\theta\alpha \in \mathbb{R}^{\theta}$ is a vector of actuator parameters to be identified. Examples of these terms include lift and drag coefficients of the control surfaces and propeller coefficients.

2.3.2 Center of Mass Redistribution Module

There may exist configurations of vehicle 100 for which the available control surfaces lack sufficient authority to reliably control the vehicle, or in which the vehicle is dynamically or statically unstable to such a degree as to make mission execution a concern. Alternatively, the initial vehicle 100 configuration may be within desired operating envelopes, but after dropping a cargo, collecting a sample, or dropping ballast, the resulting vehicle 100 properties exceed safe operating parameters. In such situations, relocating the center of mass/gravity of vehicle 100 may sufficiently alter vehicle 100 stability and control characteristics to return vehicle 100 to safe limits of operation.

Figure 20B:
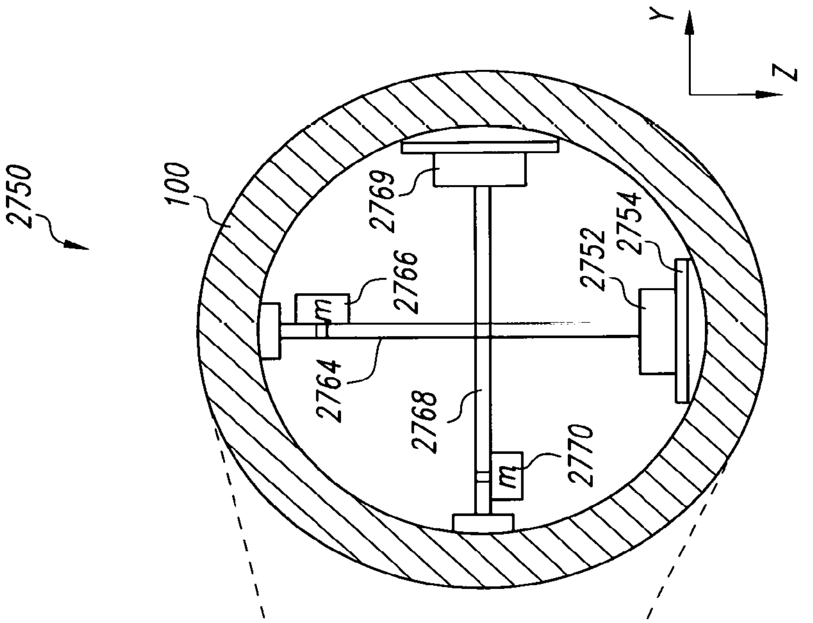
FIGS. 20A and 20B are views of a module for positioning a center of mass of a vehicle according to an embodiment of the disclosure.
Figure 20A:
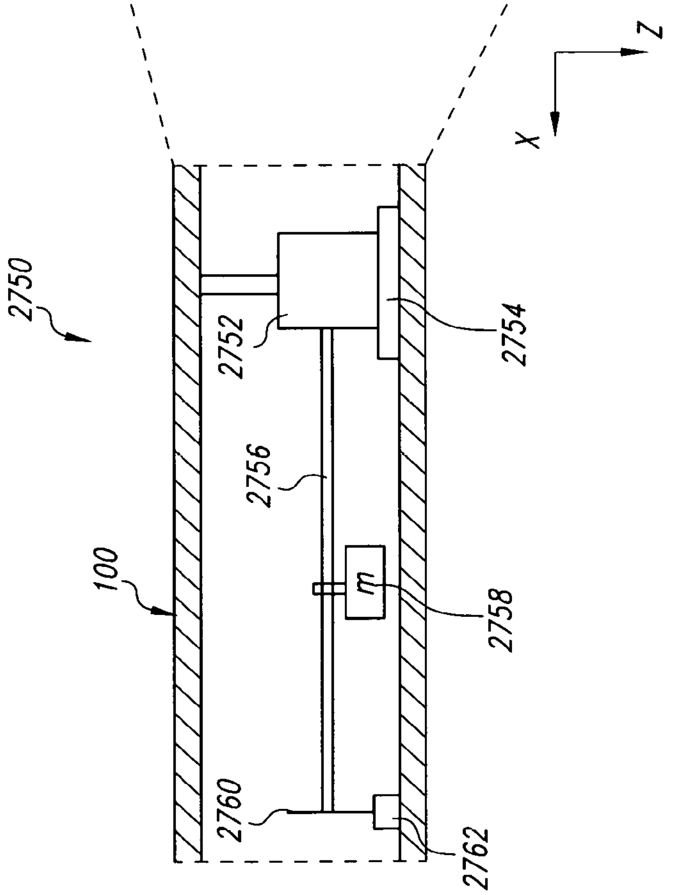

FIG. 20A is a side cross sectional view and FIG. 20B is a second cross sectional view of a mass redistribution and configuration module 2750 according to an embodiment of the disclosure. As shown in FIGS. 20A and 20B, mass redistribution module 2750 includes mechanisms that can selectively change the location of vehicle 100 center of mass by repositioning moveable masses on each of the vehicle's x, y, and z axes. In alternative embodiments of the disclosure, module 2750 includes moveable masses for just a single one of the x, y, or z axes, or simply any two of the x, y, or z axes. Optionally, for greater precision, module 2750 can include multiple moveable masses of different weights on any given one or more of these axes.

As shown in FIG. 20A, module 2750 includes a servo or DC drive motor 2752, mounted on a motor mount or isolation plate 2754. Motor 2752 drives a worm gear 2756 to which is attached a mass m, 2758. The worm gear is anchored to a termination plate 2760 secured to the module 2750 structure either directly or through an isolation plate 2762. As shown in FIG. 20A, worm gear 2756 is located parallel to or on the x axis of vehicle 100. Motor 2752 receives commands from vehicle 100 command logic via data buses 106 and 107, to turn worm gear 2756 and position or reposition mass 2758 at the desired location along the x axis. Module 2750 may optionally include a separate sensor to detect the position of mass 2758; or optionally, module 2750 may be precalibrated to correlate the number of revolutions of worm gear 2756 to a given location of mass 2758.

FIG. 20B shows an end view of the module 2750 of FIG. 20A. In the cross section of FIG. 20B, DC motor 2752 is coupled via additional gearing to drive a second worm gear 2764. Optionally, a second DC motor 2752 can be included to drive worm gear 2764. Motor 2752 receives commands from vehicle 100 control logic to turn worm gear 2764 and position a mass 2766 along or parallel to the vehicle 100 z axis. The position of mass 2766 can be determined in a manner similar to that described in connection with mass 2758.

Also shown in the embodiment of FIG. 20B is a third worm gear 2768 coupled to a DC motor 2769. Motor 2769 turns worm gear 2768 in response to commands received from the vehicle 100 control logic. Turning worm gear 2768 positions mass 2770 along the y axis of vehicle 100. The position of mass 2770 can be determined in a manner similar to that described in connection with the movements of masses 2758 and 2766.

Inclusion of module 2750 in the configuration and assembly of vehicle 100 allows the vehicle 100 center of mass/gravity to be repositioned to obtain optimum performance of vehicle 100 and to maintain vehicle 100 operating characteristics within desired operational envelopes. Any of masses 2758, 2766 or 2770 can be positioned or repositioned at any time during operation of vehicle 100. This capability additionally allows vehicle 100 to be "trimmed" for the particular operating conditions or manoeuvre. Trimming vehicle 100 reduces the amount of work the control surfaces must do to maintain vehicle 100 in a particular attitude or orientation. Reducing the number and magnitude of required motions of the control surfaces in turn saves vehicle power and increases vehicle endurance and range.

2.3.3 Buoyancy Control Module

Figure 21:
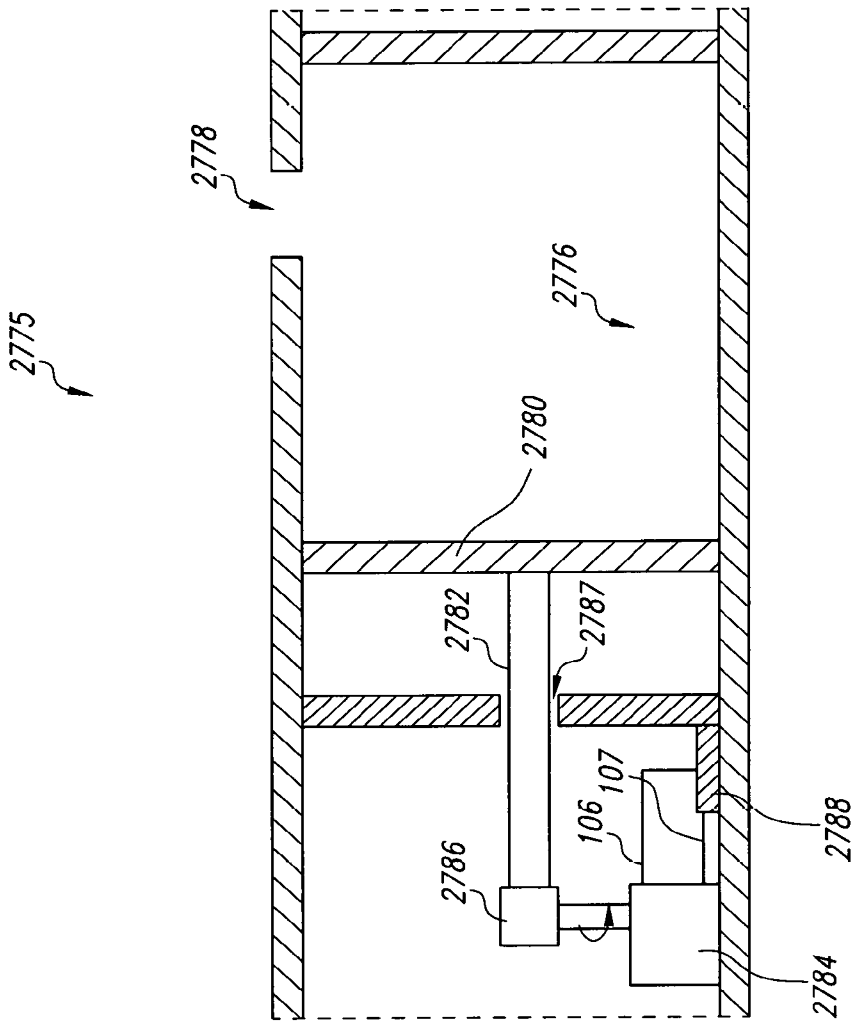
FIG. 21 is a cross sectional view of a buoyancy module for positioning a center of buoyancy of a vehicle according to an embodiment of the disclosure.

Similar to the reasons for wanting to control the position of the vehicle 100 center of mass, when vehicle 100 comprises a UUV, the operator may wish to provide a module for controlling the buoyancy of vehicle 100. FIG. 21 illustrates a cross section of a buoyancy control module 2775 according to an embodiment of the disclosure. Buoyancy control module 2775 selectively increases and decreases the net buoyancy of the vehicle 100. Module 2775 includes one or more flood tank areas 2776 fluidly coupled to the exterior of the hull through port(s) 2778. A piston 2780 is mounted on an actuator rod 2782 and coupled to DC servo motor 2784 through a gear box 2786. Servo motor 2784 moves piston 2780 fore or aft inside flood chamber 2776 to increase or decrease flood tank 2776 volume thereby changing the amount of water/fluid inside tank 2776. As the volume of water inside tank 2776 changes, the total buoyancy and the center of buoyancy of vehicle 100 can be controlled and positioned. An air gap 2787 is provided where actuator rod 2782 enters flood chamber 2776 to allow vehicle atmosphere to enter or leave the flood chamber as piston 2780 is positioned and repositioned during use and to prevent the buildup of a vacuum. Optionally, an airbladder (not shown) can be provided for this purpose.

In operation, vehicle 2410 sends buoyancy correction commands via CAN bus 106, 107 to module microprocessor 2788. Microprocessor 2788 processes the received commands and issues reposition commands via CAN bus 106, 107 to servo 2784 to reposition piston 2780 and alter the interior volume of flood chamber 2776. As piston 2780 moves forward, water present in chamber 2776 is pushed out of opening 2778. As piston 2780 moves back, more water enters the chamber 2776 through opening 2778 to fill the expanding volume of the chamber 2776. Repositioning piston 2780 in this manner thereby changes the vehicle buoyancy and also can be used to alter the location of the center of buoyancy. Vehicle 100 may comprise multiple modules 2775 as appropriate to the vehicle's operations and mission.

2.4 Telemetry and External Communications Systems

Once vehicle 100 commences autonomous operations, vehicle 100 can communicate with operators or with other vehicles via a communications modem. Vehicle 100 modem can comprise radio communications, light communications, or acoustic communications; or combinations thereof. Each of these modes of communication and the hardware for receiving and transmitting said communications is well known to those of skill in the art. The particular choice of particular communication means is dependent in part on the intended vehicle use and operating environment.

2.4.1 Optical Communications Module

Figure 22B:
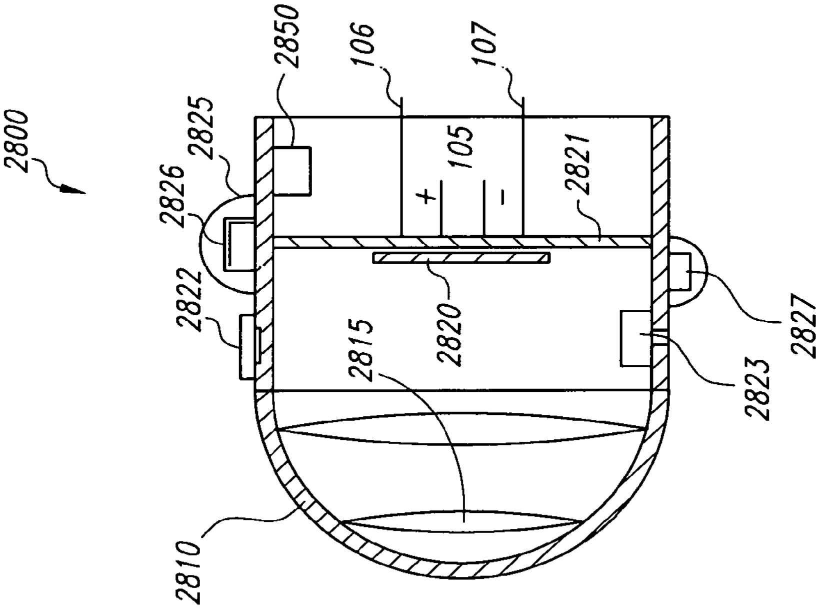
FIGS. 22A and 22B are a perspective view and a cross sectional view respectively of a light communications module or element according to an embodiment of the disclosure.
Figure 22A:
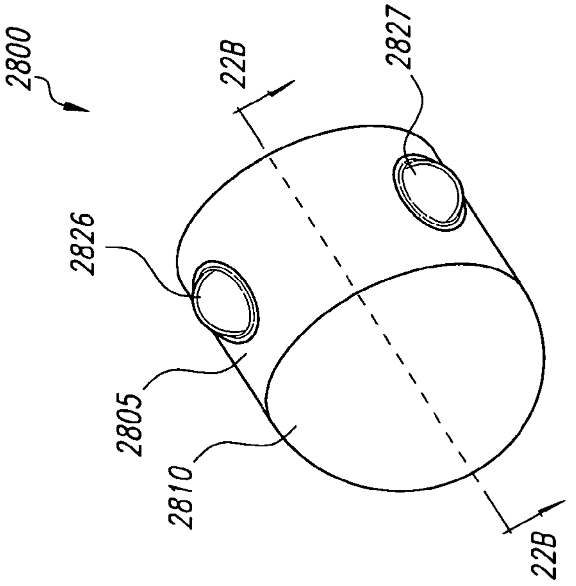

According to one embodiment of the disclosure, vehicle 100 includes an optical communication module or element as shown in FIGS. 22A and 22B. FIG. 22A shows a front perspective view of optical communications element or module 2800 having a module body 2805 and a transparent front dome 2810. Although shown in a nose cone configuration in FIGS. 22A and 22B, optical module 2800 can be included anywhere in the vehicle 100 modular or element configuration such as, for example, as illustrated in FIG. 22A. When constructed as a module, optical communications package 2800 mates with the remainder of vehicle 100 using any of the connectors of FIG. 5A-5F. When constructed as a configurable element, optical communications package 2800 may be either moveable or fixed and mated with vehicle 100 using any of the embodiments of FIG. 7-10 or 12.

FIG. 22B shows module 2800 in cross section. On the interior of transparent dome 2810 one or more lenses 2815 focus light onto a position sensitive detector 2820. Transparent dome 2810 may comprise a filter material that transmits light of certain wavelengths while excluding or attenuating other wavelengths. Wavelengths of light may include ultraviolet, infrared, and visible light. When vehicle 100 comprises a UUV, green spectrum wavelengths have been shown to transmit information more robustly in an underwater environment. Lens 2815 can also be designed to or coated to attenuate certain wavelengths while permitting other wavelengths to pass through to detector 2820.

Position sensitive detector 2820 may comprise a First Sensor DL 100-7 model detector, the specification of which is incorporated herein by reference. Detector 2820 is mounted on a printed circuit board 2821 which includes the module microprocessor. Circuit board 2821 additionally includes additional processing and circuitry for processing data received from and for issuing commands to other communications devices such as RF or acoustic modems and communications when such circuits are also included within module 2800. As drawn in FIG. 22B, optical communications module 2800 includes an RF strip antenna 2822 for RF communications; and an acoustic modem 2823 for acoustic communications. As with the optical communications, circuit board and processor 2821 routes communication to vehicle 100 central processor 2410 via CAN bus 106, 107.

RF strip antenna 2822 can also be used for wireless communications between modules. Such communications may be desirable, for example, when a configurable element is attached to the exterior of vehicle 100. The external configurable element, can transmit via wireless communication its status, configuration, range of motion and other performance parameters. Use of wireless communications avoids the need to provide a wired bus connection between the element and the adjoining module to effect communications with vehicle 100, and wherein such hard wired connections might penetrate the hull of vehicle 100. Even when vehicle 100 comprises a UUV, the range over which the wireless radio frequencies is so small such that attenuation should not be a concern. Optionally, rather than a single RF strip antenna 2822 located on communications module 2800, each module, or the command module could include a wireless antenna to perform this function. Data received from any attached configurable element could then be processed by the individual module microcomputer. Optionally wireless configuration data can be shared directly with vehicle computer 2410 via buses 106, 107.

When light hits position sensitive detector 2820, detector 2820 output is processed by circuit board electronics 2821 which transmits via CAN bus 106, 107 a signal to vehicle command logic 2410. In this manner, transmitted light can be used for communications. For example, a sequence of flashing lights can be transmitted from a source external to vehicle 100 and received by module 2800 as a coded message, for decoding by vehicle 100 command logic 2410.

In an alternative embodiment of the disclosure, the strength or location of the centroid of the focused beam of light on detector 2820 relative to the center of the detector is measured and communicated via data buses 106, 107 to vehicle control logic 2410. This information can be used by vehicle 100 to manage vehicle track relative to an external illuminated target. If the external light is focused through lens 2815 on the center of the detector, vehicle 100 is tracking to the target. If the maximum energy of the external light is focused to be on other than the center of detector 2820, vehicle 100 is off course. Vehicle logic 2410 can use this tracking information to issue propulsion or control commands to alter course as needed to track to the external illuminated target.

According to another embodiment of the disclosure, optical module 2800 may additionally include one or more of LEDs 2825, 2826, 2827. LEDs 2825-2827 et seq. are located around the periphery of optical communications module 2800 or positioned such that light emitted therefrom does not interfere with light detected by detector 2820. The LEDs may each be housed and protected within its own separate transparent housing filled with engineering fluid. The engineering fluid, as described previously above, provides for thermal management and transfer of the heat generated by the LED to the exterior medium outside of the transparent housing. Each of LEDs 2825-2827 et seq. may additionally comprise an LED of a different wavelength, for example: one blue, one green, one red, and so forth. The LEDs can be flashed in a different sequence of colors to communicate messages to the operator, a remote optical receiving modem, or to other vehicles. Various methods of encoding messages using such techniques are known to those of skill in the art.

2.4.2 Vehicle Swarm Communications

Optical communications modules 2800 may be used to coordinate movements and activities among and between several vehicles. For example, the operator might designate a "lead" vehicle for other vehicles to follow. In such a mode of operation, lead vehicle 100 might emit, for example a red encoded pulsing light from LED 2825 for vehicles on the port side of lead vehicle 100 to follow and a green encoded flashing light for vehicles on the starboard side to follow. In the configuration of optical module 2800 as shown, these light transmissions need only be seen by the receiving vehicle and that receiving vehicle need not be pointed directly at the light source. Detector 2820 can detect the wavelength of the received light and communicate that information back to vehicle command logic and central processing 2410. The encoded pulses can include a sequence or data string that includes, for example, one or more of: the vehicle ID, and indications of vehicle speed, course or direction changes.

Optionally, communication module 2800 may include a Pixy Camera in lieu of or in addition to detector 2820. The complete specification of the Pixy Camera is incorporated by reference. The Pixy camera can detect and separate out as separate data streams, transmitted light of different wavelengths. Thus, rather than receiving and acting upon communications received from just a single vehicle at a single wavelength, the receiving vehicle 100 can have multiple simultaneous channels of visible communication, each of a different wavelength. These multiple channels can be from multiple adjacent vehicles, or from a single adjacent vehicle transmitting different types of data, each with its own channel of colored light.

Figure 23:
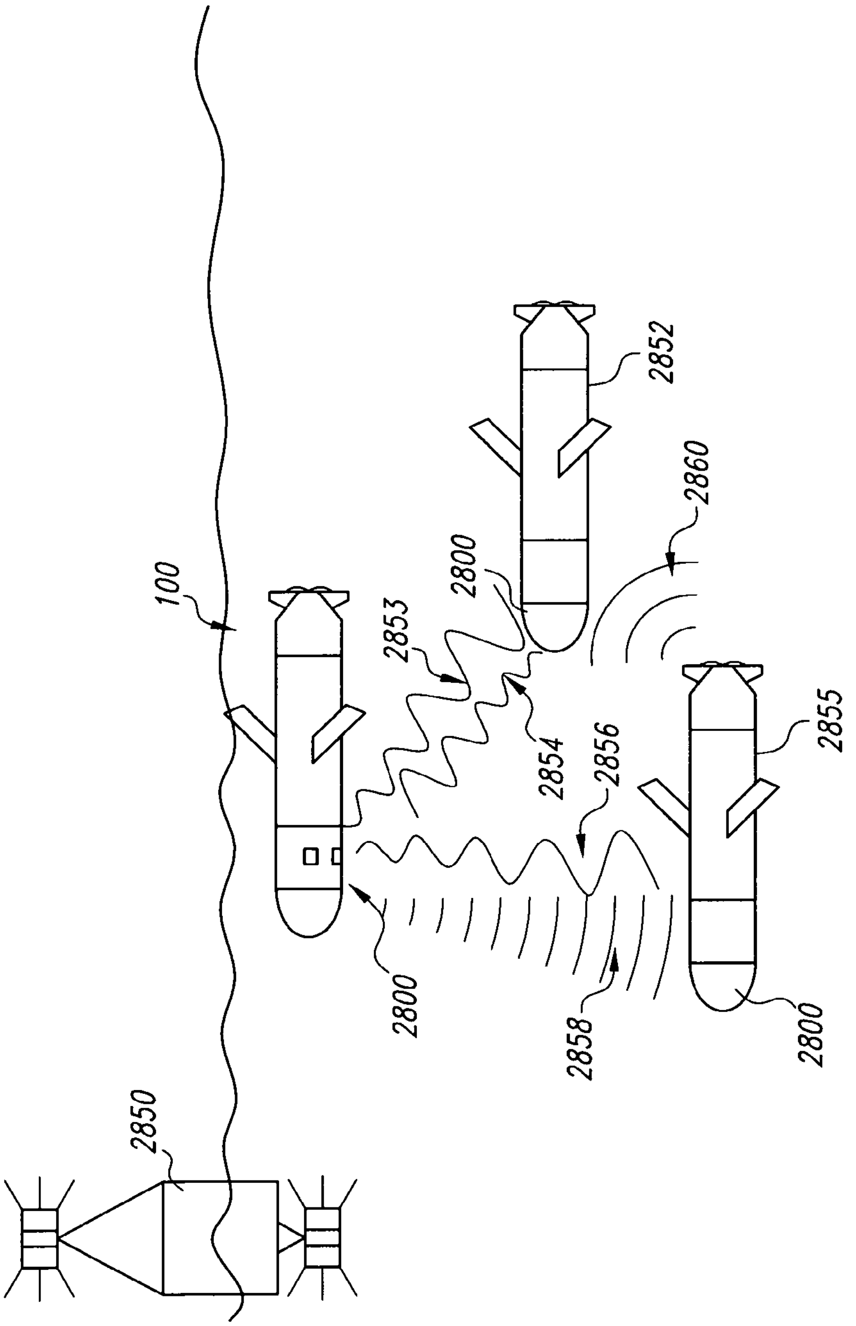
FIG. 23 is a light communications system according to an embodiment of the disclosure.

FIG. 23 illustrates an example of vehicle 100 swarm communications and coordination. In FIG. 23, a first vehicle 100 including an optical communications module 2800 tracks towards and navigates to a flashing white light buoy 2850. A second vehicle 2852 follows vehicle 100 by receiving transmitted green light pulses 2853 from vehicle 100. Vehicle 2852 also executes mission instructions, such as for example, "stop following," received on a second channel of communication in yellow colored light 2854 transmitted from vehicle 100. A third vehicle 2855 located beneath vehicle 100 also tracks and follows vehicle 100 by receiving red light pulses 2856 from vehicle 100. Vehicle 2855 can also receive instructions from lead vehicle 100 via messages transmitted from vehicle 100 via an LED emitting orange colored light; or optionally via acoustical waves 2858 via acoustic modems included within its communications module 2800. Such instructions might include for example, "stop following and begin execution of mission profile #2." Vehicle 2855, may optionally transmit via LED light signal, acoustic modem, or radio frequency, a confirmation that commands from vehicle 100 have been received. Vehicles 2852 can also relay instructions received from vehicle 100 to vehicle 2855 on a separate communications channel 2860. Vehicles 2852 and 2855 can also communicate directly with each other, or with other vehicles using LEDs or other available communications channels.

3.0 Example of Use

Figure 24:
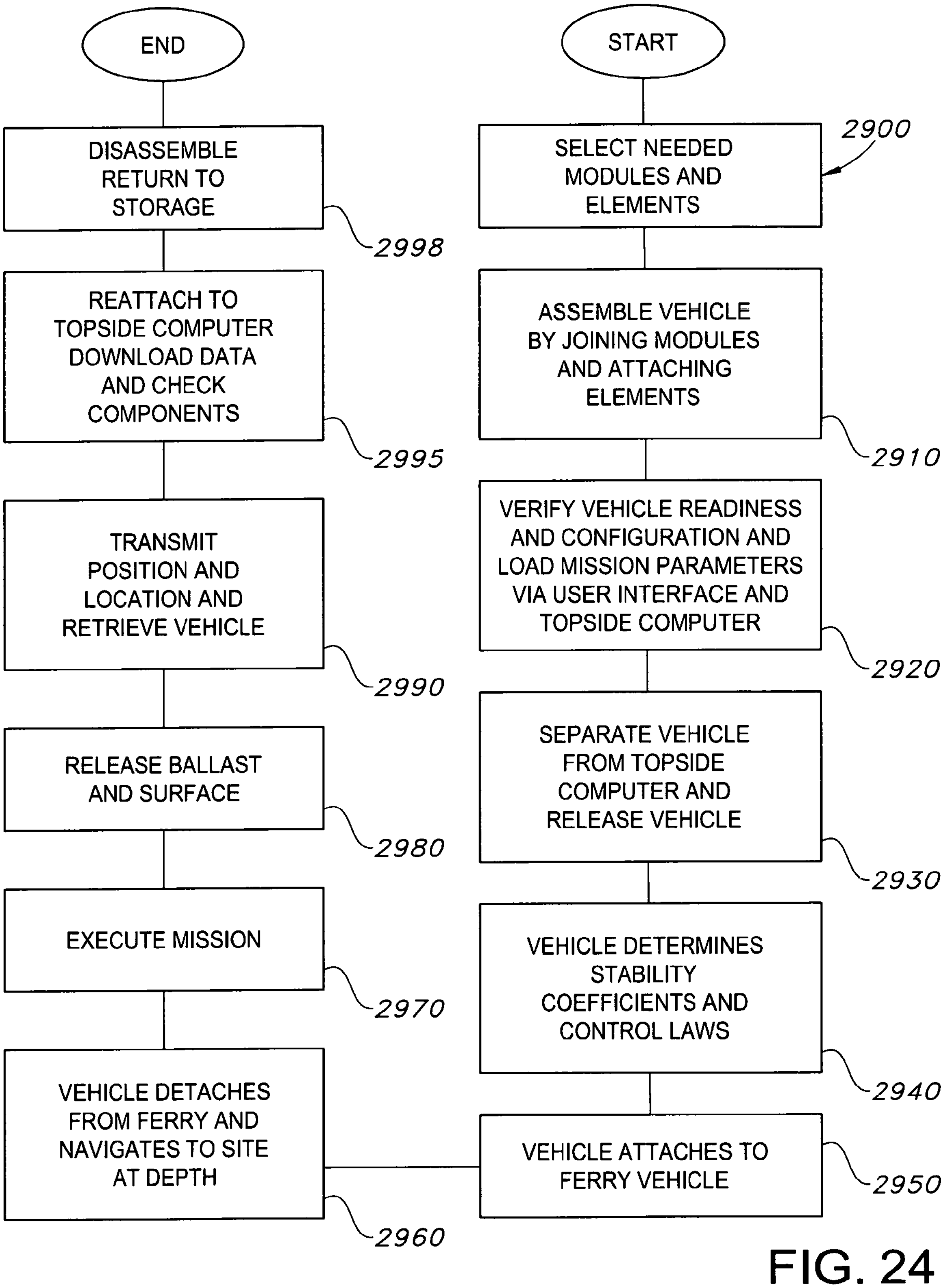
FIG. 24 is a flow chart illustrating use of the present disclosure.
Figure 25A:
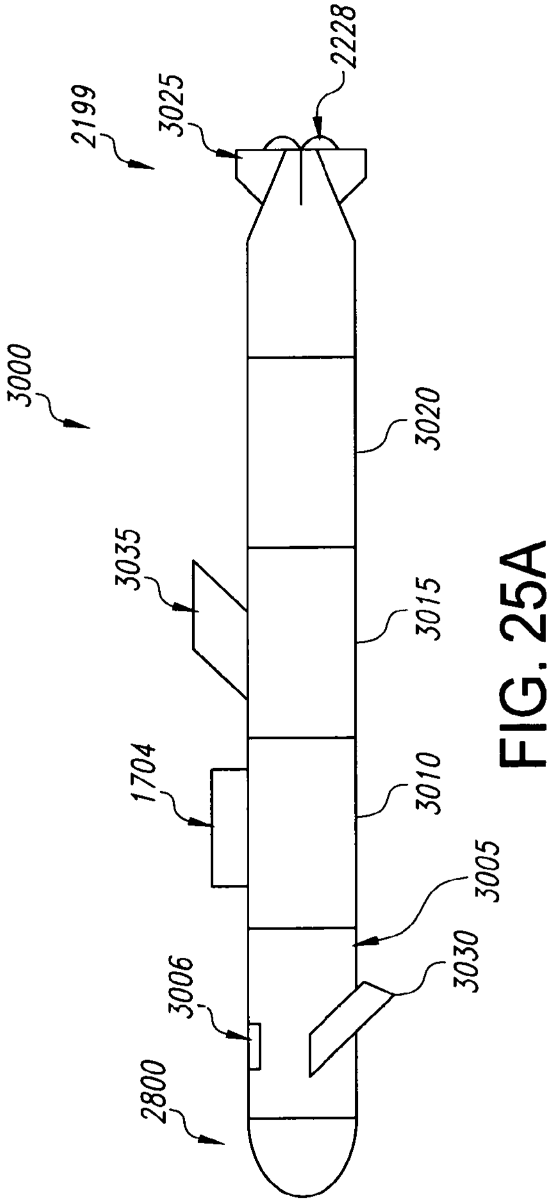
FIG. 25A is a side view of an initial assembly of an example vehicle according to an embodiment of the disclosure; and, FIG. 25B is a side view of a final configuration of an example vehicle according to an embodiment of the disclosure.
Figure 25B:
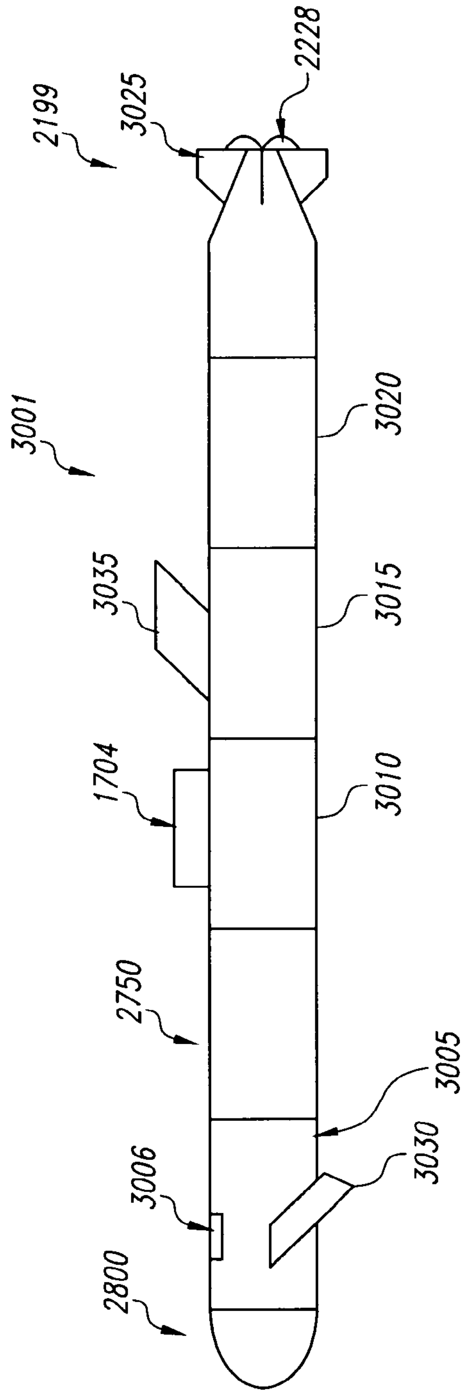

FIG. 24 is a flow chart illustrating possible use and operation of a field configurable vehicle according to an embodiment of the disclosure. FIGS. 25A and 25B shows the initial, 3000, and final vehicle 3001 configuration resulting from the process described below and in the flow chart of FIG. 24. In the fictitious example illustrated herein, the assembled vehicle comprises a UUV used on a scientific mission to sample gasses present in the ocean water near an off shore volcano.

In step 2900 of FIG. 24, an operator identifies the mission objective, mission profile, and mission parameters for the UUV including needed sensors or other peripheral devices, for example grappling hooks or other attachable tools, desired to complete the mission. In this example, the operator decides that a gas sampling instrument and infra-red sensor are needed to complete the test plan. The operator determines that a specialized pre-assembled module 3005 including these types of sensors exists and selects that module as one of the modules to be included in the final vehicle assembly.

The operator also identifies the distance to and method of transit to the mission station; the vehicle's navigation equipment requirements: and whether the vehicle needs to maintain precise station keeping on arrival. In this example, the finally assembled vehicle will be deployed from a boat and then transit to a location near the volcano by attaching itself to the side of remote controlled undersea vehicle (ROV) using a magnetic attachment device. The vehicle operator notes that module 3005 already includes a suitable attachment mechanism 3006 constructed according to the embodiment of FIG. 8.

After hitching a ride to the vicinity of the underwater volcano, the finally assembled UUV will detach itself and navigate and transit to the test location via its own propulsion. The operator selects an appropriate propulsion module based on the time in transit and the desired speed of transit as well as what type of search pattern or station keeping the vehicle must maintain while collecting the data samples. In this example, the vehicle will transit and then execute a search grid while conducting the test. The operator thus selects a propulsion module 2199 with a fixed pitch propeller 2228 for this mission.

Once the sample collection is completed, the UUV will rise to the surface for recovery. The operator thus selects a ballast module 3010 with releasable ballast 1704 for this mission. The operator also selects a command module 3015 and a battery module 3020 having sufficient power to operate the UUV throughout the entire mission profile. The operator also selects moveable control elements such as stabilizers 3025, and bow planes 3030; as well as fixed control surfaces such as a sail plane 3035.

After selecting the needed configurable elements and the desired modules, in step 2910 of FIG. 24, the operator assembles the modules together using the joining mechanisms previously described in connection with the embodiments of FIGS. 5A-5C. The operator can begin the assembly process with any module, but in this example, the operator begins the assembly process with the battery module 3020 as the first module. In this manner, the electrical connections of any subsequently joined modules can be checked by noting if LED 511 illuminates on each module. LED 511 of any joined module can optionally also flash a code to indicate to the operator that the module has performed an internal self-check of its systems and is fully operational.

The operator next attaches command module 3015, on one end, and the propulsion module 2199 on the other end of battery module 3020. In the embodiment of the disclosure as draw in FIG. 25, the command module also includes all the navigation systems for the vehicle. Optionally, a separate navigation module, containing navigation systems such as, for example but not limited to: six axis inertial navigation units (INU), GPS, other navigation systems can be installed.

In the configuration of FIG. 25A, the ballast module 3010 is attached to the opposite end of command module 3015, followed by the sensor module 3005 including the gas and infra-sensors, and attaches module 3005 in series with the ballast module 3010. Sensor module 3005 additionally includes attachment device 3006: one of the mechanisms of FIGS. 8-11 useful for attaching to the ROV that will ferry the finally assembled vehicle to the point of operation.

The operator then attaches the moveable and fixed control surfaces/elements to the exterior of the assembled vehicle. In this example, the operator also choses to attach a nose cone to the front of the vehicle. In this example the nose cone includes optical communications package 2800. The initial vehicle assembly is shown in FIG. 25A.

With the initial vehicle components assembled, in step 2920, the operator then uses top side controller 2470 to couple the initially assembled vehicle 3000 to topside computer 2530 and user interface 2600. The operator uses interface 2600 to verify vehicle system and component status, and to load mission navigation, operating and performance parameters into vehicle 3000's computer 2410 located in the vehicle's command module 3015. During this topside check of vehicle mission parameters and configuration, topside computer 2530 calculates that the center of mass location may be outside of allowable parameters once the ballast module releases its ballast. Topside computer 2530 displays this information to the operator via user interface 2600. The initial configuration of vehicle 3000 is therefore not acceptable and the vehicle must be reconfigured.

The operator then choses to separate the vehicle at the initial location joining the sensor 3005 and ballast 3010 modules; and inserts a module 2750 with moveable internal weights as shown, for example, in FIG. 20. Once ballast 1704 is released from ballast module 3010, command module 3015 will execute instructions and reposition the internal weights 2758 of module 2725 to maintain the center of gravity of the finally assembled vehicle 3001 within allowable limits. The completely assembled vehicle 3001 is shown in FIG. 25B.

The operator once again checks the modules, elements, and overall configuration of vehicle 3001 and confirms that elements and modules are working, mission navigation and operational parameters are correctly loaded, and that vehicle 3001 can operate within allowable limits. Once vehicle 3001 systems have been checked and mission parameters loaded, vehicle 3001 is decoupled from topside computer 2530 in step 2930 and released into the water. Vehicle 3001 computes its initial control laws and stability coefficients from data received from the modules and attached elements, or as entered by the operator. Once in the water, in step 2940, vehicle 3001 then executes a series of maneouvres and collects data that measures changes in position, pitch, yaw and roll based on control surface movements and compares that empirical data to the computed and predicted result.

Vehicle 3001 can then use filtering or averaging to further refine the calculated and empirically determined stability and control coefficients.

Once systems checks and control parameters are complete, vehicle 3001 embarks on its mission. In step 2950, vehicle 3001 tracks towards a flashing light emitted by the remotely piloted vehicle that will ferry vehicle 3001 to the test site local. Once proximate the ROV, vehicle 3001 magnetically attaches itself to the ROV, and the ROV with vehicle 3001 attached, transits to the test area. When the vehicle navigation system detects that vehicle 3001 has reached the release point, computer 2410 sends a signal to the magnetic attachment mechanism which releases vehicle 3001 from the ROV shuttle vehicle. Vehicle 3001 then achieves neutral buoyancy according to the amount of ballast loaded and the surrounding water density; and in step 2960 the vehicle command module 3015 navigates vehicle 3001 to the precise test station and executes the test collection mission in step 2970. Vehicle 3001 can optionally transmit telemetry via an acoustic modem or other communications means included within the communications packages of nose cone 2800 throughout the mission.

After completing the mission, vehicle 3001 navigates to its mission defined pick up location using GPS or internal navigation, or other included navigation capabilities; and commands the release of ballast 1704 and rises to the surface, in step 2980, according to its preprogrammed mission profile. Once on the surface, vehicle 3001 transmits a series of colored light pulses indicating status information, such as for example: that it has completed its mission, that the vehicle is in good condition. Vehicle 3001 also transmits via RF data indicating that it can be retrieved, and its location as determined by vehicle 3001 onboard navigation. The vehicle operator can transmit a reply from the research ship acknowledging the message and can optically, acoustically, or via RF communications transmit to vehicle 3001 other commands. Such commands might include instructions for vehicle 3001 to continue outputting a single flashing white light so that it can be visually located, but to cease other transmissions. The research vessel proceeds to the location and retrieves vehicle 3001.

In step 2995, vehicle 3001 is reconnected to topside computer 2530 and user interface 2600. Prior to execution of step 2995, the operator can also check any optional vehicle anti-tamper devices or security systems to ensure that no unauthorized access to vehicle 3001 has occurred; and that could also damage or inject malicious code into topside computer 2530. Once coupled to topside computer 2530, the operator downloads the collected data if not previously transmitted from vehicle 3001; and verifies vehicle 3001 component health and status. In step 2998, the operator can disassemble vehicle 3001 and store its configurable elements and component modules for later use to configure a new vehicle at a later time.

What is claimed is:

1. A connector for joining a first component to a second component of a propulsion module, comprising:

a male end, comprising:
- a plurality of pins;
- a first data bus terminal; and
- a first power bus terminal;

a single-piece female end, comprising:
- a plurality of slots sized for receiving the plurality of pins;
- a second data bus terminal, wherein the second data bus terminal is positioned on the single-piece female end to align with the first data bus terminal when the single-piece female end is joined with the male end by rotating the male end into the single-piece female end; and
- a second power bus terminal, wherein the second power bus terminal is positioned on the single-piece female end to align with the first power bus terminal when the single-piece female end is joined with the male end by rotating the male end into the single-piece female end.

2. The connector of claim 1, wherein:

the first data bus terminal further comprises a first terminal located at a first position and a second terminal located at a second position;

the second data bus terminal further comprises a third terminal located at a third position and a fourth terminal located at a fourth position;

the first power bus terminal further comprises a fifth terminal located at a fifth position and sixth terminal located at a sixth position; and, the second power bus terminal further comprises a seventh terminal located at a seventh position and an eighth terminal located at an eighth position.

3. The connector of claim 2, wherein:

the plurality of slots further comprise a channel for receiving and securing the plurality of pins; and, the first, the second, the third, the fourth, the fifth, the sixth, the seventh and the eighth positions are located such that when the male end joins to the single-piece female end by inserting the plurality of pins into the plurality of slots and rotating the male end to guide the pins in the slots:
- the first position aligns with the third position;
- the second position aligns with the fourth position;
- the fifth position aligns with the seventh position; and
- the sixth position aligns with the eighth position.

4. The connector of claim 1, further comprising:

a sealing gasket.

5. The connector of claim 1, further comprising:

a visual indicator for indicating when the first component is properly connected to the second component.

6. The connector of claim 5, wherein the visual indicator comprises an LED.

7. The connector of claim 6, wherein the LED is coupled to receive a signal from the first data bus indicative of a status of the first component.

8. The connector of claim 6, wherein the LED is coupled to the first power bus terminal.

9. A connector for joining a first component to a second component of a propulsion module, comprising:

a male end, comprising:
- a male thread;
- a first data bus terminal; and
- a first power bus terminal;

a single-piece female end, comprising:
- a female thread;
- a second data bus terminal, wherein the second data bus terminal is positioned on the single-piece female end to align with the first data bus terminal when the single-piece female end is joined with the male end by rotating the male end into the single-piece female end; and
- a second power bus terminal, wherein the second power bus terminal is positioned on the single-piece female end to align with the first power bus terminal when the single-piece female end is joined with the male end by rotating the male end into the single-piece female end.

10. The connector of claim 9, wherein:

the first data bus terminal further comprises a first terminal located at a first position and a second terminal located at a second position;

the second data bus terminal further comprises a third terminal located at a third position and a fourth terminal located at a fourth position;

the first power bus terminal further comprises a fifth terminal located at a fifth position and sixth terminal located at a sixth position; and the second power bus terminal further comprises a seventh terminal located at a seventh position and an eighth terminal located at an eighth position.

11. The connector of claim 10, wherein the first, the second, the third, the fourth, the fifth, the sixth, the seventh and the eighth positions are located such that when the male end joins to the single-piece female end by inserting the male thread into the female thread:

the first position aligns with the third position;

the second position aligns with the fourth position;

the fifth position aligns with the seventh position; and the sixth position aligns with the eighth position.

12. The connector of claim 9, further comprising:

a sealing gasket.

13. The connector of claim 9, further comprising:

a visual indicator for indicating when the first component is properly connected to the second component.

14. The connector of claim 13, wherein the visual indicator comprises an LED.

15. The connector of claim 14, wherein the LED is coupled to receive a signal from the first data bus indicative of a status of the first component.

16. The connector of claim 14, wherein the LED is coupled to the first power bus terminal.

17. A modular component of a propulsion module, comprising:

a male end, comprising:

a plurality of pins;

a first data bus terminal; and a first power bus terminal;

a single-piece female end, comprising:

a plurality of slots sized for receiving the plurality of pins;

a second data bus terminal, wherein the second data bus terminal is positioned on the single-piece female end to align with the first data bus terminal by rotating the male end into the single-piece female end; and a second power bus terminal, wherein the second power bus terminal is positioned on the single-piece female end to align with the first power bus terminal by rotating the male end into the single-piece female end.

18. The modular component of claim 17, wherein:

the first data bus terminal further comprises a first terminal located at a first position and a second terminal located at a second position;

the second data bus terminal further comprises a third terminal located at a third position and a fourth terminal located at a fourth position;

the first power bus terminal further comprises a fifth terminal located at a fifth position and sixth terminal located at a sixth position; and the second power bus terminal further comprises a seventh terminal located at a seventh position and an eighth terminal located at an eighth position.

19. The modular component of claim 18, wherein:

the plurality of slots further comprise a channel sized to receive and secure the plurality of pins; and the first, the second, the third, the fourth, the fifth, the sixth, the seventh and the eighth positions are located such that when the male end joins to a female end of a second modular component by inserting the plurality of pins into a channel of the second modular component and rotating the male end to guide the pins in the channel of the second modular component:

the first position aligns with the third position;

the second position aligns with the fourth position;

the fifth position aligns with the seventh position; and the sixth position aligns with the eighth position.

20. The modular component of claim 17, wherein at least one of the male end and the single-piece female end further comprise a sealing gasket.

21. The modular component of claim 17, further comprising:

a visual indicator for indicating when the modular component is properly connected to a second component.

22. The modular component of claim 21, wherein the visual indicator comprises an LED.

23. The modular component of claim 22, wherein the LED is coupled to receive a signal from the first data bus indicative of a status of the modular component.

24. The modular component of claim 22, wherein the LED is coupled to the first power bus terminal.

25. A modular component of a propulsion module, comprising:

a male end, comprising:

a male thread;

a first data bus terminal; and a first power bus terminal;

a single-piece female end, comprising:

a female thread;

a second data bus terminal, wherein the second data bus terminal is positioned on the single-piece female end to align with the first data bus terminal by rotating the male end into the single-piece female end; and a second power bus terminal, wherein the second power bus terminal is positioned on the single-piece female end to align with the first power bus terminal by rotating the male end into the single-piece female end.

26. The modular component of claim 25, wherein:

the first data bus terminal further comprises a first terminal located at a first position and a second terminal located at a second position;

the second data bus terminal further comprises a third terminal located at a third position and a fourth terminal located at a fourth position;

the first power bus terminal further comprises a fifth terminal located at a fifth position and sixth terminal located at a sixth position; and the second power bus terminal further comprises a seventh terminal located at a seventh position and an eighth terminal located at an eighth position.

27. The modular component of claim 26, wherein the first, the second, the third, the fourth, the fifth, the sixth, the seventh and the eighth positions are located such that when the male end joins to a female end of a second module:

the first position aligns with the third position;

the second position aligns with the fourth position;

the fifth position aligns with the seventh position; and the sixth position aligns with the eighth position.

28. The modular component of claim 25, further comprising:
a sealing gasket.

29. The modular component of claim 25, further comprising:
a visual indicator for indicating when the modular component is properly connected to a second component.

30. The modular component of claim 29, wherein the visual indicator comprises an LED.

31. The modular component of claim 30, wherein the LED is coupled to receive a signal from the first data bus indicative of a status of the modular component.

32. The modular component of claim 29, wherein the LED is coupled to the first power bus terminal.

33. A method for attaching a first configurable component to a second configurable component of a propulsion module, comprising the steps of:
inserting a plurality of pins from a male end of a first configurable component into a plurality of slots located on a single-piece female end of a second configurable component; and
rotating the plurality of pins in the plurality of slots until a first power bus terminal and a first data bus terminal of the first configurable component aligns with a second power bus terminal and a second data bus terminal of the second configurable component.

34. The method of claim 33, further comprising the step of:
providing a visual indication when the first configurable component is properly joined to the second configurable component.

35. The method of claim 34, wherein the step of providing a visual indication further comprises the steps of:
coupling a light to at least one of the second and the first power bus terminals; and
illuminating the light when the light receives power from the at least one of the first and the second power bus terminals.

36. The method of claim 35, wherein the step of coupling a light includes the step of coupling an LED.

37. The method of claim 35, further comprising the steps of:
coupling a light to the first data bus of the first configurable component; and
receiving an instruction on the first data bus to command the light to flash a signal indicative of a status of the first configurable component.

38. A method for attaching a first configurable component to a second configurable component of a propulsion module, comprising the steps of:
inserting a male thread from a male end of a first configurable component into a female thread located on a single-piece female end of a second configurable component; and,
rotating the male thread in the female thread until a first power bus terminal and a first data bus terminal of the first configurable component aligns with a second power bus terminal and a second data bus terminal of the second configurable component.

39. The method of claim 38, further comprising the step of:
providing a visual indication when the first configurable component is properly joined to the second configurable component.

40. The method of claim 39, wherein the step of providing a visual indication further comprises the steps of:
coupling a light to at least one of the second and the first power bus terminals; and
illuminating the light when the light receives power from the at least one of the first and the second power bus terminals.

41. The method of claim 40, wherein the step of coupling a light includes the step of coupling an LED.

42. The method of claim 40, further comprising the steps of:
coupling a light to the first data bus of the first configurable component; and
receiving an instruction on the first data bus to command the light to flash a signal indicative of a status of the first configurable component.

* * * * *